US012694359B1

(12) United States Patent
Siegel et al.

(10) Patent No.: US 12,694,359 B1
(45) Date of Patent: Jul. 28, 2026

(54) SYSTEM AND METHOD TO ASSESS WORKFORCE POTENTIAL

(71) Applicant: Endpoint Solutions Inc., Dover, DE (US)

(72) Inventors: Liam Siegel, Dover, DE (US); John Cross, Dover, DE (US); Alexander Siegel, Dover, DE (US); Eoin Siegel, Dover, DE (US); Jonathan Adrian Siegel, Dover, DE (US)

(73) Assignee: Endpoint Solutions Inc., Dover, DE (US)

( * ) Notice: Subject to any disclaimer, the term of this patent is extended or adjusted under 35 U.S.C. 154(b) by 0 days.

(21) Appl. No.: 19/569,054

(22) Filed: Mar. 17, 2026

(51) Int. Cl.
*G06Q 10/0639* (2023.01)
*G06F 8/71* (2018.01)

(52) U.S. Cl.
CPC ......... *G06Q 10/06398* (2013.01); *G06F 8/71* (2013.01)

(58) Field of Classification Search
None
See application file for complete search history.

(56) References Cited

U.S. PATENT DOCUMENTS 7,346,174 B1 * 3/2008 Smith .................... G16H 40/63 600/528
8,655,794 B1 2/2014 Cobb
2015/0325138 A1 * 11/2015 Selinger ................. G09B 19/00 434/322
2016/0100059 A1 * 4/2016 Skiba ............... G06Q 10/06393 379/265.06
2017/0278421 A1 9/2017 Du
2022/0046132 A1 * 2/2022 Matula .................... G10L 15/16
2022/0103389 A1 * 3/2022 Dua ..................... G09B 21/001

OTHER PUBLICATIONS

"Chatisa: A Prompt-Engineered Chatbot for Coding, Project Management, Interview and Exam Preparation Activities", published Jul. 23, 2024, Fadel M. Megahed et al, arXiv:2407.15010.

(Continued)

*Primary Examiner* — Mehmet Yesildag
(74) *Attorney, Agent, or Firm* — GRAESER ASSOCIATES INTERNATIONAL INC; Dvorah Graeser

(57) ABSTRACT

A system for generating customized knowledge assessments comprises a context gatherer configured to collect test taker work data from data sources and exemplar test formats, wherein the context gatherer preprocesses collected test taker work data to extract concepts, frameworks, and skill patterns. The system includes a multi-agent orchestra comprising specialized agents including a context analysis agent, a question generation agent, a quality assurance agent, a validation agent, and a refinement agent. A system controller coordinates the specialized agents and manages bidirectional communication between them. A dual-layer validation system comprises a first validation layer configured to perform structural validation using schema checking and a second validation layer comprising a fine-tuned language model configured to perform semantic validation including duplicate detection and relevance scoring. An output generator produces formatted assessment outputs based on validated assessment questions.

20 Claims, 18 Drawing Sheets

(56) References Cited

OTHER PUBLICATIONS

"SkillScope: A Tool to Predict Fine-Grained Skills Needed to Solve Issues on GitHub", published Jan. 27, 2025, Benjamin C. Carter et al, arXiv:2501.15922v1.
"Personalized Code Readability Assessment: Are We There Yet?", published Mar. 10, 2025, Antonio Vitale et al, arXiv:2503.07870v1.
"Mining Software Repositories for Expert Recommendation", published Apr. 23, 2025, Chad Marshall et al, arXiv:2504.16343v1.
"Patterns in Elementary-Age Student Responses to Personalized & Generic Code Comprehension Questions", published Mar. 11, 2020, Jean Salac et al, SIGCSE '20, Association for Computing Machinery.
"Adaptive Assessment and Content Recommendation in Online Programming Courses: On the Use of Elo-rating", published Jun. 2022, Boban Vesin et al, ACM Trans. Comput. Educ. 22, 3, Article 33.
"Repo4QA: Answering Coding Questions via Dense Retrieval on GitHub Repositories", published Oct. 12, 2022, Minyu Chen et al, Proceedings of the 29th International Conference on Computational Linguistics, pp. 1580-1592.

* cited by examiner

Figure 5B basic system

SYSTEM AND METHOD TO ASSESS WORKFORCE POTENTIAL

FIELD OF THE INVENTION

The present invention is to a system and method for generating customized knowledge assessments, and in particular, to such a system and method that utilizes multi-agent orchestration and dual-layer validation to create personalized assessment questions based on test taker work history.

BACKGROUND OF THE INVENTION

Traditional knowledge assessment methods rely on manual creation of test questions by human evaluators, which can be time-consuming and may not accurately reflect an individual's actual experience or demonstrated skill profile. Conventional approaches to assessment generation often involve generic question banks that lack personalization to the specific competencies and work history of the person being evaluated. As organizations increasingly seek to evaluate technical skills based on demonstrated work rather than standardized testing, there exists a gap between available assessment tools and the desire for personalized evaluation methods.

Advances in machine learning and natural language processing have enabled automated content generation across various domains. However, applying these technologies to assessment creation presents challenges related to maintaining quality, relevance, and structural consistency of generated content. Systems that generate assessment content may produce outputs that fail to meet formatting requirements, contain semantic errors, or lack appropriate difficulty calibration. Coordinating multiple processing stages while maintaining output quality across diverse input sources and assessment formats remains an area where improvements may be beneficial.

SUMMARY OF THE INVENTION

Existing computer-implemented assessment generation systems suffer from several technical deficiencies that the present invention addresses.

First, existing automated assessment generation systems employ static validation schemas that cannot adapt when language model generation patterns change over time. When systematic validation failures occur, conventional systems require manual identification of failure patterns and manual schema updates by human operators. No existing system implements a bidirectional feedback mechanism between structural and semantic validation layers that enables automatic schema refinement based on detected semantic failure patterns, or automatic root cause analysis of structural failures informed by semantic validation context. This static validation architecture causes validation effectiveness to degrade over time as generation patterns drift without a corresponding mechanism for self-correction.

Second, conventional assessment generation systems assign difficulty levels based on static rubrics that do not reflect an individual test taker's actual demonstrated skill progression. Existing systems lack data structures capable of representing the temporal relationships between concept introduction, concept refinement, and concept mastery as observed across sequential work contributions. Without such a representation, conventional systems cannot calibrate assessment difficulty to the boundary of a test taker's current competency, nor can they distinguish between concepts a test taker has fully mastered, concepts currently being developed, and concepts not yet encountered.

Third, existing systems that incorporate human administrator feedback require manual translation of that feedback into system parameter adjustments, and lack mechanisms to automatically measure whether parameter changes improve or degrade system performance. No existing system implements a closed-loop control architecture in which administrator feedback is automatically converted into computational parameter modifications, automatically deployed to distributed processing agents, automatically measured for effectiveness against baseline performance metrics, and automatically rolled back when performance degrades, without requiring further human intervention after the initial feedback is provided.

The background art does not teach or suggest a system or method that addresses these technical deficiencies. Specifically, the background art does not teach or suggest a system or method that employs multi-agent orchestration with specialized agents coordinated through a system controller to generate customized knowledge assessments based on test taker work history. The background art also does not teach or suggest a dual-layer validation system comprising structural validation using schema checking and semantic validation using a fine-tuned language model, wherein the two validation layers exchange feedback to enable dynamic schema refinement and generation error root cause analysis.

The present invention, in at least some aspects, is of a system and method for generating customized knowledge assessments based on test taker work history and in particular, for such a system and method for employing multi-agent orchestration with specialized agents coordinated through a system controller and dual-layer validation comprising structural schema checking and semantic validation using a fine-tuned language model with adaptive parameter adjustment.

Without wishing to be limited by a closed list, the present invention in at least some embodiments provides the following specific technical improvements to computer-implemented assessment generation systems.

With respect to validation architecture, the present invention in at least some embodiments improves the functioning of automated validation systems by implementing a dual-layer validation architecture in which structural and semantic validation layers exchange feedback bidirectionally. The first validation layer dynamically refines its schema rules based on systematic failure patterns detected by the second validation layer, without requiring human operator intervention. The second validation layer receives structural failure context from the first validation layer to enable automated root cause analysis of generation errors. This bidirectional feedback mechanism produces a self-correcting validation system whose effectiveness does not degrade as language model generation patterns change over time, representing a technical improvement over conventional static schema validation architectures.

With respect to skill representation and difficulty calibration, the present invention in at least some embodiments improves computer-implemented assessment systems by introducing a temporal knowledge graph as a novel data structure that represents technical concepts as nodes and encodes temporal relationships between concept introduction, concept refinement, and concept mastery as typed edges. This data structure enables graph traversal operations that identify the boundary of a test taker's current competency (concepts that are partially mastered but for which prerequisite concepts are sufficiently established) which conventional relational or flat data structures cannot represent or query. Assessment difficulty calibration performed against this data structure is therefore grounded in the test taker's actual demonstrated skill progression rather than static rubric values, producing a technical improvement in difficulty alignment that conventional systems are architecturally incapable of achieving.

With respect to the human-in-the-loop calibration architecture, the present invention improves distributed computer systems by implementing a closed-loop control architecture in which administrator feedback captured through a calibration interface is automatically converted into machine-readable parameter modification instructions, serialized and transmitted to distributed processing agents through an asynchronous message passing infrastructure, applied by agents without system restart or redeployment, measured for effectiveness by comparing post-modification performance metrics against stored baseline metrics, and automatically rolled back when delta values indicate performance degradation. This closed-loop architecture eliminates the manual parameter tuning cycle present in conventional systems and provides automatic performance regression detection and recovery, representing a technical improvement in the operational behavior of distributed agent systems.

With respect to multi-agent coordination architecture, the present invention in at least some embodiments improves computer-implemented assessment generation systems by implementing an asynchronous message passing infrastructure specifically adapted to the interdependencies of multi-agent assessment generation workflows. The asynchronous message queue system implements non-blocking message passing between specialized agents through structured message types including dependency declarations that specify prerequisite processing requirements, blocking condition messages that enable agents to signal unavailability while identifying alternative processing tasks executable during the wait period, and partial result messages that carry confidence scores and completion percentages enabling downstream agents to begin processing before upstream agents have completed their full output. This architecture reduces total assessment generation latency compared to conventional batch-oriented assessment pipeline implementations, in which downstream processing stages wait for upstream stages to produce complete outputs before beginning operation, yielding end-to-end latency approximating the sum of all stage durations. The technical improvement of the present invention lies not in asynchronous messaging as a general concept, but in the specific application of structured partial result passing, confidence-weighted intermediate outputs, and adaptive task allocation to the particular interdependencies of concurrent assessment generation agents, thereby enabling the system controller to dynamically route subtasks based on agent capacity signals and specialization indicators in ways that general-purpose streaming or actor-model frameworks do not provide in this specific operational context.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions. The processor is configured to execute a predefined set of operations in response to receiving a corresponding instruction selected from a predefined native instruction set of codes.

Software (e.g., an application, computer instructions) which is configured to perform (or cause to be performed) certain functionality may also be referred to as a "module" for performing that functionality, and also may be referred to a "processor" for performing such functionality. Thus, a processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality.

Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings.

DETAILED DESCRIPTION OF AT LEAST SOME EMBODIMENTS

Figure 1:
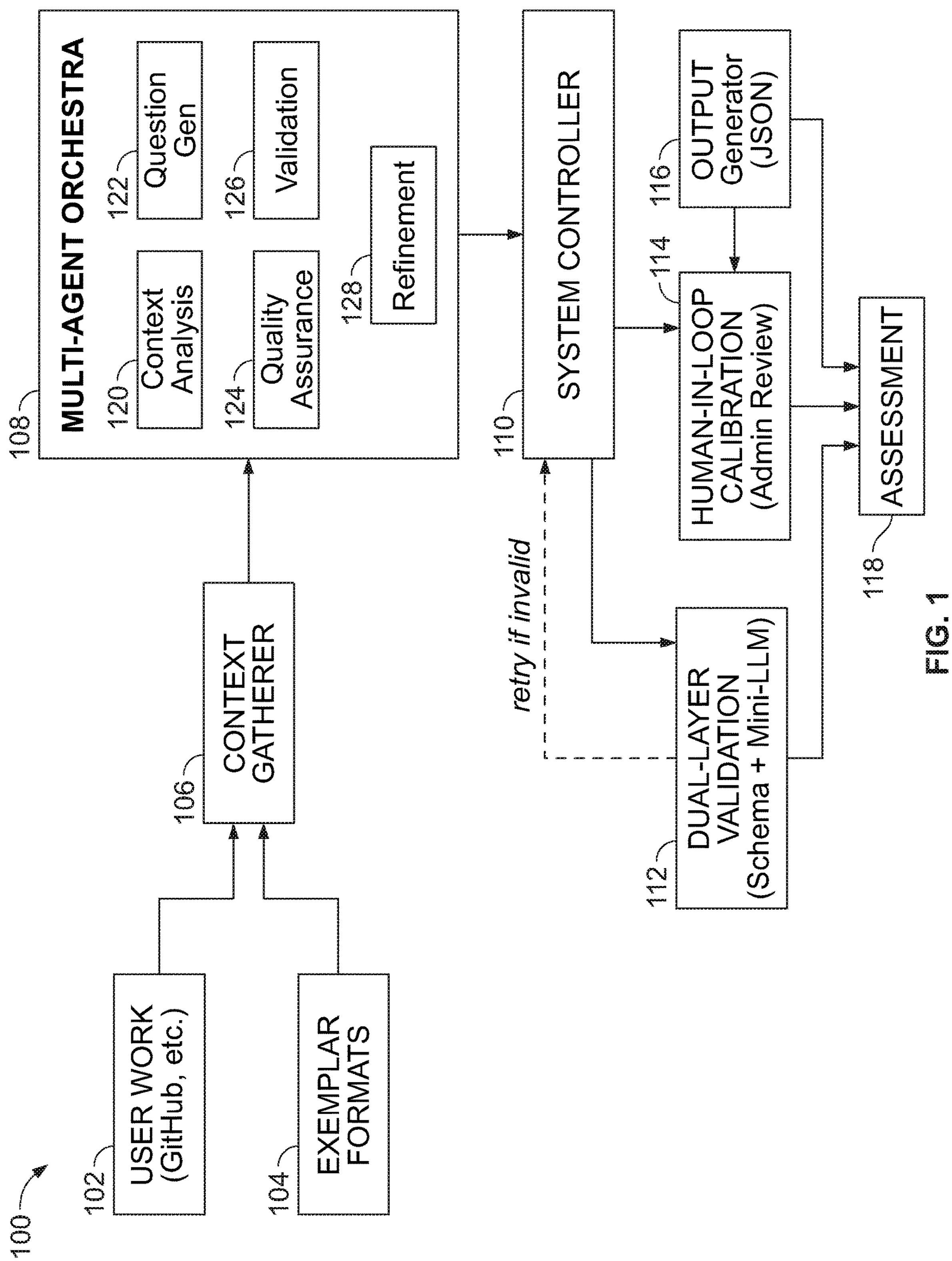
FIG. 1 shows a non-limiting, exemplary block diagram of a system for generating customized assessments based on test taker work history according to at least some embodiments of the present invention.

The present invention, in at least some embodiments, relates to a system for generating customized knowledge assessments based on test taker work history. Traditional assessment creation methods may rely on manual processes that can be time-consuming and may not accurately reflect the actual experience or demonstrated skills of a test taker. The disclosed system, in at least some embodiments, addresses these limitations by employing automated assessment generation techniques that analyze historical test taker activity to create personalized test questions and assessments.

The system may utilize machine learning orchestration to process and analyze various forms of test taker work data. In some cases, the system may examine version control contributions, code repositories, documentation, and other digital artifacts that represent the professional activities of a test taker. The analysis may extract relevant concepts, frameworks, and skill patterns from this historical data to inform the assessment generation process.

Multi-agent coordination may be employed to distribute different aspects of the assessment creation process across specialized computational agents. Each agent may focus on a particular function, such as context analysis, question generation, quality evaluation, or validation. The coordination between these agents may enable parallel processing and specialized optimization that single-agent approaches may not achieve.

The system may incorporate adaptive validation mechanisms to ensure the quality and relevance of generated assessments. In some cases, dual-layer validation processes may be employed, combining structural compliance checking with semantic quality assessment. The validation process may iteratively refine the generation parameters based on feedback, progressively adjusting the system's behavior to produce valid outputs.

Personalization may be achieved through the analysis of test taker-specific work patterns and demonstrated competencies. The system may weight or focus on recent activities while maintaining awareness of historical context, creating assessments that reflect the full breadth of a test taker's demonstrated skills. The generated questions may directly relate to actual work performed by the test taker, providing more relevant and meaningful evaluation compared to generic assessment approaches.

The system may also incorporate human oversight through calibration processes that allow administrators to provide feedback on generated assessments. This feedback may be integrated into the generation process to align outputs with organizational standards and preferences while maintaining the efficiency benefits of automated creation.

Without wishing to be limited by a single theory, Large Language Models (LLMs) may provide particular utility for assessment generation and application as described herein. At its core, a Large Language Model may operate as a multidimensional curve-fitting system that processes language through mathematical relationships across thousands of dimensions in each representation and billions of learned parameters simultaneously. Each dimension may represent a different aspect of language, programming concepts, or contextual understanding, creating a complex mathematical space where the model learns to find optimal patterns that best fit training data. The system may learn relationships between concepts such as when dimensions representing programming terms like "function" and "return" are activated, related dimensions representing "value" should also be activated, creating interconnected patterns across billions of examples that form a mathematical structure capable of generating coherent, contextually appropriate text.

The fitting process may involve adjusting billions of parameters or weights to minimize differences between predicted and actual outputs across training data, analogous to adjusting coefficients in a polynomial equation but with exponentially more terms. Each parameter may represent a decision point that contributes to a complex decision surface capable of navigating the space of human language and code. When generating assessments, the model may traverse this high-dimensional surface by following learned patterns from input context, such as a test taker's code history, to appropriate output regions that represent valid test questions, with the context gatherer positioning the system at specific coordinates in this vast mathematical space.

This mathematical framework may explain why language models can generate novel, contextually appropriate content by interpolating through learned manifolds of language patterns rather than retrieving memorized text. For assessment generation systems, this capability may enable the creation of entirely new questions that feel natural and relevant because they follow mathematical relationships learned from millions of examples, adapted to the specific coordinates defined by each test taker's unique work history. The temperature parameter may control how closely the system follows the most probable paths versus exploring nearby alternatives, allowing for controlled variation in the generated assessment content while maintaining coherence and relevance to the test taker's demonstrated skills and experience.

Referring to FIG. 1, a system 100 provides an architecture for generating customized assessments based on test taker work history. The system 100 receives test taker work 102 and exemplar formats 104 as primary inputs that feed into a context gatherer 106. The test taker work 102 may include version control systems such as GitHub commits, GitLab merge requests, and Bitbucket pull requests. In some cases, the test taker work 102 may also encompass writing and content creation such as essay collections, blog posts, technical documentation, research papers, creative writing portfolios, journalism articles, and marketing copy. The test taker work 102 may further include design artifacts such as Figma files, Sketch documents, Adobe Creative Cloud projects, CAD models, and architectural drawings. Additionally, the test taker work 102 may comprise data analysis work such as Jupyter notebooks, R scripts, SQL queries, and Excel formulas.

The context gatherer 106 may collect and organize the test taker work 102 along with the exemplar formats 104 to create structured input data for downstream processing. The exemplar formats 104 may provide template structures and approved question formats that guide assessment generation. The context gatherer 106 may process and preprocess the collected data to extract relevant patterns and contextual information from the test taker work 102.

As shown in FIG. 1, the context gatherer 106 connects to a multi-agent orchestra 108 that contains multiple specialized agents coordinated by a system controller 110. The multi-agent orchestra 108 may comprise five specialized agents: a context analysis agent 120, a question generation agent 122, a quality assurance agent 124, a validation agent 126, and a refinement agent 128 that operate semi-autonomously but coordinate through the system controller 110. The system controller 110 may manage the coordination and orchestration of these agents to enable parallel processing and task distribution.

The multi-agent orchestra 108 may include context analysis through context analysis agent 120 that processes and categorizes test taker work history, extracting concepts, frameworks, and patterns from the input data. The context analysis agent 120 may identify technologies, programming languages, and skill evolution patterns present in the test taker work 102. Question generation by question generation agent 122 within the multi-agent orchestra 108 may create initial assessment questions using large language models. The question generation agent 122 may produce candidate questions based on the concepts and patterns extracted by the context analysis agent 120.

Quality assurance agent 124 within the multi-agent orchestra 108 may evaluate question quality and relevance with scoring from 0.0 to 1.0. The quality assurance agent 124 may assess each generated question against predefined criteria and assign numerical quality scores. The validation agent 126 may ensure schema compliance and format consistency, for example by using JSON Schema draft-07 with Pydantic. JSON is presented as a non-limiting example of a type of defined schema; optionally another such schema may be used, additionally or alternatively. As a non-limiting description, a schema is a formally defined description of the structure, constraints, and semantics of data, expressed in a machine-readable form, which can be used to validate, interpret, or generate concrete data instances; this definition encompasses specific schema languages such as JSON Schema, where the schema itself is a JSON document that declaratively specifies the allowed structure and constraints of JSON data. The validation agent 126 may verify that generated questions conform to required structural formats and data types.

A refinement agent 128 within the multi-agent orchestra 108 may iteratively improve questions based on feedback loops from other agents. The refinement agent 128 may receive signals from the quality assurance agent 124 and the validation agent 126 to enhance question quality through successive iterations.

With continued reference to FIG. 1, the output from the multi-agent orchestra 108 flows through dual-layer validation 112 that implements a comprehensive validation process. The dual-layer validation 112 may comprise a primary layer using JSON Schema validation for example for structural compliance, and a secondary layer using a fine-tuned mini-LLM with 1-3B parameters for semantic validation. The primary layer may check structural compliance, field presence, type validation, and format consistency. The secondary layer may perform semantic quality assessment, duplicate detection, and relevance scoring using the fine-tuned language model.

The system 100 may include human-in-loop calibration 114 that incorporates administrator review and preference learning to align outputs with organizational standards. The human-in-loop calibration 114 may include an initial calibration phase where administrators review 5-10 sample assessments using thumbs up/down or 1-5 scale ratings. The human-in-loop calibration 114 may incorporate administrator feedback into system prompts and quality models to adapt the system to specific organizational requirements.

As further shown in FIG. 1, both the dual-layer validation 112 and the human-in-loop calibration 114 preferably connect to an output generator 116 that produces final formatted assessments. The output generator 116 may produce questions with multiple choice or open ended formats, prototype answers with scoring rubrics, difficulty indicators, and compatible JSON formats. The output generator 116 creates an assessment 118 that contains the finalized questions and associated metadata. The assessment 118 may be formatted for integration with existing quiz platforms and assessment systems.

The output generator 116 may further produce metadata for each validated assessment question that links the question to the specific commits and skill progression stages in the temporal knowledge graph from which the question was derived. For each generated assessment question, the output generator 116 may retrieve from the temporal knowledge graph the identifiers of the one or more commits whose code modifications provided the technical concepts, code examples, or skill progression evidence that informed the question content, and may embed these commit identifiers in the metadata accompanying the question in the formatted assessment output. The output generator 116 may additionally retrieve from the temporal knowledge graph the skill progression stage associated with each linked commit, identifying whether the commit represented a concept introduction event, a concept refinement sequence, or a mastery indicator for the technical concept being assessed, and may include this skill progression stage information in the question metadata alongside the commit identifiers.

This commit-linked metadata preferably serves several technical functions within the system. It enables the human-in-the-loop calibration component to present each assessment question to administrators alongside the specific source commits from which the question was derived, providing the contextual information necessary for administrators to evaluate whether the question accurately reflects the test taker's demonstrated skill at the relevant stage of progression. It further enables the output generator 116 to produce cross-referencing data that downstream assessment platforms may use to trace each question back to specific evidence of demonstrated competency in the test taker's work history, rather than presenting assessment questions as outputs whose derivation from specific work contributions is opaque. The temporal knowledge graph stage metadata additionally enables receiving systems to organize generated assessment questions by skill progression stage, supporting the construction of assessments that progress from questions targeting concept introduction stages through questions targeting concept refinement and mastery stages in a sequence that reflects the test taker's actual demonstrated learning trajectory.

The context gatherer 106 may collect test taker work data from multiple version control repositories associated with the same user, wherein each repository represents a different project in which the test taker has made version control contributions. The test taker's complete professional work history may be distributed across multiple repositories reflecting different employment contexts, personal projects, open source contributions, and collaborative development efforts, each of which may demonstrate technical concepts and skill progression patterns that contribute to a comprehensive picture of the test taker's overall competency profile. By collecting work data from multiple repositories simultaneously rather than restricting analysis to a single repository, the context gatherer 106 may capture the full breadth of the test taker's demonstrated technical expertise across diverse project contexts, enabling the system to generate assessments that reflect the complete scope of the test taker's skills rather than only the skills demonstrated within any single project.

The context gatherer 106 may access each repository in the test taker's work history through the authentication and data collection mechanisms described above, retrieving temporal sequences of code modifications, commit metadata, and cross-file dependency relationships from each repository independently before combining the collected data for integrated processing. The context gatherer 106 may identify the set of repositories associated with a given test taker through version control platform APIs that return all repositories to which the test taker has made contributions, filtering the returned repository list to include repositories in which the test taker has made a threshold number of commits sufficient to provide meaningful skill evidence, and excluding repositories in which the test taker's contribution history is too limited to support reliable skill assessment.

The context gatherer 106 may construct an integrated temporal knowledge graph by merging the temporal sequences of code modifications collected from multiple version control repositories into a unified timeline based on the commit timestamps associated with each modification across all repositories. The integration process may treat commits from different repositories as elements of a single chronological sequence ordered by their commit timestamps, enabling the integrated temporal knowledge graph to represent the complete temporal progression of the test taker's skill development across all projects simultaneously rather than as separate per-repository skill histories that would obscure cross-project relationships and skill transfer patterns.

The context gatherer 106 may merge the temporal sequences from multiple repositories into the unified timeline by executing a merge sort operation on all commits across all repositories using commit timestamps as the sort key, producing a single chronologically ordered sequence of commits in which each commit record retains its repository identifier so that the source repository of each commit remains identifiable throughout subsequent processing. The merged timeline may be provided to the context analysis agent 120 for construction of the integrated temporal knowledge graph, which may represent technical concepts from all repositories as concept nodes in a single unified graph structure rather than maintaining separate per-repository graph structures that would prevent identification of cross-repository relationships.

The context analysis agent 120 may identify cross-repository concept relationships within the integrated temporal knowledge graph by analyzing concept nodes whose associated commit records include repository identifiers from two or more different repositories. A technical concept that appears in commit records from multiple repositories may be identified as a cross-repository concept, reflecting that the test taker has applied the concept across different project contexts rather than within a single project environment. The context analysis agent 120 may create cross-repository relationship edges connecting instances of the same technical concept appearing in different repositories, enabling the integrated temporal knowledge graph to represent the test taker's application of shared concepts across multiple project contexts as an interconnected network rather than as isolated per-repository concept nodes.

Cross-repository concept relationships may be identified at multiple levels of specificity. At the concept identifier level, the context analysis agent 120 may identify concepts that share identical technical concept identifiers across repositories, reflecting direct reuse of the same technical concept in multiple project contexts. At the semantic similarity level, the context analysis agent 120 may identify concepts whose embeddings exceed a similarity threshold even where their technical concept identifiers differ, reflecting cases where the test taker has applied functionally equivalent concepts implemented differently across different project contexts. At the pattern level, the context analysis agent 120 may identify recurring code patterns, architectural approaches, and integration strategies that appear across repositories even where the specific technical concepts implementing those patterns differ, reflecting higher-order expertise that manifests consistently across the test taker's work regardless of the specific technical tools employed in each project. Various types of tools may be used; although this description relates to coding, other types of digital tools may be considered for this analysis, with regard to the test taker's experience and expertise.

The context analysis agent 120 may detect knowledge transfer patterns in the integrated temporal knowledge graph by identifying instances where a technical concept first introduced in one repository subsequently appears in a second repository, indicating that the test taker has transferred skills developed in one project context to a different project context. Knowledge transfer detection may be performed by analyzing the first introduction timestamps of concept nodes associated with commits from different repositories, identifying cases where a concept node has a first introduction timestamp associated with a commit from one repository and subsequently appears in commits from a different repository at a later timestamp.

The context analysis agent 120 may characterize each detected knowledge transfer pattern by analyzing the temporal gap between the first introduction of the concept in the source repository and its first appearance in the destination repository, the sophistication of the concept's application in the destination repository relative to its application in the source repository at the time of transfer, and the subsequent development of the concept in the destination repository following its initial appearance. A short temporal gap between source introduction and destination appearance may indicate rapid knowledge transfer reflecting active cross-project skill application, while a longer temporal gap may indicate that the test taker developed sufficient mastery in the source project before applying the concept in a new context. An increase in application sophistication between the source repository at the transfer time and the destination repository's initial application may indicate that the test taker arrived at the destination project with enhanced competency compared to their initial source repository proficiency, reflecting the value of cross-project skill transfer.

The context analysis agent 120 may additionally detect bidirectional knowledge transfer patterns where skills developed in a second repository subsequently appear in enhanced form in the first repository, reflecting that concurrent work across multiple projects has produced mutual skill reinforcement rather than unidirectional transfer. Bidirectional knowledge transfer patterns may be identified by detecting cycles in the cross-repository relationship edges of the integrated temporal knowledge graph where the same technical concept appears with increasing sophistication alternately in two or more repositories across the temporal sequence, indicating that the test taker's work on each project has contributed to skill development that has subsequently enhanced their work on the other project.

The context analysis agent 120 may calculate cross-repository skill consistency scores for technical concepts that appear across multiple repositories by comparing the skill level indicators associated with each concept's appearances in different repository contexts. A cross-repository skill consistency score may reflect the degree to which the test taker applies a given technical concept at a consistent level of sophistication regardless of project context, with high consistency scores indicating that the concept represents a genuinely portable skill that the test taker can reliably apply across diverse project environments, and low consistency scores indicating that the test taker's competency with the concept is context-dependent and may not transfer reliably to new project environments.

The context analysis agent 120 may compute the cross-repository skill consistency score for each cross-repository concept by retrieving the skill level indicator values associated with the concept's appearances in each repository from the integrated temporal knowledge graph and computing the standard deviation of these skill level indicator values across repositories. A low standard deviation may indicate high consistency, reflecting that the test taker demonstrates similar sophistication with the concept regardless of project context. A high standard deviation may indicate low consistency, reflecting that the test taker's competency with the concept varies substantially across project contexts, potentially indicating that their expertise is dependent on specific tooling, team support, or project constraints present in some repositories but not others.

The context analysis agent 120 may additionally compute consistency scores that account for the temporal dimension of cross-repository skill application by comparing skill level indicators associated with the concept's appearances in different repositories at equivalent points in the test taker's overall development timeline rather than comparing current skill levels across repositories. This temporally adjusted consistency analysis may distinguish between genuine inconsistency in cross-project skill application and apparent inconsistency arising from the natural variation in skill development timelines across projects that were started at different points in the test taker's career, producing consistency scores that more accurately reflect the test taker's actual cross-project transfer capability for each technical concept.

The context analysis agent 120 may identify project-specific specializations by analyzing the integrated temporal knowledge graph to detect technical concepts that appear predominantly or exclusively in commits associated with a single repository, indicating that the test taker has developed focused expertise in technical areas specific to a particular project context. A technical concept may be classified as a project-specific specialization when the proportion of its associated commits originating from a single repository exceeds a specialization threshold, reflecting that the test taker's engagement with the concept is concentrated within a specific project rather than distributed across multiple project contexts.

Project-specific specialization identification may serve multiple purposes in the assessment generation process. Specializations identified within a test taker's current active repository may indicate technical areas where the test taker has developed deep focused expertise that is most relevant to their current professional role, suggesting that assessment questions targeting these specializations will be particularly meaningful for evaluating fitness for positions requiring similar technical focus. Specializations identified within historical repositories that the test taker is no longer actively contributing to may indicate technical areas where expertise was developed but has not been subsequently applied in other project contexts, suggesting that assessment questions targeting these specializations may reveal skills that are present but potentially not currently active in the test taker's professional practice.

The context analysis agent 120 may weight or focus on technical concepts based on their cross-repository breadth, wherein concepts appearing across a greater number of repositories receive higher weights as indicators of transferable skills that the test taker can reliably apply across diverse project contexts. The cross-repository breadth weight for each technical concept may be computed as a function of the number of distinct repositories in which the concept appears, the proportion of the test taker's total repository count represented by the repositories in which the concept appears, and the consistency of the concept's skill level indicators across the repositories where it has been observed. A concept appearing in five of the test taker's seven repositories with consistent skill level indicators across all five repositories may receive a substantially higher cross-repository breadth weight than a concept appearing in only one or two repositories, reflecting stronger evidence that the concept represents a genuinely portable skill rather than a project-specific competency.

The context analysis agent 120 may apply cross-repository breadth weights when transmitting skill level indicators for extracted technical concepts to the question generation agent 122, enabling the question generation agent 122 to prioritize assessment questions targeting high-breadth concepts that represent the test taker's most transferable skills. Assessment questions targeting high cross-repository breadth concepts may be particularly valuable for organizations seeking to evaluate the test taker's ability to contribute effectively in new project contexts different from those represented in their work history, since these concepts represent skills the test taker has demonstrated the ability to apply across multiple diverse project environments.

The question generation agent 122 may generate cross-project assessment questions that evaluate the test taker's ability to apply technical concepts demonstrated across multiple repositories in novel project contexts. Cross-project assessment questions may test the application of concepts demonstrated across multiple repositories by presenting the test taker with scenarios that combine technical concepts from different repository contexts in ways that require integrated understanding rather than isolated application of any single concept. The question generation agent 122 may identify combinations of cross-repository concepts that have co-appeared in the test taker's work history across multiple repositories and generate questions that require the test taker to apply these concepts in combination within a unified scenario, assessing whether the test taker's cross-repository breadth reflects genuine integrated competency or parallel but unconnected skill development.

Cross-project assessment questions may evaluate knowledge transfer capability by presenting technical concepts in novel project contexts that differ from the repositories in which the concepts were originally demonstrated. The question generation agent 122 may generate knowledge transfer assessment questions by identifying high cross-repository breadth concepts from the integrated temporal knowledge graph and constructing question scenarios that situate those concepts within project contexts whose characteristics differ from any repository in the test taker's work history, requiring the test taker to demonstrate that their competency with the concept is genuinely transferable rather than dependent on the specific project environment in which it was developed. The question generation agent 122 may additionally generate questions that assess consistency of skill application across different project types by presenting the same technical concept in multiple question scenarios reflecting different project contexts and evaluating whether the test taker's responses demonstrate consistent sophistication across all scenarios.

The output generator 116 may produce cross-repository analysis reports as part of the formatted assessment output for assessments generated from integrated temporal knowledge graphs constructed from multiple repositories. Each cross-repository analysis report may identify three categories of skill evidence derived from the integrated temporal knowledge graph analysis performed by the context analysis agent 120.

A first category in the cross-repository analysis report may identify portable skills demonstrated consistently across multiple projects, comprising technical concepts whose cross-repository skill consistency scores exceed a portability threshold and whose cross-repository breadth weights reflect appearances across a substantial proportion of the test taker's total repository count. The portable skills section of the report may present each identified portable skill together with its cross-repository breadth weight, its mean skill level indicator across repositories, its consistency score, and the identifiers of the repositories in which it has been demonstrated, providing organizations with specific evidence of the test taker's most transferable technical competencies.

A second category in the cross-repository analysis report may identify project-specific skills demonstrated solely within particular repositories, comprising technical concepts whose cross-repository breadth weights reflect concentration in a single repository and whose specialization classification identifies them as project-specific rather than portable competencies. The project-specific skills section of the report may present each identified specialization together with the repository identifier of the project in which it was developed, the skill level indicator demonstrated within that project, and the temporal metadata indicating when the specialization was developed and most recently active, providing organizations with specific evidence of the test taker's focused expertise areas and the project contexts in which that expertise was developed.

A third category in the cross-repository analysis report may identify skill transfer trajectories showing how skills developed in one project context were subsequently applied in different project contexts. Each skill transfer trajectory entry in the report may identify the technical concept involved in the transfer, the source repository in which the concept was first introduced, the destination repository or repositories in which the concept subsequently appeared, the temporal gap between source introduction and destination appearance, and the change in skill level indicator between the source repository at the time of transfer and the destination repository following transfer. The skill transfer trajectory section may provide organizations with evidence of the test taker's ability to acquire skills in one context and apply them productively in new contexts, representing a direct measure of learning agility that assessments based on single-repository analysis cannot capture.

The system controller 110 may implement parallel processing of large-scale test taker work data by partitioning the temporal sequence of commits collected by the context gatherer 106 into multiple processing batches based on temporal windows, wherein each processing batch corresponds to a defined time period within the overall temporal span of the test taker's version control history. The system controller 110 may determine the temporal window boundaries for each processing batch by dividing the overall temporal span of the available commit history into equal or weighted time periods, with each time period representing a distinct phase of the test taker's skill development that can be analyzed independently before the resulting partial temporal knowledge graphs are merged into an integrated whole.

The system controller 110 may instantiate multiple instances of the context analysis agent 120 to process the partitioned temporal windows in parallel, wherein each instance receives a different processing batch corresponding to a different temporal window of the test taker's commit history. Each context analysis agent instance may process its assigned temporal window independently, constructing a partial temporal knowledge graph representing the technical concepts introduced, developed, and refined within its assigned time period without requiring coordination with other context analysis agent instances during the processing phase. The system controller 110 may distribute processing batches to available context analysis agent instances based on agent capacity signals received through the adaptive task allocation mechanism, ensuring that processing batches are assigned to instances with available processing capacity and that no single instance is assigned a disproportionate share of the total processing workload.

The system controller 110 may collect the partial temporal knowledge graphs produced by each context analysis agent instance upon completion of processing for each assigned temporal window batch, accumulating partial graphs until all processing batches have been processed and partial graphs representing all temporal windows are available for merging. The system controller 110 may coordinate the collection of partial temporal knowledge graphs through the asynchronous message queue system, receiving partial result messages from each context analysis agent instance that carry the partial temporal knowledge graph produced for the assigned batch together with confidence scores indicating the reliability of the partial graph and completion percentages indicating processing progress.

The system controller 110 may merge the collected partial temporal knowledge graphs into the integrated temporal knowledge graph through a multi-stage merging process that addresses three categories of integration challenges arising from the independent parallel processing of temporally adjacent batches. A first merging stage may identify overlapping concept nodes appearing in multiple partial temporal knowledge graphs, wherein the same technical concept has been represented as a concept node in the partial graphs produced by two or more context analysis agent instances processing temporally adjacent batches. Concept node overlap may occur when a technical concept was introduced in one temporal window and continued to be used and refined in subsequent temporal windows, resulting in the same concept being represented in the partial graphs of all instances whose assigned batches include commits involving the concept. The system controller 110 may identify overlapping concept nodes by comparing technical concept identifiers across all collected partial temporal knowledge graphs and flagging concept nodes sharing identical identifiers as candidates for merging.

The system controller 110 may resolve conflicts in skill level indicators for overlapping concept nodes by applying a temporal priority rule that prioritizes the skill level indicator values derived from the most recent temporal window batch over those derived from earlier batches. When two partial temporal knowledge graphs contain concept nodes with the same technical concept identifier but different skill level indicator values, the system controller 110 may retain the skill level indicator value from the partial graph whose assigned temporal window ends most recently, reflecting that the most recent assessment of the test taker's competency with a given concept provides a more accurate representation of their current skill level than assessments derived from earlier temporal windows. The system controller 110 may additionally compute a merged proficiency score for each overlapping concept node by combining the proficiency scores from all partial graphs containing the concept, weighting each partial score by the temporal recency of the associated batch to produce a merged proficiency score that reflects the full history of the test taker's engagement with the concept while emphasizing the most recent evidence of their current competency.

The system controller 110 may create cross-boundary temporal edges connecting concept nodes from different processing batches to maintain temporal continuity across the batch boundaries introduced by the partitioning process. Cross-boundary temporal edges may be required when the analysis of a concept node in one batch reveals temporal relationships to concept nodes in adjacent batches that would not be represented in either partial graph independently, such as prerequisite relationship edges connecting a concept introduced in one batch to a concept first introduced in a subsequent batch, or refinement progression edges connecting the early refinement events of a concept recorded in one batch to the later refinement events recorded in a subsequent batch. The system controller 110 may identify required cross-boundary temporal edges by analyzing the first introduction timestamps and most recent usage timestamps of concept nodes near the temporal boundaries of each batch and comparing these timestamps against the concept nodes in adjacent batch partial graphs to detect relationships that span batch boundaries.

The system controller 110 may validate the merged temporal knowledge graph for consistency and completeness following the merging process to ensure that the integration of multiple partial graphs has produced a coherent unified representation of the test taker's complete skill progression history. Consistency validation may verify that all temporal edges in the merged graph connect concept nodes whose temporal metadata is consistent with the direction and type of the edge, confirming that prerequisite relationship edges connect earlier concept nodes to later ones, that refinement progression edges follow chronological order, and that mastery indicator edges are associated with concept nodes whose proficiency scores reflect the sustained high-quality application characteristic of mastered concepts. Completeness validation may verify that concept nodes representing technical concepts appearing in multiple partial graphs have been successfully merged into single unified nodes with complete temporal metadata spanning the full range of the test taker's engagement with each concept, and that cross-boundary temporal edges have been created for all relationships spanning batch boundaries identified during the merging process. The system controller 110 may transmit the validated merged temporal knowledge graph to the multi-agent orchestra 108 for assessment question generation, or may identify and resolve any consistency or completeness failures detected during validation before transmitting the graph.

The system controller 110 may implement dynamic scaling of the multi-agent orchestra 108 by continuously monitoring processing time metrics and agent capacity utilization during assessment generation operations and adjusting the number of active agent instances in response to detected performance conditions. The dynamic scaling mechanism may enable the system to process large-scale test taker work data comprising more than one thousand commits, more than one hundred thousand lines of code, and temporal spans exceeding one year of development history without degradation of assessment generation performance, by automatically expanding processing capacity when workload demands exceed the capacity of the current agent population and contracting capacity when workload demands fall below the level required to maintain productive utilization of all active instances.

The system controller 110 may detect performance bottlenecks by monitoring the capacity signals transmitted by each agent in the multi-agent orchestra 108 and identifying agents whose current processing load values have remained at or above a high utilization threshold for a sustained monitoring period. An agent whose capacity signal consistently reports a current processing load at or above the high utilization threshold across multiple consecutive capacity signal transmissions may be identified as a performance bottleneck, indicating that the agent is operating at maximum capacity and that additional processing work assigned to it will be queued rather than immediately processed, contributing to increased overall assessment generation latency. The system controller 110 may additionally monitor the overall processing time for generating candidate assessment questions from submission of test taker work data to production of validated assessment outputs, comparing observed processing times against target completion time thresholds to detect when aggregate system performance has degraded below acceptable levels even in the absence of individual agent bottlenecks.

Upon detecting a performance bottleneck at a specific agent, the system controller 110 may instantiate one or more additional instances of the bottlenecked agent type by allocating computational resources from the available resource pool and initializing new agent instances with the current operational parameters configured for that agent type, including the prompt weights, difficulty calibration offsets, relevance thresholds, and bias detection rules currently deployed to existing instances of the same agent type. The system controller 110 may distribute workload to newly instantiated agent instances through the adaptive task allocation mechanism by including the new instances in the capacity signal monitoring process and making them eligible to receive task assignments through the task allocation scoring process, enabling the new instances to begin receiving processing work immediately upon initialization without requiring manual configuration or explicit task assignment by system administrators.

The system controller 110 may deactivate agent instances when capacity utilization across all instances of a given agent type falls below a low utilization threshold, indicating that the current workload no longer requires the full processing capacity represented by the active instance population. Upon detecting sustained low utilization across multiple agent instances of the same type, the system controller 110 may select one or more instances for deactivation by identifying instances with the lowest historical performance metrics and fewest currently assigned tasks, transmitting deactivation notifications to the selected instances through the asynchronous message queue system, and waiting for the selected instances to complete their currently assigned tasks before releasing their allocated computational resources. The deactivation process may preserve the operational parameters and processing history of deactivated instances in versioned storage so that they can be reactivated with their accumulated specialization intact if future workload increases require expansion of processing capacity.

The multi-agent orchestra 108 may operate in a distributed computing environment comprising multiple computing nodes networked together, enabling the system to process large-scale test taker work data that exceeds the processing capacity or memory capacity of any single computing node. The distributed computing environment may comprise a cluster of computing nodes interconnected through a high-bandwidth network fabric that enables low-latency communication between nodes, supporting the asynchronous message passing and shared memory access operations required for coordinated multi-agent operation across distributed hardware.

The distributed computing environment may implement a distributed message passing infrastructure that routes messages between agents operating on different computing nodes through a network-aware extension of the asynchronous message queue system. The distributed message passing infrastructure may maintain logical agent queue identifiers that are independent of the physical computing node on which each agent is currently executing, enabling the message routing table to direct messages to the correct logical queue regardless of which physical node hosts the destination agent. The distributed message passing infrastructure may implement message delivery guarantees that ensure messages written to the shared memory queue of an agent on one computing node are reliably delivered to the receiving agent on a different computing node within a bounded latency, maintaining the coordination properties of the asynchronous message queue system across network boundaries.

The distributed computing environment may implement a distributed shared memory system that enables all agents operating across multiple computing nodes to access the temporal knowledge graph and candidate assessment questions from any node in the cluster. The distributed shared memory system may maintain a consistent view of the temporal knowledge graph across all nodes through a distributed caching architecture that replicates frequently accessed graph regions to local memory on each computing node while maintaining a central authoritative copy that receives all write operations and propagates updates to node-local caches within a bounded consistency window. This distributed shared memory architecture enables agents on any computing node to perform graph traversal operations on the temporal knowledge graph using locally cached graph data for read operations while ensuring that write operations that update concept node fields or create new temporal edges are reflected in the authoritative copy and subsequently propagated to all node-local caches.

The parallel processing and dynamic scaling capabilities of the system may enable the multi-agent orchestra 108 to process large-scale test taker work data that conventional sequential assessment generation systems cannot handle within acceptable time constraints. The system may process test taker work data comprising more than one thousand commits by distributing the commit history across multiple temporal window batches assigned to parallel context analysis agent instances, with each instance independently constructing a partial temporal knowledge graph for its assigned batch while other instances simultaneously process their own batches, enabling the total commit processing time to scale with the number of available agent instances rather than with the total commit count. The system may process test taker work data comprising more than one hundred thousand lines of code by leveraging the distributed shared memory architecture to store and access large code repositories from multiple computing nodes simultaneously, enabling parallel code analysis operations that would exceed the memory capacity of any single computing node to be distributed across the available node cluster. The system may process test taker work data spanning temporal ranges exceeding one year of development history by partitioning the multi-year commit history into temporal window batches whose individual sizes are calibrated to the processing capacity of individual context analysis agent instances, enabling the full temporal span of a long-term work history to be analyzed through parallel batch processing rather than sequential processing of a single unified commit stream whose length would impose prohibitive processing latency.

Furthermore, the multi-agent orchestra 108 comprises a sophisticated coordination architecture that enables specialized processing through distributed artificial intelligence agents. The system controller 110 functions as a central coordination hub that manages bidirectional communication pathways with multiple specialized agents operating within the multi-agent orchestra 108. The system controller 110 may establish dedicated communication channels with each agent to facilitate task distribution and result aggregation.

The context analysis agent 120 may connect to the system controller 110 through a bidirectional communication pathway that enables the transmission of raw test taker work data and the return of processed conceptual information. In some cases, the context analysis agent 120 extracts programming languages, frameworks, libraries, and technical patterns from source code repositories, commit histories, and documentation. The context analysis agent 120 may identify skill evolution patterns by analyzing temporal sequences of test taker contributions and may generate semantic embeddings that represent the test taker's demonstrated competencies across different technical domains.

For example, analyzing temporal sequences of test taker contributions may support analyzing commit diff patterns. The context gatherer 106 may analyze commit diff patterns across the temporal sequences of code modifications to identify two distinct categories of events. Concept introduction events may be identified by detecting the first occurrence of a technical concept within the temporal sequence, such as the appearance of a new import statement, class definition, or function signature that has not appeared in any prior commit. Concept refinement sequences may be identified by detecting subsequent modifications to previously introduced concepts, such as commits that modify existing classes, functions, or modules in ways that indicate increasing sophistication or complexity of application of the concept. By distinguishing concept introduction events from concept refinement sequences, the context gatherer 106 provides the context analysis agent 120 with temporally structured information about whether a given technical concept represents a newly acquired skill or a skill undergoing active development.

The context gatherer 106 may further extract cross-file dependency relationships from the version control data by analyzing import statements and module references appearing across multiple commits. For each commit in the temporal sequence, the context gatherer 106 may parse import statements, module references, package declarations, and library inclusions to identify which technical concepts, frameworks, and external dependencies are referenced by each file. By tracking these references across multiple commits and multiple files within the same repository, the context gatherer 106 may construct cross-file dependency relationships that identify which technical concepts co-occur across related files and how dependency patterns evolve over time as the test taker's codebase develops. For example, a technical concept that appears as a dependency across multiple files in multiple commits provides stronger evidence of demonstrated competency than a concept appearing in a single file or a single commit, and the extracted cross-file dependency relationships therefore provide the context analysis agent 120 with a more accurate representation of the depth and breadth of the test taker's demonstrated skill set than single-file or single-commit analysis alone would produce.

The context gatherer 106 may identify concept introduction events by detecting the first occurrence of a technical concept within the temporal sequence of commits through analysis of three categories of code constructs. First, the context gatherer 106 may analyze import statements appearing in each commit diff and compare the imported packages, modules, and libraries against all import statements observed in prior commits in the temporal sequence, flagging any import statement that has not appeared in any prior commit as a concept introduction event for the corresponding technical concept. Second, the context gatherer 106 may analyze class definitions appearing in each commit diff and compare class names, inheritance structures, and class-level decorators against all class definitions observed in prior commits, flagging any class definition that has not appeared in any prior commit as a concept introduction event indicating the test taker's first application of the technical concept represented by that class. Third, the context gatherer 106 may analyze function signatures appearing in each commit diff, including function names, parameter types, return types, and decorator patterns, and compare these signatures against all function signatures observed in prior commits, flagging any function signature representing a technical concept that has not appeared in any prior commit as a concept introduction event. By applying these three analyses to each commit diff in sequence from the earliest commit to the most recent commit in the temporal sequence, the context gatherer 106 may construct a chronologically ordered record of concept introduction events that identifies when each technical concept first appeared in the test taker's demonstrated work.

The context gatherer 106 may identify concept refinement sequences by analyzing commit diffs that modify previously introduced technical concepts rather than introducing new ones. For each commit in the temporal sequence following a concept introduction event, the context gatherer 106 may analyze commit diffs that modify existing classes, functions, or modules associated with previously introduced technical concepts. A commit diff that modifies an existing class by adding methods, refining inheritance relationships, or introducing error handling patterns may be identified as a concept refinement event for the technical concept represented by that class. A commit diff that modifies an existing function by adding parameter validation, optimizing algorithmic logic, or integrating the function with additional technical concepts may similarly be identified as a concept refinement event. A sequence of such concept refinement events across multiple commits may be grouped by the context gatherer 106 into a concept refinement sequence that represents the temporal progression of the test taker's application of a specific technical concept from initial introduction through increasingly sophisticated usage. The context gatherer 106 may analyze the commit diffs within each concept refinement sequence to characterize the nature of the refinement, identifying whether successive modifications represent increasing complexity, increasing integration with other concepts, or increasing robustness through error handling and edge case management.

The context gatherer 106 may assign temporal weights to extracted technical concepts based on three criteria that together reflect the current relevance and demonstrated depth of each concept within the test taker's work history. A first criterion comprises recency of usage, wherein technical concepts that have appeared in commits within a recent time window receive higher temporal weights than concepts whose most recent appearance occurred in older commits, reflecting that recently used concepts more accurately represent the test taker's current competency than concepts that have not appeared in recent work. A second criterion comprises frequency of modification, wherein technical concepts that have been modified across a greater number of commits receive higher temporal weights than concepts appearing in fewer commits, reflecting that concepts subject to repeated modification demonstrate sustained engagement and deeper integration into the test taker's work practices. A third criterion comprises complexity progression over time, wherein technical concepts whose associated commit diffs demonstrate increasing code complexity, greater integration with other concepts, and more sophisticated application patterns over the temporal sequence receive higher temporal weights than concepts whose usage complexity has remained static or declined. The context gatherer 106 may compute a combined temporal weight for each extracted technical concept by applying a weighted combination of these three criteria, producing a temporal weight value that the context analysis agent 120 may use to prioritize technical concepts for assessment question generation and to calibrate the skill level indicators assigned to each concept node in the temporal knowledge graph.

The question generation agent 122 may receive processed context information from the system controller 110 and may create candidate assessment questions based on the extracted concepts and exemplar formats. In some cases, the question generation agent 122 operates in parallel with other agents through coordinated task distribution managed by the system controller 110. The question generation agent 122 may utilize large language models to generate multiple question variations and may produce questions in different formats including multiple choice, open-ended, and code completion formats.

The system may implement a multi-agent framework utilizing LangChain with custom agent definitions to coordinate the specialized processing functions within the multi-agent orchestra 108, as a non-limiting example.

The multi-agent orchestra 108 may implement an asynchronous message queue system stored in shared memory that is accessible by all of the plurality of specialized agents operating within the orchestra. Rather than requiring agents to transmit messages directly to one another through synchronous communication calls that would block the sending agent until the receiving agent acknowledges receipt, the asynchronous message queue system may allow each agent to write outgoing messages to shared memory and immediately resume its own processing without waiting for the receiving agent to read or process the message. Each specialized agent may maintain a dedicated queue in the shared memory to which other agents and the system controller may write incoming messages, and from which the agent may read messages according to its own processing schedule. Because the shared memory is accessible by all agents concurrently, no agent is required to establish a direct communication channel with any other specific agent, and the system controller may coordinate inter-agent communication by writing to and reading from agent-specific queues in the shared memory rather than managing individual point-to-point connections. This shared memory architecture enables the plurality of specialized agents to operate concurrently on different aspects of assessment generation while exchanging information through a common infrastructure whose contents are available to any agent at any time without requiring inter-process communication overhead associated with direct agent-to-agent message transmission.

The asynchronous message queue system may implement message routing through a routing table that maps message types to the queue identifiers of the agents designated to receive and process each message type. When an agent or the system controller generates an outgoing message, the message routing table may be consulted to determine which agent queue identifier corresponds to the message type being transmitted, and the message may be written directly to the shared memory queue associated with that identifier without requiring the sending agent to maintain knowledge of the internal state or current processing activity of the receiving agent. This message routing architecture enables the composition of the multi-agent orchestra to be modified by updating the routing table without requiring changes to the message-generating logic of individual agents.

The asynchronous message queue system may further implement priority queuing structures that assign urgency levels to messages written to each agent queue. Messages carrying dependency declarations or blocking condition notifications may be assigned higher urgency levels than messages carrying partial results or intermediate processing outputs, enabling receiving agents to process time-sensitive coordination messages before processing informational messages regardless of the order in which the messages were written to the queue. The priority queuing structure may maintain separate priority tiers within each agent's queue in shared memory, ordering messages within each tier by arrival time while ensuring that higher urgency messages are made available to the receiving agent before lower urgency messages that arrived earlier.

The asynchronous message queue system may further implement serialization protocols that convert agent output data structures into transmittable structured messages suitable for storage in shared memory and retrieval by other agents. Because each specialized agent may represent its internal processing results in data structures specific to its operational function (such as graph objects representing portions of the temporal knowledge graph, scored candidate question records, or validation result objects) the serialization protocols may provide a common conversion layer that transforms these agent-specific data structures into a standardized message format that any receiving agent can deserialize and interpret regardless of the internal data representation used by the originating agent. The serialization protocols may encode message content together with header fields specifying the message type identifier, the originating agent identifier, the destination queue identifier, the assigned urgency level, and a timestamp recording when the message was written to the shared memory queue.

The asynchronous message queue system may support three categories of structured messages that enable coordinated operation among the plurality of specialized agents. Each message category serves a distinct coordination function within the multi-agent orchestra and carries a specific set of data fields that enable receiving agents and the system controller to respond appropriately without requiring synchronous communication with the originating agent.

A first category of structured message comprises dependency declaration messages through which an agent may notify the system controller or another agent that its current processing requires a specific output from another agent before it can proceed. A dependency declaration message may specify the type of output required, the identifier of the agent expected to produce that output, and the processing operation within the declaring agent that is blocked pending receipt of the required output. For example, the question generation agent 122 may transmit a dependency declaration message to the system controller 110 specifying that question generation for a particular technical concept requires completion of concept cluster analysis by the context analysis agent 120 before generation can proceed. The system controller 110 may use received dependency declarations to construct a dependency graph of agent processing requirements, enabling it to sequence task distribution in ways that minimize blocking across the plurality of agents.

A second category of structured message comprises blocking condition messages through which an agent may notify the system controller that it has temporarily suspended processing of a particular task pending receipt of a required output from another agent. A blocking condition message may identify the specific task whose processing has been suspended, the dependency declaration associated with the blocking condition, and one or more alternative processing tasks that the blocked agent is capable of executing while awaiting the required output. Upon receiving a blocking condition message, the system controller 110 may reassign the blocked agent to one of the identified alternative tasks rather than allowing the agent to remain idle, thereby maintaining utilization of available processing capacity across the multi-agent orchestra during periods when inter-agent dependencies prevent certain agents from advancing their primary processing tasks.

A third category of structured message comprises partial result messages through which an agent may transmit intermediate processing outputs to downstream agents before the transmitting agent has completed its full processing task. A partial result message may carry the intermediate processing results produced so far, a confidence score indicating the reliability of the partial results relative to what the final complete output is expected to contain, a completion percentage indicating how far the transmitting agent has progressed toward its final output, and an estimated time to completion for the remaining processing. Upon receiving a partial result message, a downstream agent may evaluate the confidence score and completion percentage to determine whether the partial results are sufficiently reliable to begin downstream processing operations, or whether it should defer processing until additional partial results or the final complete output is received. This capability enables downstream agents to begin processing before upstream agents complete their full output, reducing total assessment generation latency compared to architectures that require complete outputs at each stage before downstream processing may commence.

The structure of each dependency declaration message transmitted through the asynchronous message queue system may comprise four fields that together provide the system controller 110 and receiving agents with the information necessary to coordinate processing dependencies without requiring synchronous communication between the declaring agent and the agent whose output is required. A first field may specify the required output type, identifying the category of processing result that the declaring agent requires from another agent in order to proceed, expressed as a message type identifier that corresponds to an entry in the message routing table so that the system controller 110 can identify which agent is capable of producing the required output. A second field may specify a completion deadline for the required output, expressed as a timestamp or elapsed time value indicating when the declaring agent requires the output to be available in order to maintain its processing schedule, enabling the system controller 110 to assign elevated priority to the dependency-satisfying task when the deadline is imminent.

A third field may specify a priority level indicating the urgency of the dependency relative to other dependencies currently declared by agents in the multi-agent orchestra 108, enabling the system controller 110 to sequence dependency resolution across multiple concurrent dependency declarations according to their relative urgency rather than their order of arrival. A fourth field may specify a fallback strategy that the declaring agent will execute if the required output is not received by the completion deadline, such as proceeding with reduced context, substituting a default value, or requesting an alternative output type from a different agent, enabling the declaring agent to maintain productive operation rather than blocking indefinitely if the required output cannot be produced within the specified deadline. The system controller 110 may parse all four fields of each received dependency declaration message to construct and maintain a dynamic dependency graph representing the current processing interdependencies among all agents in the multi-agent orchestra 108, updating the dependency graph as new dependency declarations are received and as previously declared dependencies are satisfied by the transmission of required outputs.

The structure of each blocking condition message transmitted through the asynchronous message queue system may comprise four fields that together enable the system controller 110 to manage agent utilization during periods when inter-agent dependencies prevent an agent from advancing its primary processing task. A first field may specify an agent identifier that uniquely identifies the agent transmitting the blocking condition message, enabling the system controller 110 to update the capacity signal associated with that agent to reflect its blocked status and to exclude it from task allocation scoring for tasks that require the processing capabilities being withheld pending the awaited output. A second field may specify a dependency identifier that references the specific dependency declaration message associated with the blocking condition, enabling the system controller 110 to correlate the blocking condition with the corresponding entry in the dependency graph and to identify which agent is responsible for producing the output that would resolve the blocking condition.

A third field may specify an estimated blocking duration, expressed as a time value indicating how long the transmitting agent anticipates remaining in a blocked state pending receipt of the required output, enabling the system controller 110 to make informed task allocation decisions about whether to assign alternative tasks to the blocked agent based on whether the estimated blocking duration is sufficient to complete an alternative task before the awaited output becomes available. A fourth field may specify one or more alternative processing tasks that the blocked agent is capable of executing while awaiting the required output, expressed as task type identifiers corresponding to processing operations within the blocked agent's operational specialization that do not depend on the awaited output, enabling the system controller 110 to immediately assign productive work to the blocked agent rather than allowing its processing capacity to remain idle during the blocking period. Upon receiving a blocking condition message, the system controller 110 may evaluate the estimated blocking duration against the expected completion times of the specified alternative processing tasks and may assign the highest-priority alternative task whose expected completion time does not exceed the estimated blocking duration, thereby maintaining productive utilization of the blocked agent's processing capacity throughout the blocking period.

The system controller 110 may receive capacity signals from each agent in the multi-agent orchestra 108 on a continuous basis during operation, wherein each capacity signal comprises four fields that together characterize the transmitting agent's current operational state and processing capabilities with sufficient specificity to enable the system controller 110 to make informed task allocation decisions without requiring direct inspection of each agent's internal processing state.

A first field of each capacity signal may express the transmitting agent's current processing load as a percentage of its maximum processing capacity, computed as the ratio of currently assigned processing work to the maximum processing work the agent is capable of executing simultaneously given its allocated computational resources. An agent currently executing processing tasks that consume fifty percent of its available computational resources may transmit a current processing load value of 0.5, while an agent with no currently assigned tasks may transmit a current processing load value of 0.0 and an agent at full utilization may transmit a value of 1.0. The system controller 110 may use current processing load values to identify agents with available capacity for new task assignments and to avoid routing additional tasks to agents whose current processing load values indicate they are approaching maximum utilization, preventing individual agents from becoming processing bottlenecks that delay overall assessment generation progress.

A second field of each capacity signal may specify the transmitting agent's estimated completion time for its currently assigned tasks, expressed as a timestamp or elapsed time value indicating when the agent anticipates becoming available to accept and begin processing a new task assignment. The estimated completion time field enables the system controller 110 to distinguish between agents that have low current processing load because they have nearly completed their current tasks and will be available for new assignments imminently, and agents that have low current processing load because their current tasks are long-running tasks that have consumed little of their total expected processing time. This distinction enables the system controller 110 to make prospective task allocation decisions that account for anticipated future availability rather than routing all new tasks to currently available agents without regard for which agents will become available in the near future.

A third field of each capacity signal may specify one or more specialized capability indicators that identify the categories of processing tasks the transmitting agent handles most efficiently based on its operational specialization and accumulated processing history within the multi-agent orchestra 108. A specialized capability indicator may identify a specific technical concept domain, question format type, validation category, or refinement operation category for which the transmitting agent has developed processing efficiency through repeated execution of similar tasks. The context analysis agent 120 may transmit specialized capability indicators reflecting the technical concept domains it has most recently and frequently processed, while the question generation agent 122 may transmit specialized capability indicators reflecting the question format types and difficulty levels it has most recently generated with high quality scores. The system controller 110 may use specialized capability indicators to route tasks toward agents whose accumulated specialization makes them most likely to process the tasks efficiently and accurately, enabling specialization to emerge organically from operational history without requiring pre-defined role assignments that fix agent responsibilities at system initialization.

A fourth field of each capacity signal may specify historical performance metrics reflecting the transmitting agent's speed and accuracy on tasks similar to those currently available for assignment. Historical performance metrics may include the mean processing time the agent has required to complete tasks of each type it has processed previously, the mean quality scores achieved by outputs the agent has produced for each task type, and the rate at which the agent's outputs for each task type have passed dual-layer validation without requiring refinement cycles. The system controller 110 may use historical performance metrics to distinguish between agents with similar current processing loads and specialized capability indicators by identifying which agent has demonstrated superior speed and accuracy on the specific task type being allocated, enabling the system controller 110 to route tasks to the agent most likely to produce high-quality outputs efficiently based on demonstrated rather than assumed capability.

The system controller 110 may additionally receive confidence signals from agents in the multi-agent orchestra 108 for specific processing subtasks that are currently available for assignment, wherein each confidence signal expresses a probability score indicating the likelihood that the transmitting agent will successfully complete the specific subtask based on the similarity of the subtask to processing tasks the agent has successfully completed previously. When the system controller 110 makes a new processing subtask available for assignment by writing a task availability notification to the shared memory accessible by all agents, each agent capable of processing the subtask may evaluate the subtask characteristics against its own processing history and transmit a confidence signal to the system controller 110 expressing its assessed probability of successful completion as a numerical value between 0.0 and 1.0.

An agent may compute its confidence score for a specific available subtask by analyzing the similarity between the subtask's technical concept identifiers, required processing operations, and target skill level indicators against the corresponding characteristics of subtasks the agent has successfully completed in its processing history. A subtask involving a technical concept domain, question format type, and skill level range that closely matches subtasks the agent has recently completed with high quality scores and without requiring refinement cycles may receive a high confidence score approaching 1.0, reflecting the agent's assessment that its accumulated experience with similar subtasks makes successful completion highly probable. A subtask involving characteristics less similar to the agent's recent successful processing history may receive a lower confidence score, reflecting greater uncertainty about whether the agent's current operational parameters and specialization are well-matched to the specific requirements of the subtask. The confidence signal mechanism enables the system controller 110 to incorporate each agent's self-assessed capability for each specific subtask into task allocation decisions, complementing the general specialization information carried in capacity signal specialized capability indicators with subtask-specific probability assessments grounded in operational history.

The system controller 110 may calculate a task allocation score for each agent-subtask pairing by combining the capacity signal and confidence signal for that pairing using a weighted scoring function that balances available processing capacity against the probability of successful completion. The weighted scoring function may assign relative weights to the capacity and confidence components of the task allocation score that reflect the system's current operational priorities, wherein the weight assigned to the confidence component may be increased when overall assessment quality metrics indicate that output quality has declined, and the weight assigned to the capacity component may be increased when processing latency metrics indicate that assessment generation is falling behind target completion times.

The capacity component of the task allocation score for a given agent-subtask pairing may be computed from the capacity signal fields as a composite value that reflects both current availability and anticipated future availability. The capacity component may combine the inverse of the current processing load percentage, weighted to reflect immediately available capacity, with a time-discounted function of the estimated completion time for currently assigned tasks, weighted to reflect near-future availability, and with the historical performance metrics for the specific task type, weighted to reflect the agent's demonstrated efficiency on similar tasks. An agent with low current processing load, imminent completion of current tasks, and strong historical performance on the task type being allocated may receive a high capacity component score, while an agent with high current processing load, distant estimated completion time, and limited historical performance on the task type may receive a low capacity component score.

The confidence component of the task allocation score for a given agent-subtask pairing may be taken directly from the probability score transmitted in the agent's confidence signal for the specific subtask, reflecting the agent's own assessment of its likelihood of successful completion. The system controller 110 may apply a recency weighting to confidence scores based on how recently the agent's processing history data underlying the confidence assessment was accumulated, discounting confidence scores derived from processing history that is older than a configurable recency window to account for the possibility that the agent's operational parameters or specialization have shifted since the historical tasks were completed.

The system controller 110 may compute the final task allocation score for each agent-subtask pairing as the weighted sum of the capacity component score and the confidence component score, using the currently configured component weights. Task allocation scores may be computed for all agents capable of processing a given subtask simultaneously, enabling the system controller 110 to compare scores across all eligible agents and route the subtask to the agent with the highest task allocation score for that subtask in a single allocation decision. The system controller 110 may update task allocation scores dynamically as new capacity signals and confidence signals are received from agents during operation, ensuring that routing decisions reflect the most current available information about agent operational state rather than stale assessments that may no longer accurately represent agent availability and capability.

The system controller 110 may dynamically route each available processing subtask to the agent with the highest task allocation score for that subtask by writing a task assignment message to the assigned agent's dedicated queue in the asynchronous message queue system, specifying the subtask identifier, the task type, the technical concept identifiers and skill level indicators associated with the subtask, and any partial results or dependency outputs that the assigned agent should incorporate into its processing of the subtask. Upon receiving a task assignment message, the assigned agent may update its capacity signal to reflect the additional processing load represented by the new assignment and transmit the updated capacity signal to the system controller 110 through the shared memory queue, enabling the system controller 110 to immediately incorporate the updated load information into subsequent task allocation score calculations for other available subtasks.

The dynamic routing mechanism may achieve load balancing across the agents in the multi-agent orchestra 108 as an emergent outcome of routing decisions that consistently direct tasks toward agents with available capacity, without requiring the system controller 110 to implement explicit load balancing logic that redistributes tasks after they have already been assigned. Because the capacity component of the task allocation score penalizes agents with high current processing loads and rewards agents with available capacity, the routing decisions produced by the weighted scoring function naturally distribute processing work across available agents in proportion to their available capacity, preventing individual agents from accumulating disproportionate processing loads while other agents operate below capacity.

The dynamic routing mechanism may additionally achieve specialization emergence among agents in the multi-agent orchestra 108 as an emergent outcome of routing decisions that consistently direct specific task types toward agents that have demonstrated superior confidence and historical performance on those task types. As agents accumulate processing history on specific task types, their confidence scores and historical performance metrics for those task types may improve, causing their task allocation scores for similar future tasks to increase and resulting in a higher probability of being selected for those tasks in subsequent routing decisions. This positive feedback between demonstrated capability and future task assignment may cause individual agents to develop progressively deeper specialization in the task types they process most frequently, producing emergent role differentiation among agents that reflects actual operational capability rather than pre-defined role assignments established at system initialization. The system controller 110 may monitor specialization emergence patterns by tracking the distribution of task type assignments across agents over time and may detect when specialization has produced undesirable concentration of certain task types in a single agent by identifying agents whose specialized capability indicators have converged on a narrow range of task types, enabling the system controller 110 to introduce routing diversity by occasionally assigning tasks to lower-scoring agents to maintain broad operational capability across the multi-agent orchestra 108.

The adaptive task allocation mechanism implemented by the system controller 110 may operate without pre-defined agent role assignments that fix which agent is responsible for which category of processing task throughout the assessment generation process. Unlike conventional multi-agent systems in which each agent is assigned a fixed operational role at system initialization and receives only tasks corresponding to that role regardless of its current processing load or the availability of other agents capable of performing the same task, the system controller 110 of the present invention may route any processing subtask to any agent capable of executing it, as determined by the task allocation score computed from current capacity and confidence signals. This role-agnostic routing architecture provides several technical advantages over fixed role assignment architectures. First, it enables the multi-agent orchestra 108 to continue productive operation when a specific agent becomes unavailable due to high processing load or blocking conditions, by routing tasks that would normally be handled by that agent to other agents with available capacity and sufficient confidence scores for the task type. Second, it enables the orchestra to adapt its effective specialization distribution in response to changing assessment generation workloads without requiring system reconfiguration, as agents naturally accumulate specialization in the task types that are most frequently routed to them based on their evolving capacity and confidence profiles. Third, it eliminates the need for system administrators to pre-configure agent role assignments when deploying the multi-agent orchestra in new assessment generation contexts, reducing deployment complexity while enabling the orchestra to develop task allocation patterns optimized for the specific workload characteristics of each deployment environment.

The structure of each partial result message transmitted through the asynchronous message queue system may comprise four fields that together enable receiving agents to make informed decisions about whether to begin downstream processing based on partial outputs from upstream agents. A first field may carry the intermediate processing results produced by the transmitting agent up to the point of transmission, representing the portion of the agent's complete output that has been produced and validated as of the time the partial result message is generated, and formatted according to the serialization protocol so that receiving agents can deserialize and begin processing the partial results using the same processing logic they would apply to a complete output. A second field may carry a confidence score expressed as a numerical value indicating the reliability of the partial results relative to what the final complete output is expected to contain, reflecting the transmitting agent's assessment of the probability that the partial results accurately represent the characteristics of the final output, wherein a high confidence score indicates that downstream agents can begin processing with high assurance that their processing will not need to be revised when the complete output is received, while a low confidence score indicates that downstream agents should treat partial results as provisional and maintain flexibility to revise their processing upon receipt of the complete output.

A third field may carry a completion percentage expressed as a numerical value indicating the transmitting agent's current progress toward its final complete output, enabling receiving agents to estimate how much additional output will follow the current partial results and to calibrate the extent of downstream processing they should begin based on partial results versus defer until more complete output is available. A fourth field may carry an estimated time to completion for the remaining processing the transmitting agent must perform to produce its final complete output, expressed as a time value that receiving agents may compare against their own processing time requirements to determine whether beginning downstream processing based on partial results will reduce overall assessment generation latency or whether the time savings from early processing initiation are insufficient to justify the potential revision costs if the partial results prove unreliable. The question generation agent 122 may evaluate all four fields of each received partial result message before initiating downstream processing, beginning processing when the confidence score exceeds a minimum reliability threshold and the combination of completion percentage and estimated time to completion indicates that sufficient partial output is available to support productive downstream processing that will reduce total assessment generation latency compared to waiting for the complete output.

The three message types of the message passing protocol may operate as a coordinated system in which dependency declaration messages, blocking condition messages, and partial result messages interact to enable continuous productive operation across the plurality of specialized agents throughout the assessment generation process. When an agent transmits a dependency declaration message identifying a required output and completion deadline, the system controller 110 may increase the priority of the task that will produce the required output based on the urgency level specified in the dependency declaration. If the upstream agent producing the required output transmits partial result messages before completing the full output, the downstream agent that declared the dependency may evaluate the partial result confidence scores and completion percentages to determine whether to begin processing the partial results rather than waiting for the complete output and the blocking condition that would otherwise follow. If the partial result confidence score is insufficient to support downstream processing, the downstream agent may transmit a blocking condition message to the system controller 110 specifying the alternative tasks it can execute during the blocking period together with the estimated blocking duration derived from the estimated time to completion field of the most recently received partial result message. This interaction among the three message types enables the multi-agent orchestra 108 to continuously adapt its processing allocation in response to the evolving state of inter-agent dependencies, maintaining productive utilization of all available agent processing capacity while minimizing total assessment generation latency through opportunistic early processing of high-confidence partial results.

The multi-agent orchestra 108 may implement an adaptive task allocation mechanism through which the system controller 110 dynamically distributes processing subtasks to agents based on their current operational state rather than according to fixed role assignments established at system initialization. The adaptive task allocation mechanism may operate through two categories of signals that agents transmit to the system controller 110 through the asynchronous message queue system on a continuous basis during operation.

A first category of signal comprises capacity signals through which each agent communicates its current processing load to the system controller 110. A capacity signal may express the agent's current processing load as a percentage of its maximum processing capacity, an estimated completion time for currently assigned tasks, one or more specialized capability indicators identifying the categories of processing tasks the agent handles most efficiently based on its operational specialization, and historical performance metrics reflecting the agent's speed and accuracy on similar tasks processed previously. By maintaining current capacity signals from all agents in the multi-agent orchestra 108, the system controller 110 may identify which agents have available processing capacity at any given time and which agents are approaching maximum utilization, enabling it to route incoming subtasks toward agents with available capacity rather than queuing subtasks behind already-loaded agents.

A second category of signal comprises confidence signals through which each agent communicates to the system controller 110 the probability that it will successfully complete a specific available subtask. When the system controller 110 makes a subtask available for assignment, agents that are capable of processing the subtask may transmit confidence signals indicating the likelihood of successful completion based on the similarity of the available subtask to processing tasks the agent has successfully completed previously. An agent that has recently processed a large number of subtasks involving a particular technical concept or question format may transmit a higher confidence signal for subtasks involving similar concepts or formats than an agent that has processed fewer such subtasks, reflecting its greater accumulated experience with that category of processing work.

The system controller 110 may calculate a task allocation score for each agent-subtask pairing by combining the capacity signal and confidence signal for that pairing using a weighted scoring function, wherein agents with greater available capacity and higher confidence scores receive higher task allocation scores for a given subtask. The system controller 110 may then route each subtask to the agent with the highest task allocation score for that subtask, dynamically adjusting routing decisions as capacity signals and confidence signals are updated by agents during operation. This adaptive routing enables the multi-agent orchestra 108 to achieve load balancing across available agents while simultaneously directing subtasks toward agents most likely to process them successfully, without requiring the system controller 110 to maintain pre-defined role assignments that fix which agent is responsible for which category of subtask throughout the assessment generation process.

Primary language model operations may be powered by advanced models including GPT-4, Claude 3, or open-source alternatives such as Mixtral-8x7B, which provide the natural language generation capabilities for question creation and context analysis. The dual-layer validation 112 may incorporate a fine-tuned validator based on DistilBERT or similar transformer architectures, specifically trained on assessment data to perform semantic quality evaluation and relevance scoring. This technical architecture may enable the system to leverage state-of-the-art language models for content generation while maintaining specialized validation capabilities through domain-specific fine-tuning, ensuring that generated assessments meet both structural and semantic quality requirements for educational and professional evaluation purposes.

Furthermore, the quality assurance agent 124 may evaluate generated questions through a scoring mechanism that assigns numerical values ranging from 0.0 to 1.0 to each candidate question. The quality assurance agent 124 may communicate scoring results back to the system controller 110 through the established bidirectional pathway. In some cases, the quality assurance agent 124 assesses question clarity, technical accuracy, appropriate difficulty level, and relevance to the test taker's demonstrated skills. The quality assurance agent 124 may apply scoring criteria that include grammatical correctness, conceptual coherence, and alignment with organizational assessment standards.

The validation agent 126 may perform compliance checking to ensure that generated questions conform to predefined schemas and formatting requirements. In some cases, the validation agent 126 verifies structural compliance, field presence, data type consistency, and JSON schema adherence. The validation agent 126 may communicate validation results to the system controller 110, indicating whether each question meets the technical requirements for integration with quiz platforms and assessment systems.

The refinement agent 128 may receive feedback signals from multiple sources within the multi-agent orchestra 108 and may iteratively improve question quality through successive processing cycles. In some cases, the refinement agent 128 incorporates scoring feedback from the quality assurance agent 124, validation results from the validation agent 126, and contextual guidance from the context analysis agent 120. The refinement agent 128 may apply modifications to question phrasing, difficulty calibration, and format consistency based on the aggregated feedback received through the system controller 110.

The refinement agent 128 may receive feedback messages from the quality assurance agent 124 and the validation agent 126 through the asynchronous message queue system, wherein each feedback message carries structured information that enables the refinement agent 128 to identify precisely what aspect of a specific candidate assessment question requires improvement and in what direction improvement should proceed. Each feedback message transmitted to the refinement agent 128 may comprise four fields that together provide the information necessary for the refinement agent 128 to analyze deficiencies and generate targeted refinement strategies without requiring additional communication with the originating agent.

A first field of each feedback message may comprise a question identifier that uniquely identifies the specific candidate assessment question to which the feedback pertains, enabling the refinement agent 128 to associate each received feedback message with the correct question in its current processing queue and to accumulate multiple feedback messages from different agents pertaining to the same question for combined analysis. The question identifier may correspond to the unique identifier assigned to the candidate question when it was first generated by the question generation agent 122, maintaining consistent identification of the question across all agents and processing stages in the multi-agent orchestra 108.

A second field of each feedback message may comprise a feedback type indicator that specifies which aspect of the candidate assessment question the feedback pertains to, expressed as one of six enumerated feedback categories. A feedback type indicator of technical accuracy may indicate that the feedback pertains to whether the question correctly represents the technical concepts, code constructs, APIs, or framework behaviors it references. A feedback type indicator of relevance may indicate that the feedback pertains to whether the question content is sufficiently related to the technical concepts demonstrated in the test taker's temporal knowledge graph. A feedback type indicator of difficulty may indicate that the feedback pertains to whether the cognitive complexity of the question is appropriately calibrated to the test taker's demonstrated skill level for the concepts being assessed. A feedback type indicator of clarity may indicate that the feedback pertains to whether the question is grammatically correct, unambiguously phrased, and sufficiently contextualized for a test taker at the indicated skill level to understand what is being asked. A feedback type indicator of structural validity may indicate that the feedback pertains to whether the question conforms to the required schema, field presence requirements, data type specifications, and format constraints enforced by the first validation layer. A feedback type indicator of semantic validity may indicate that the feedback pertains to whether the question passes the semantic quality requirements enforced by the second validation layer, including duplicate detection, relevance scoring, and skill level alignment verification. The feedback type indicator enables the refinement agent 128 to categorize each received feedback message and apply refinement strategies specifically designed for the identified feedback category rather than applying generic modifications that may address one deficiency while introducing others.

A third field of each feedback message may comprise a specific deficiency description that identifies what aspect of the candidate assessment question is deficient within the category identified by the feedback type indicator. For a feedback message with a technical accuracy feedback type indicator, the specific deficiency description may identify the particular technical concept, code construct, or factual assertion in the question that is inaccurate and describe the nature of the inaccuracy. For a feedback message with a relevance feedback type indicator, the specific deficiency description may identify the cosine similarity score computed between the question content and the test taker's temporal knowledge graph and specify which concept nodes in the graph the question failed to align with sufficiently. For a feedback message with a difficulty feedback type indicator, the specific deficiency description may identify the discrepancy between the question's assessed cognitive complexity and the skill level indicator of the relevant concept node, specifying whether the question is too difficult or too easy relative to demonstrated competency. For a feedback message with a clarity feedback type indicator, the specific deficiency description may identify the specific phrase, sentence, or structural element of the question that introduces ambiguity, grammatical error, or insufficient context. For a feedback message with a structural validity feedback type indicator, the specific deficiency description may identify the specific schema rule that the question violated, the field or data element that failed validation, and the expected format or value that the field should contain. For a feedback message with a semantic validity feedback type indicator, the specific deficiency description may identify whether the semantic validation failure resulted from duplicate detection, insufficient relevance score, or skill level misalignment, together with the specific metric value that fell below the required threshold.

A fourth field of each feedback message may comprise a suggested refinement direction that provides guidance to the refinement agent 128 on how to address the identified deficiency. The suggested refinement direction may specify whether the deficiency should be addressed by modifying the technical content of the question, adjusting the difficulty level of the question, restructuring the question format, replacing specific parameterizable elements with different content drawn from the temporal knowledge graph, or regenerating the question entirely using different template selection parameters. The suggested refinement direction may be expressed with sufficient specificity to enable the refinement agent 128 to generate a targeted refinement strategy without requiring additional feedback communication, reducing the number of refinement iterations required to produce a question that passes all quality and validation requirements.

The refinement agent 128 may analyze all feedback messages received for a given candidate assessment question before generating a refinement strategy, identifying patterns across multiple feedback messages that indicate whether different agents have reached consistent or contradictory assessments of the question's deficiencies. The feedback analysis process may classify accumulated feedback messages into three categories that guide subsequent refinement strategy generation.

A first category comprises conflicting feedback indicators, which the refinement agent 128 may identify when two or more feedback messages pertaining to the same candidate assessment question provide contradictory suggested refinement directions for related aspects of the question. A conflicting feedback indicator may arise when the quality assurance agent 124 transmits a feedback message with a difficulty feedback type indicator suggesting that the question should be made more challenging, while the validation agent 126 simultaneously transmits a feedback message with a semantic validity feedback type indicator suggesting that the question's skill level alignment score is already too high relative to the test taker's demonstrated competency. When conflicting feedback indicators are identified, the refinement agent 128 may resolve the conflict by comparing the confidence scores associated with each conflicting feedback message, prioritizing the refinement direction suggested by the feedback message with the higher confidence score, and documenting the conflict resolution decision in the refinement strategy so that the quality assurance agent 124 and validation agent 126 can evaluate whether the resolution produced an improvement in the conflicting metrics upon re-evaluation of the refined question.

A second category comprises consensus feedback indicators, which the refinement agent 128 may identify when two or more feedback messages pertaining to the same candidate assessment question independently identify the same deficiency category or suggest compatible refinement directions. When consensus feedback indicators are identified across feedback messages from multiple agents, the refinement agent 128 may treat the identified deficiency as a high-confidence finding that the refinement strategy should prioritize addressing, since independent identification of the same deficiency by multiple agents with different evaluation functions provides stronger evidence that the deficiency is genuine and significant than a deficiency identified by only a single agent. The refinement agent 128 may weight consensus feedback indicators more heavily than single-agent feedback messages when allocating modification effort across multiple identified deficiencies in a single refinement cycle.

A third category comprises priority ranking of feedback messages based on the severity of the identified deficiency and the confidence scores transmitted by originating agents. The refinement agent 128 may rank accumulated feedback messages for a given candidate question in descending order of priority by computing a priority score for each feedback message as a function of the severity of the identified deficiency and the confidence score of the originating agent. Deficiency severity may be assessed based on the feedback type category, wherein structural validity failures may be assigned higher severity than difficulty calibration issues because structural validity failures prevent the question from being accepted by the dual-layer validation system regardless of its semantic quality, while difficulty calibration issues may reduce question effectiveness without causing outright rejection. Confidence scores transmitted by originating agents may reflect the degree of certainty with which the agent identified the deficiency, with higher confidence scores increasing the priority assigned to the corresponding feedback message. The refinement agent 128 may process accumulated feedback messages in priority order when generating refinement strategies, ensuring that the most severe and highest-confidence deficiencies are addressed in each refinement iteration before lower-priority issues are considered.

The refinement agent 128 may generate a refinement strategy for each candidate assessment question requiring improvement by synthesizing the results of the feedback analysis process into a structured plan that specifies how the question will be modified in the current refinement iteration. Each refinement strategy may comprise four components that together define what will be changed, how it will be changed, what improvement is expected, and what risks the modification introduces.

A first component of each refinement strategy may specify the specific question elements to be modified in the current refinement iteration, identified by reference to the structural components of the candidate question such as the question stem text, the answer options, the code example embedded in the question, the difficulty level classification field, or the parameterizable elements populated from the temporal knowledge graph. The refinement agent 128 may select question elements for modification based on the feedback messages ranked in the priority order established during feedback analysis, targeting the elements most directly associated with the highest-priority deficiencies identified across all accumulated feedback messages for the question.

A second component of each refinement strategy may specify the modification operations to apply to each identified question element, expressed as specific transformation instructions that the refinement agent 128 will execute to produce the refined question text or data structure. Modification operations may include replacing a technical concept identifier with a different concept from the temporal knowledge graph that better aligns with the test taker's demonstrated skill level, adjusting the difficulty level classification field to a value closer to the skill level indicator of the relevant concept node, restructuring the question stem to eliminate the ambiguous phrasing identified in a clarity feedback message, substituting the code example embedded in the question with a different code example retrieved from a more recent commit in the test taker's work history as a proxy for work timing, or reformatting a field that failed structural validation to conform to the schema specification identified in the structural validity feedback message.

A third component of each refinement strategy may specify the expected improvement in quality scores that the proposed modifications are anticipated to produce for each evaluation criterion affected by the modifications. The refinement agent 128 may estimate expected quality score improvements by analyzing the relationship between the proposed modification operations and the scoring criteria applied by the quality assurance agent 124, drawing on the history of refinement iterations for similar questions to calibrate the magnitude of improvement typically associated with each category of modification operation. Expected quality score improvement estimates enable the refinement agent 128 to evaluate whether a proposed refinement strategy is likely to produce sufficient improvement to justify the refinement iteration, and to compare alternative modification approaches when multiple strategies could potentially address the same deficiency.

A fourth component of each refinement strategy may specify a risk assessment indicating the likelihood that the proposed modifications will introduce new deficiencies in evaluation criteria not currently identified as deficient. The refinement agent 128 may assess modification risk by analyzing whether the proposed modification operations affect question elements that are evaluated by multiple quality criteria simultaneously, wherein a modification that improves performance on one criterion may reduce performance on another. For example, a modification that increases the technical complexity of a question to address a difficulty calibration deficiency may simultaneously reduce the question's clarity score if the increased complexity introduces ambiguity or requires the test taker to apply concepts not well-established in their temporal knowledge graph. The risk assessment component may quantify modification risk as a probability value between 0.0 and 1.0 for each affected quality criterion, enabling the refinement agent 128 to select modification approaches that balance expected improvement against the risk of introducing new deficiencies, and to avoid high-risk modifications when lower-risk alternatives are available that offer comparable expected improvement.

The refinement agent 128 may apply the generated refinement strategy to produce a refined candidate assessment question by executing the specified modification operations on the identified question elements in the order determined by the priority ranking of the corresponding feedback messages. The refinement agent 128 may retrieve the current version of the candidate question from shared memory using the question identifier, apply each modification operation sequentially to produce an updated question data structure, and store the refined question in shared memory under the same question identifier with an incremented refinement iteration counter that tracks the number of modification cycles the question has undergone. The refinement agent 128 may additionally update the question's refinement history record by appending a refinement event entry that documents the feedback messages that motivated the current refinement iteration, the refinement strategy applied, and the specific modification operations executed, creating an auditable record of the refinement process that the system controller 110 and human-in-the-loop calibration component may use to identify systematic patterns in question deficiencies and refinement outcomes across multiple assessment generation sessions.

Following the application of the refinement strategy, the refinement agent 128 may resubmit the refined candidate assessment question to the quality assurance agent 124 and the validation agent 126 for re-evaluation by transmitting resubmission messages to the respective agent queues in the asynchronous message queue system. Each resubmission message may carry the question identifier of the refined question, the current refinement iteration counter value, and a summary of the modification operations applied in the current refinement iteration, enabling the quality assurance agent 124 and validation agent 126 to focus their re-evaluation on the question elements most likely to have changed as a result of the refinement and to compare re-evaluation scores against the scores from the previous evaluation iteration to assess whether the refinement produced the expected improvement.

The refinement agent 128 may terminate iterative refinement of a candidate assessment question when any one of three termination conditions is satisfied, preventing indefinite refinement cycling while ensuring that refinement continues until the question has achieved acceptable quality or until continued refinement is unlikely to produce further improvement.

A first termination condition may be satisfied when the quality scores assigned to the refined question by the quality assurance agent 124 exceed the threshold values for all evaluation criteria and both the first validation layer and the second validation layer pass the refined question without identifying structural or semantic deficiencies. This first termination condition represents successful completion of the refinement process, indicating that the refined question meets all quality and validation requirements and is ready for inclusion in the formatted assessment output produced by the output generator 116. When the first termination condition is satisfied, the refinement agent 128 may transmit an acceptance notification to the system controller 110 identifying the question identifier and the final refinement iteration count, enabling the system controller 110 to route the accepted question to the output generator 116 for inclusion in the formatted assessment.

A second termination condition may be satisfied when the refinement iteration counter for a candidate assessment question reaches a maximum iteration count threshold, indicating that the question has undergone the maximum number of refinement cycles permitted by the system configuration without achieving scores that satisfy the first termination condition. When the second termination condition is satisfied, the refinement agent 128 may transmit a maximum iteration notification to the system controller 110 identifying the question and the accumulated feedback history, enabling the system controller 110 to determine whether to discard the question and request generation of a replacement question from the question generation agent 122 or to route the question for human review through the human-in-the-loop calibration component. The maximum iteration count threshold may be configurable by system administrators to balance the trade-off between refinement thoroughness and assessment generation efficiency, with lower threshold values producing faster assessment generation at the potential cost of lower average question quality and higher threshold values permitting more extensive refinement at the cost of increased generation time.

A third termination condition may be satisfied when the improvement in quality scores between consecutive refinement iterations falls below a minimum improvement threshold, indicating that continued refinement is producing diminishing returns and is unlikely to achieve the quality scores required by the first termination condition through additional modification cycles. The refinement agent 128 may compute the improvement between consecutive iterations as the difference between the overall quality score assigned by the quality assurance agent 124 in the most recent re-evaluation and the overall quality score assigned in the immediately preceding re-evaluation, and may compare this improvement value against the minimum improvement threshold to determine whether meaningful progress is still occurring. When the third termination condition is satisfied, the refinement agent 128 may transmit a diminishing returns notification to the system controller 110 identifying the question, the current quality score, the improvement trajectory across all completed refinement iterations, and a diagnosis of which evaluation criteria have proven most resistant to improvement through the modification operations attempted, providing information that the system controller 110 may use to determine whether alternative generation strategies should be applied to produce a replacement question more likely to achieve the required quality scores.

The parallel processing capabilities of the multi-agent orchestra 108 may enable simultaneous operation of multiple agents on different aspects of assessment generation. In some cases, the context analysis agent 120 may process additional test taker work samples while the question generation agent 122 creates new candidates and the quality assurance agent 124 evaluates previously generated questions. The system controller 110 may coordinate these parallel operations by managing task queues, resource allocation, and inter-agent communication timing to maintain system efficiency and output quality.

The temporal knowledge graph may represent each extracted technical concept as a concept node comprising four data fields that together characterize the test taker's relationship with that concept at any point in time. A first field comprises a concept identifier that uniquely identifies the technical concept represented by the node, such as a hash value or string identifier derived from the concept name, programming language, and framework context in which the concept was first observed. A second field comprises a skill level indicator derived from code complexity metrics associated with the concept, wherein the skill level indicator reflects the sophistication of the test taker's application of the concept as measured by computational complexity analysis of the code constructs associated with the concept across the temporal sequence of commits. The skill level indicator may be expressed as a numerical value on a continuous scale that reflects whether the test taker's usage of the concept demonstrates novice-level recognition, intermediate-level application, advanced-level optimization and integration, or expert-level abstraction and teaching patterns. A third field comprises a proficiency score computed from two components: the frequency with which the concept has appeared across commits in the temporal sequence, and the sophistication of the test taker's application of the concept as observed through progression in the complexity and integration of associated code constructs over time. The proficiency score may be expressed as a numerical value on a continuous scale from 0.0 to 1.0, wherein higher values indicate greater demonstrated mastery of the concept based on the combined evidence of usage frequency and application sophistication. A fourth field comprises temporal metadata recording two timestamps associated with the concept: a first introduction timestamp recording the commit timestamp at which the concept was first identified as a concept introduction event in the temporal sequence, and a most recent usage timestamp recording the commit timestamp of the most recent commit in which the concept appeared, enabling the system to determine both when the test taker first demonstrated the concept and how recently the concept has been active in their work.

The temporal knowledge graph may connect concept nodes through typed temporal edges that represent four categories of relationships between technical concepts as observed across the temporal sequence of commits. A first edge type comprises a prerequisite relationship edge connecting a first concept node to a second concept node when the temporal sequence of commits demonstrates that the test taker introduced and developed the first concept before introducing the second concept, and where the second concept builds upon or incorporates the first concept in the test taker's code, indicating that mastery of the first concept preceded and supported the introduction of the second concept. A second edge type comprises a refinement progression edge connecting earlier and later states of a single concept node when the temporal sequence of commits demonstrates a series of concept refinement events in which the test taker's application of the concept became progressively more sophisticated, more complex, or more integrated with other concepts across successive commits, representing the temporal arc of the test taker's developing mastery of that concept. A third edge type comprises a usage correlation edge connecting two concept nodes when analysis of the temporal sequence reveals that the two concepts co-occur with statistically significant frequency within related commits, indicating that the test taker habitually applies these concepts together and has developed an integrated understanding of their combined application even where no explicit prerequisite relationship exists between them. A fourth edge type comprises a mastery indicator edge connecting a concept node to a mastery state representation when the temporal sequence of commits demonstrates decreasing error rates, decreasing revision frequency, and increasing complexity in the test taker's application of the concept over time, providing evidence that the concept has transitioned from active development to stable demonstrated competency in the test taker's skill profile.

The four typed edge categories enable the temporal knowledge graph to support graph traversal operations that conventional relational database schemas representing equivalent data cannot efficiently perform. A traversal that follows prerequisite relationship edges from a given concept node backward through the graph retrieves the complete set of foundational concepts whose mastery preceded the introduction of the given concept, enabling the system to evaluate whether a test taker's foundational knowledge is sufficiently established to support assessment questions targeting the given concept. A traversal that follows refinement progression edges from the earliest to the most recent state of a concept node reconstructs the complete developmental history of the test taker's engagement with that concept, enabling the system to identify the current stage of skill development and calibrate assessment difficulty accordingly. A traversal that follows usage correlation edges from a given concept node retrieves the set of concepts that the test taker habitually applies in combination with the given concept, enabling the question generation agent 122 to generate assessment questions that reflect the test taker's actual integrated usage patterns rather than testing concepts in artificial isolation. A traversal that identifies concept nodes connected by mastery indicator edges distinguishes fully mastered concepts from concepts currently under active development, enabling the system to focus assessment generation on the boundary of current competency rather than on concepts already demonstrably mastered or concepts not yet encountered.

The context analysis agent 120 may analyze the skill level indicators and proficiency scores stored in concept nodes of the temporal knowledge graph to classify each technical concept into one of four skill progression levels that characterize the test taker's current stage of development with respect to that concept. These four skill progression levels provide a structured taxonomy that the question generation agent 122 may use to calibrate the difficulty and scaffolding of generated assessment questions to match the test taker's demonstrated competency for each specific technical concept.

A first skill progression level comprises novice indicators, which the context analysis agent 120 may identify when the temporal knowledge graph shows that a technical concept has been recently introduced with simple usage patterns. Novice indicators may include a concept node whose first introduction timestamp is recent relative to the overall temporal span of the test taker's work history, a low proficiency score reflecting limited frequency of concept usage, code complexity metrics indicating that the concept has been applied only in straightforward contexts without integration with other concepts, and an absence of refinement progression edges indicating that the test taker has not yet undertaken iterative improvement of their initial application of the concept. A technical concept exhibiting novice indicators represents a skill that the test taker has begun to encounter but has not yet developed through repeated and increasingly sophisticated application.

A second skill progression level comprises intermediate indicators, which the context analysis agent 120 may identify when the temporal knowledge graph shows that a technical concept has been used repeatedly with increasing complexity across multiple commits. Intermediate indicators may include a concept node with a moderate proficiency score reflecting regular frequency of concept usage, code complexity metrics demonstrating that the concept has been applied across a range of contexts of increasing sophistication, one or more refinement progression edges connecting successive states of the concept node and reflecting iterative improvement in the test taker's application of the concept, and usage correlation edges connecting the concept node to a small number of related concepts indicating the beginning of integrated multi-concept application. A technical concept exhibiting intermediate indicators represents a skill that the test taker is actively developing through repeated practice and is beginning to apply in combination with other concepts.

A third skill progression level comprises advanced indicators, which the context analysis agent 120 may identify when the temporal knowledge graph shows that a technical concept has been applied with sophisticated usage including optimization, error handling, and integration with multiple other concepts. Advanced indicators may include a concept node with a high proficiency score reflecting frequent and consistent usage, code complexity metrics demonstrating application of the concept in performance-sensitive contexts with explicit error handling and edge case management, multiple usage correlation edges connecting the concept node to several other advanced-level concept nodes reflecting habitual multi-concept integration, and refinement progression edges spanning an extended temporal range reflecting sustained iterative improvement over time. A technical concept exhibiting advanced indicators represents a skill that the test taker has developed to a level of reliable, sophisticated application across diverse contexts and in combination with multiple other technical concepts.

A fourth skill progression level comprises expert indicators, which the context analysis agent 120 may identify when the temporal knowledge graph shows that a technical concept has been mastered to a level demonstrated by teaching patterns in the test taker's code. Expert indicators may include a concept node with a proficiency score approaching the maximum of the scale reflecting extensive and consistent usage, code complexity metrics demonstrating application of the concept in abstraction layers, reusable helper functions, and comprehensive documentation that indicates the test taker is encoding their knowledge of the concept for use by others, mastery indicator edges reflecting that the concept has transitioned from active development to stable demonstrated competency, and prerequisite relationship edges to multiple dependent concept nodes reflecting that mastery of this concept has enabled the introduction and development of numerous subsequent concepts. A technical concept exhibiting expert indicators represents a skill that the test taker has internalized sufficiently to structure and communicate for others, representing the highest level of demonstrated competency observable from work history analysis.

The context analysis agent 120 may provide the skill progression level classification for each technical concept to the question generation agent 122 as part of the skill level indicators transmitted through the message passing protocol, enabling the question generation agent 122 to generate assessment questions whose difficulty, scaffolding, and cognitive demands are calibrated to match the specific skill progression level the test taker has demonstrated for each concept being assessed.

The context analysis agent 120 may organize the concept nodes of the temporal knowledge graph into technical concept clusters that group related concepts into coherent technical areas reflecting the structure of the test taker's demonstrated expertise. Each technical concept cluster may comprise a primary concept node representing the core technical area around which the cluster is organized, one or more related concept nodes connected to the primary concept node through temporal edges in the temporal knowledge graph, and a cluster coherence score indicating the degree of semantic relatedness among the concepts within the cluster.

The context analysis agent 120 may identify technical concept clusters by executing a clustering algorithm on the temporal knowledge graph that groups concept nodes based on the density and types of temporal edges connecting them. Concept nodes connected to a common primary concept node through multiple temporal edge types—including prerequisite relationship edges, refinement progression edges, usage correlation edges, and mastery indicator edges—may be grouped into the same technical concept cluster, reflecting that the test taker has demonstrated these concepts in an integrated manner that suggests coherent expertise in a common technical area rather than isolated familiarity with unrelated concepts. The primary concept node of each cluster may be identified as the concept node with the greatest number of outgoing temporal edges to other concept nodes within the cluster, reflecting its role as the foundational concept around which the other clustered concepts have developed in the test taker's work history.

The cluster coherence score for each identified technical concept cluster may be computed by the context analysis agent 120 as a measure of the semantic relatedness of the concepts within the cluster relative to the concepts outside it. The context analysis agent 120 may compute cluster coherence by calculating the mean cosine similarity between the embeddings of all pairs of concept nodes within the cluster and comparing this intra-cluster similarity against the mean cosine similarity between concept nodes within the cluster and concept nodes outside the cluster. A cluster coherence score approaching 1.0 may indicate that the concepts within the cluster are highly semantically related to each other and clearly differentiated from concepts in other clusters, reflecting a well-defined area of technical expertise in the test taker's skill profile. A cluster coherence score approaching 0.0 may indicate that the concepts within the cluster are weakly related to each other or substantially similar to concepts in other clusters, reflecting a less clearly defined area of technical expertise that may represent a broad general familiarity rather than focused depth. The context analysis agent 120 may use cluster coherence scores to weight the technical concept clusters when prioritizing them for assessment question generation, with higher coherence scores indicating clusters that represent more clearly defined areas of demonstrated expertise that are more likely to yield valid and relevant assessment questions.

The context analysis agent 120 may determine a skill density score for each identified technical concept cluster that quantifies the depth of the test taker's expertise in the technical area represented by the cluster. The skill density score may be computed from three components that together characterize the volume, sophistication, and temporal distribution of the test taker's demonstrated engagement with the concepts in the cluster.

A first component of the skill density calculation may comprise a commit count reflecting the total number of commits in the test taker's version control history that involve one or more concepts within the cluster. The context analysis agent 120 may count the commits associated with each concept node in the cluster by querying the temporal knowledge graph for commit identifiers linked to each concept node through the temporal metadata stored in the node's most recent usage timestamp and first introduction timestamp fields, and may aggregate these commit counts across all concept nodes in the cluster while deduplicating commits that involve multiple concepts within the same cluster. A higher commit count may indicate that the test taker has engaged with the concepts in the cluster across a greater number of discrete development activities, providing broader evidence of sustained expertise in the technical area represented by the cluster. Alternatively or additionally, the size of the commits may also be considered, specifically with regard to the diffs (changes and/or additions made by the test taker, associated with a specific commit).

A second component of the skill density calculation may comprise an average code complexity metric computed across the code associated with the concept nodes in the cluster. The context analysis agent 120 may retrieve the code complexity metrics stored in the skill level indicator fields of each concept node in the cluster and compute the mean complexity value across all concept nodes, reflecting the average sophistication of the test taker's application of the clustered concepts. A higher average code complexity metric indicates that the test taker has not only engaged with the concepts in the cluster frequently but has applied them at a level of technical sophistication that reflects genuine depth of expertise rather than superficial familiarity.

A third component of the skill density calculation may comprise a temporal distribution analysis that characterizes how the test taker's engagement with the cluster has been distributed across time. The context analysis agent 120 may analyze the first introduction timestamps and most recent usage timestamps stored in the concept nodes of the cluster to identify active development periods during which commits involving cluster concepts occurred with high frequency, and inactive periods during which no commits involving cluster concepts were recorded. A cluster whose temporal distribution shows sustained engagement across multiple active development periods spanning an extended portion of the test taker's overall work history may receive a higher temporal distribution score than a cluster whose engagement is concentrated in a single brief active period, reflecting that sustained multi-period engagement provides stronger evidence of enduring expertise than a concentrated burst of activity that may represent a single project rather than an established and maintained skill area.

The context analysis agent 120 may compute the final skill density score for each technical concept cluster as a weighted combination of the commit count component, the average code complexity component, and the temporal distribution component, producing a numerical value that reflects the overall depth and breadth of the test taker's demonstrated expertise in the technical area represented by the cluster. The weights assigned to each component may be configurable by system administrators to reflect organizational priorities regarding which aspects of demonstrated expertise are most relevant for assessment generation purposes, with higher weights assigned to the commit count component emphasizing breadth of engagement, higher weights assigned to the average code complexity component emphasizing sophistication of application, and higher weights assigned to the temporal distribution component emphasizing sustained long-term expertise.

The context analysis agent 120 may extract technical concepts from high skill density clusters for prioritization in assessment question generation, wherein high skill density indicates that the test taker has demonstrated deep, sophisticated, and sustained expertise in the technical area represented by the cluster. A technical concept cluster may be classified as high skill density when its skill density score exceeds a high density threshold, reflecting a combination of frequent commit activity, high average code complexity, and sustained engagement across multiple development periods that collectively indicate a well-established area of core technical competency.

High skill density indicators that the context analysis agent 120 may identify within qualifying clusters include frequent usage of related technical concepts across multiple commits and development periods, indicating that the test taker regularly applies the clustered concepts as part of their standard development practice rather than using them only in isolated or experimental contexts. High skill density indicators may additionally include increasing complexity over time in the test taker's application of the technical concepts within the cluster, as evidenced by refinement progression edges spanning extended temporal ranges and by skill level indicators approaching the advanced or expert range for multiple concept nodes within the cluster. High skill density indicators may further include sustained engagement with the technical concepts across multiple distinct time periods in the test taker's work history, as evidenced by temporal distribution analysis showing active development periods distributed across the full temporal span of the available version control data rather than concentrated in a single recent or historical period.

Technical concepts extracted from high skill density clusters may be provided to the question generation agent 122 with skill level indicators derived from the skill density scores and temporal progression patterns within the cluster, enabling the question generation agent 122 to generate assessment questions that target the test taker's areas of deepest demonstrated expertise. Assessment questions generated from high skill density cluster concepts may be calibrated to the advanced or expert skill progression levels appropriate for concepts demonstrating the sophistication and consistency characteristic of high density clusters, ensuring that the assessment challenges the test taker at a level commensurate with their demonstrated depth of expertise in these core technical areas.

The context analysis agent 120 may extract technical concepts from low skill density clusters for remedial question generation, wherein low skill density indicates that the test taker's engagement with the technical area represented by the cluster is limited, inconsistent, or insufficiently developed to represent a reliable area of demonstrated competency. A technical concept cluster may be classified as low skill density when its skill density score falls below a low density threshold, reflecting one or more of the deficiency patterns that indicate areas where the test taker may benefit from targeted assessment and developmental feedback.

Low skill density indicators that the context analysis agent 120 may identify within qualifying clusters include infrequent usage of the clustered technical concepts, reflecting that the test taker has engaged with the concepts in the cluster across only a small number of commits relative to the overall volume of their version control history, suggesting that the concepts represent peripheral rather than core areas of their technical practice. Low skill density indicators may additionally include recent abandonment of the clustered technical concepts, wherein the most recent usage timestamps of concept nodes in the cluster indicate that the test taker engaged with these concepts at an earlier period in their work history but has not applied them in recent commits, suggesting that skills once present may have atrophied through disuse or been superseded by alternative technical approaches. Low skill density indicators may further include a lack of complexity progression in the test taker's usage of the clustered concepts, wherein the skill level indicators of concept nodes in the cluster have remained static across the temporal sequence rather than showing the increasing sophistication characteristic of actively developing skills, suggesting that the test taker has not advanced beyond an initial level of familiarity with the concepts despite having encountered them in their work. Low skill density indicators may additionally include limited engagement with foundational prerequisite concepts for the clustered technical concepts, wherein prerequisite relationship edges connecting the cluster's concept nodes to earlier foundational concepts reveal that the prerequisite concepts have low proficiency scores, suggesting that the test taker lacks the foundational knowledge base necessary to develop deeper expertise in the technical area represented by the cluster.

Technical concepts extracted from low skill density clusters may be provided to the question generation agent 122 with skill level indicators derived from the skill density scores and proficiency scores of the individual concept nodes within the cluster, enabling the question generation agent 122 to generate remedial assessment questions calibrated to the novice or intermediate skill progression levels appropriate for the limited demonstrated competency characteristic of low density clusters. Remedial questions generated from low skill density cluster concepts may focus on concept recognition and foundational application rather than sophisticated integration or optimization, providing assessment content that identifies gaps in the test taker's skill profile and generates evaluation data that organizations may use to design targeted development programs addressing the identified deficiency areas.

The context analysis agent 120 may provide extracted technical concepts from both high skill density and low skill density clusters to the question generation agent 122 through the message passing protocol, transmitting skill level indicators derived from skill density scores and temporal progression patterns within each cluster alongside the concept identifiers. The skill level indicators transmitted for concepts extracted from high skill density clusters may reflect the advanced or expert level classifications appropriate for concepts demonstrating deep and sustained mastery, while the skill level indicators transmitted for concepts extracted from low skill density clusters may reflect the novice or intermediate level classifications appropriate for concepts demonstrating limited or inconsistent engagement. The context analysis agent 120 may additionally transmit the cluster coherence scores associated with each extracted concept's parent cluster, enabling the question generation agent 122 to weight the reliability of the skill level indicators by the coherence of the cluster from which the concept was extracted, with higher coherence scores indicating that the skill level indicator is based on a well-defined and internally consistent cluster of related concepts rather than a loosely associated grouping whose collective skill density score may be less representative of the test taker's actual expertise in any specific technical area.

The context analysis agent 120 may organize the extracted technical concepts into a prioritized concept list before transmitting them to the question generation agent 122, ordering the concepts by a combination of cluster skill density score, individual concept proficiency score, and cluster coherence score to reflect both the depth of demonstrated expertise and the reliability of the skill assessment for each concept. Concepts from high skill density, high coherence clusters with high individual proficiency scores may be positioned at the top of the prioritized concept list, indicating that assessment questions targeting these concepts are most likely to produce valid, relevant, and well-calibrated evaluations of the test taker's demonstrated competency. Concepts from low skill density clusters may be positioned in the prioritized concept list at positions reflecting their diagnostic value for identifying skill gaps, enabling the question generation agent 122 to generate a balanced assessment that evaluates both areas of demonstrated strength and areas of identified developmental need within a single cohesive assessment output.

The question generation agent 122 may receive skill level indicators, as well as other outputs described above, from the context analysis agent 120 through the message passing protocol, wherein the skill level indicators express the test taker's demonstrated competency for each technical concept as a numerical score on a continuous scale from 0.0 to 1.0. The numerical scale may be divided into four ranges corresponding to the four skill progression levels identified by the context analysis agent 120. Scores in the range of 0.0 to 0.3 may indicate novice level competency, reflecting that the technical concept has been recently introduced with limited usage frequency and simple application patterns. Scores in the range of 0.3 to 0.6 may indicate intermediate level competency, reflecting that the technical concept has been used repeatedly with increasing complexity and beginning integration with other concepts. Scores in the range of 0.6 to 0.8 may indicate advanced level competency, reflecting sophisticated application of the technical concept including optimization, error handling, and integration with multiple other concepts. Scores in the range of 0.8 to 1.0 (or approaching 1.0) may indicate expert level competency, reflecting mastery of the technical concept demonstrated through teaching patterns including abstraction layers, reusable helper functions, and comprehensive documentation. The question generation agent 122 may use these numerical skill level scores to select appropriate question templates, calibrate question difficulty, and determine the appropriate scaffolding level for generated assessment questions, ensuring that generated questions target the specific competency level the test taker has demonstrated for each technical concept rather than applying a generic difficulty level across all questions in the assessment.

The question generation agent 122 may access a question template repository stored in memory, wherein the question template repository comprises a database or indexed data structure storing a plurality of question template records. Each question template record in the repository may store the information necessary for the question generation agent 122 to select an appropriate template for a given technical concept and skill level, populate the template with concept-specific content derived from the test taker's work history, and generate a candidate assessment question whose structure, difficulty, and scaffolding are calibrated to the test taker's demonstrated competency.

Each question template record may comprise six fields that together define the structure, compatibility, and evaluation characteristics of the template. A first field comprises a template identifier that uniquely identifies the question template record within the repository, enabling the question generation agent 122 to reference specific templates in message passing communications with other agents and to track which templates have been used in generating previously validated questions. A second field comprises a question structure string containing the fixed text portions of the question together with parameterizable element markers enclosed in delimiters that indicate positions within the question structure where variable content specific to the test taker's work history should be inserted during question generation. A third field comprises a difficulty level classification encoded as a numerical value on the 0.0 to 1.0 skill level scale, indicating the cognitive complexity required to answer questions generated from the template and enabling the question generation agent 122 to match templates to the skill level scores received from the context analysis agent 120. A fourth field comprises required technical concept type specifications that define which categories of technical concepts are compatible with the template, enabling the question generation agent 122 to verify that a candidate template is applicable to the specific technical concept being assessed before selecting it for question generation. A fifth field comprises answer evaluation criteria that specify expected answer patterns, acceptable answer variations, and scoring rubrics that the output generator 116 may include in the formatted assessment output alongside the generated question. A sixth field comprises scaffolding level indicators that specify the amount of pre-filled code, contextual hints, or structural guidance that the template provides to the test taker, enabling the question generation agent 122 to select templates whose scaffolding level matches the support appropriate for the test taker's demonstrated skill level for the concept being assessed.

The question generation agent 122 may execute a template selection process that compares the numerical skill level score from the received skill level indicators against the difficulty level classifications stored in question template records in the repository. The template selection process may filter question templates to identify candidate templates whose difficulty level classifications fall within a threshold range of the target skill level score, verify that the required technical concept type specifications of candidate templates match the technical concept identifiers in the received skill level indicators, compute template suitability scores by combining difficulty matching scores and concept type matching scores for each candidate template, and select one or more question templates having the highest template suitability scores for use in generating candidate assessment questions.

The question generation agent 122 may implement a difficulty calibration process that selects question templates with scaffolding levels matched to the test taker's demonstrated skill progression level for each technical concept being assessed. The scaffolding level of a generated assessment question defines the degree of structural support, pre-filled content, and contextual guidance provided to the test taker within the question itself, with higher scaffolding levels providing greater support appropriate for lower skill levels and lower scaffolding levels requiring greater independent capability appropriate for higher skill levels.

When the numerical skill level score indicates novice level competency in the range of 0.0 to 0.3, the question generation agent 122 may select question templates having scaffolding level indicators specifying high scaffolding. High scaffolding questions may provide complete code frameworks with designated blank sections for the test taker to complete, supply all necessary import statements and variable declarations, and present the technical concept in a context that requires the test taker only to demonstrate recognition of correct syntax, identification of standard library functions, or matching of concepts to definitions. High scaffolding reduces the cognitive load associated with question structure so that the assessment focuses on whether the test taker can correctly identify and apply a concept they have recently encountered rather than requiring them to construct a complete implementation independently.

When the numerical skill level score indicates intermediate level competency in the range of 0.3 to 0.6, the question generation agent 122 may select question templates having scaffolding level indicators specifying partial scaffolding. Partial scaffolding questions may provide function signatures and data structure definitions but require the test taker to implement the logical content of the function, integrate multiple concepts to produce a working solution, or identify and correct errors in provided code that requires application of the concept being assessed. Partial scaffolding questions target the test taker's ability to apply a concept they have demonstrated repeated usage of, requiring active implementation rather than mere recognition while still providing structural context that focuses the assessment on the specific concept being evaluated.

When the numerical skill level score indicates advanced level competency in the range of 0.6 to 0.8, the question generation agent 122 may select question templates having scaffolding level indicators specifying minimal scaffolding. Minimal scaffolding questions may provide only a statement of requirements and applicable constraints without supplying code structure, framework setup, or implementation guidance, requiring the test taker to independently construct a solution that optimizes performance, handles edge cases, or integrates multiple technical concepts to satisfy the stated requirements. Minimal scaffolding questions target the test taker's ability to apply a concept with the sophistication they have demonstrated in their work history, requiring them to produce solutions at a level of complexity consistent with their advanced demonstrated competency.

When the numerical skill level score indicates expert level competency in the range of 0.8 to 1.0, the question generation agent 122 may select question templates having scaffolding level indicators specifying no scaffolding. No scaffolding questions may present open-ended architectural or design challenges that require the test taker to define their own solution structure, evaluate trade-offs between alternative technical approaches, design systems that apply the concept at an architectural level, or explain the reasoning behind design decisions in ways that demonstrate internalized mastery rather than procedural application. No scaffolding questions target the teaching-pattern indicators identified in expert-level concept nodes in the temporal knowledge graph, assessing whether the test taker can communicate and structure their knowledge of a concept at the level of sophistication their work history demonstrates.

The question generation agent 122 may further populate the parameterizable elements in selected question templates by retrieving specific technical concepts from the temporal knowledge graph, extracting code examples from recent commits in the test taker's work history within a recent time window, and applying complexity modifiers to adjust question difficulty based on the difference between the test taker's current skill level score and the target difficulty level of the selected template. Complexity modifiers encoded as numerical multipliers greater than 1.0 may increase the complexity of populated question content while modifiers less than 1.0 may decrease complexity, enabling fine-grained difficulty adjustment within the scaffolding level appropriate for the test taker's demonstrated competency.

The question generation agent 122 may implement a zone of proximal development targeting process that analyzes the temporal knowledge graph to ensure that generated candidate assessment questions target the boundary of the test taker's current competency rather than concepts already fully mastered or concepts not yet encountered. The zone of proximal development targeting process recognizes that assessment questions most effectively evaluate and promote skill development when they require the test taker to apply established competencies in contexts that extend just beyond their current demonstrated capability, and the process implements this principle through graph traversal operations on the temporal knowledge graph that identify the specific concepts occupying this developmental boundary for each individual test taker.

The question generation agent 122 may identify boundary concepts by executing graph traversal operations on the temporal knowledge graph that extract concept nodes whose proficiency scores fall between 0.5 and 0.8 on the continuous scale. Concept nodes with proficiency scores below 0.5 may indicate concepts the test taker has not yet sufficiently developed to support meaningful assessment, while concept nodes with proficiency scores above 0.8 may indicate concepts the test taker has fully mastered such that assessment questions targeting these concepts would be insufficiently challenging to produce meaningful evaluation data. Concept nodes with proficiency scores in the range of 0.5 to 0.8 may therefore represent the boundary of the test taker's current competency, comprising skills that are actively developing but not yet fully established, and may be identified by the question generation agent 122 as boundary concepts eligible for prioritized targeting in assessment question generation.

For each identified boundary concept node, the question generation agent 122 may analyze the temporal edges connecting the boundary concept node to its prerequisite concept nodes and dependent concept nodes in the temporal knowledge graph. Prerequisite edges connecting the boundary concept node to earlier concept nodes may identify the foundational concepts whose mastery preceded the introduction of the boundary concept, while dependent edges connecting the boundary concept node to later concept nodes may identify concepts that build upon the boundary concept and whose development depends on further mastery of it. This edge analysis enables the question generation agent 122 to evaluate not only the test taker's current proficiency with the boundary concept itself but also the strength of the foundational knowledge supporting it.

The question generation agent 122 may compute a readiness score for each boundary concept by analyzing the proficiency scores of the prerequisite concept nodes connected to the boundary concept node through prerequisite edges in the temporal knowledge graph. The readiness score for a boundary concept may be computed as the mean proficiency score of all concept nodes connected to the boundary concept node through prerequisite edges, reflecting the average strength of the foundational knowledge base supporting the test taker's development of the boundary concept. A boundary concept whose prerequisite concept nodes collectively exhibit a mean proficiency score above a readiness threshold of 0.7 may be identified as a concept for which the test taker's foundational knowledge is sufficiently established to support meaningful assessment, indicating that the test taker has the prerequisite competencies necessary to engage productively with questions targeting the boundary concept. The question generation agent 122 may filter the identified boundary concepts to retain only those with readiness scores above the threshold of 0.7 as target concepts for assessment question generation, ensuring that generated questions do not require foundational knowledge the test taker has not yet sufficiently developed.

The question generation agent 122 may generate candidate assessment questions that require the application of mastered concepts to partially familiar contexts by identifying the intersection between the test taker's fully mastered skills and their boundary concept development areas within the temporal knowledge graph. The question generation agent 122 may identify mastered concepts as concept nodes in the temporal knowledge graph having proficiency scores above 0.8, reflecting skills the test taker has demonstrated at the level of consistent, sophisticated, and independently structured application. The question generation agent 122 may identify partially familiar contexts by executing queries on the code repository database that retrieve code files containing both mastered concept identifiers and target boundary concept identifiers, wherein such files represent contexts in which the test taker has already demonstrated mastery of certain aspects while other aspects associated with the boundary concept remain under active development.

The question generation agent 122 may extract code patterns from the retrieved code files that demonstrate the test taker's usage of mastered concepts in combination with boundary concepts, identifying the specific code constructs, function calls, and integration patterns that characterize the test taker's actual application of both concept categories within the same code context. These extracted code patterns may serve as the basis for populating question templates with content that situates the boundary concept assessment within a code context the test taker has direct familiarity with, requiring the test taker to extend or modify existing code patterns in ways that apply their mastered concepts to solve problems involving the boundary concept. By grounding assessment questions in code patterns drawn from the test taker's actual work history, the question generation agent 122 may generate questions that feel contextually natural to the test taker while targeting the specific developmental boundary where meaningful skill extension can occur.

The question generation agent 122 may implement filtering operations that prevent the generation of candidate assessment questions falling outside the zone of proximal development by applying three rejection criteria to candidate questions before they are transmitted to the quality assurance agent 124 for evaluation.

A first rejection criterion may discard candidate questions that require technical concepts not yet demonstrated in the temporal knowledge graph or demonstrated only at a very early stage of development. The question generation agent 122 may compare the technical concept identifiers referenced in each candidate question against the concept nodes present in the temporal knowledge graph, and may discard candidate questions containing technical concept identifiers that are absent from the temporal knowledge graph entirely or that correspond to concept nodes having proficiency scores below 0.3. A candidate question requiring concepts absent from the temporal knowledge graph would assess skills the test taker has not yet encountered in their work, producing an assessment experience that falls entirely outside the zone of proximal development and that cannot be meaningfully connected to the test taker's demonstrated work history. A candidate question requiring concepts with proficiency scores below 0.3 would similarly target skills too early in their development to support productive assessment engagement.

A second rejection criterion may discard candidate questions that test concepts substantially below the test taker's demonstrated competency level. The question generation agent 122 may compute the mean proficiency score of the test taker across all concept nodes in their skill domain within the temporal knowledge graph, and may identify candidate questions whose difficulty level classification is more than 0.4 below this mean proficiency score. Candidate questions falling more than 0.4 below the test taker's mean proficiency level may be discarded as insufficiently challenging to produce meaningful evaluation data, since they would assess skills the test taker has already demonstrated well beyond the level required to answer the question correctly and would therefore not provide useful information about the test taker's current competency or developmental needs.

A third rejection criterion may retain only candidate questions whose difficulty level falls within a proximity threshold of the test taker's demonstrated competency level for the specific concepts being assessed. The question generation agent 122 may compute a proximity score for each candidate question by calculating the absolute difference between the question's difficulty level classification and the mean proficiency score of the concept nodes associated with the question in the temporal knowledge graph. Candidate questions with proximity scores below a threshold of 0.3 may be retained as appropriately targeted to the zone of proximal development, while candidate questions with proximity scores above this threshold may be discarded as either too easy or too difficult relative to the test taker's current demonstrated capability for the relevant concepts. The proximity score threshold of 0.3 represents a configurable parameter that system administrators may adjust to narrow or widen the band of acceptable question difficulty relative to demonstrated competency, with lower threshold values producing more precisely targeted assessments and higher threshold values permitting greater difficulty variation within the generated assessment set.

The zone of proximal development targeting process may enforce statistical distribution requirements across the set of generated candidate assessment questions to ensure that the overall assessment is appropriately concentrated within the test taker's developmental boundary. At least seventy percent of generated candidate assessment questions may test boundary concepts having proficiency scores between 0.5 and 0.8 in the temporal knowledge graph, ensuring that the majority of the assessment targets the active developmental boundary rather than fully mastered or undeveloped concepts. At least eighty percent of generated candidate assessment questions may test concepts for which the prerequisite concept nodes in the temporal knowledge graph have mean proficiency scores above 0.7, ensuring that the substantial majority of assessment questions target concepts for which the test taker's foundational knowledge is sufficiently established to support productive engagement. No more than ten percent of generated candidate assessment questions may test concepts either not demonstrated in the temporal knowledge graph or having proficiency scores differing by more than 0.4 from the test taker's mean proficiency level across their skill domain, limiting the proportion of questions that fall entirely outside the zone of proximal development to a small minority that may serve comparative or diagnostic purposes within the overall assessment.

The question generation agent 122 may monitor the statistical distribution of generated candidate questions against these thresholds during the generation process and may adjust the targeting of subsequent questions to maintain the required distribution as the assessment set grows. If the proportion of questions targeting boundary concepts falls below the seventy percent threshold as generation proceeds, the question generation agent 122 may prioritize boundary concept targeting for subsequent questions until the distribution is restored. If the proportion of questions for which prerequisite readiness scores exceed 0.7 falls below the eighty percent threshold, the question generation agent 122 may apply more stringent readiness score filtering to subsequent questions. These dynamic distribution adjustments ensure that the completed assessment set satisfies the statistical requirements of the zone of proximal development targeting process regardless of the order in which individual questions are generated during the multi-agent orchestration process.

Figure 2A:
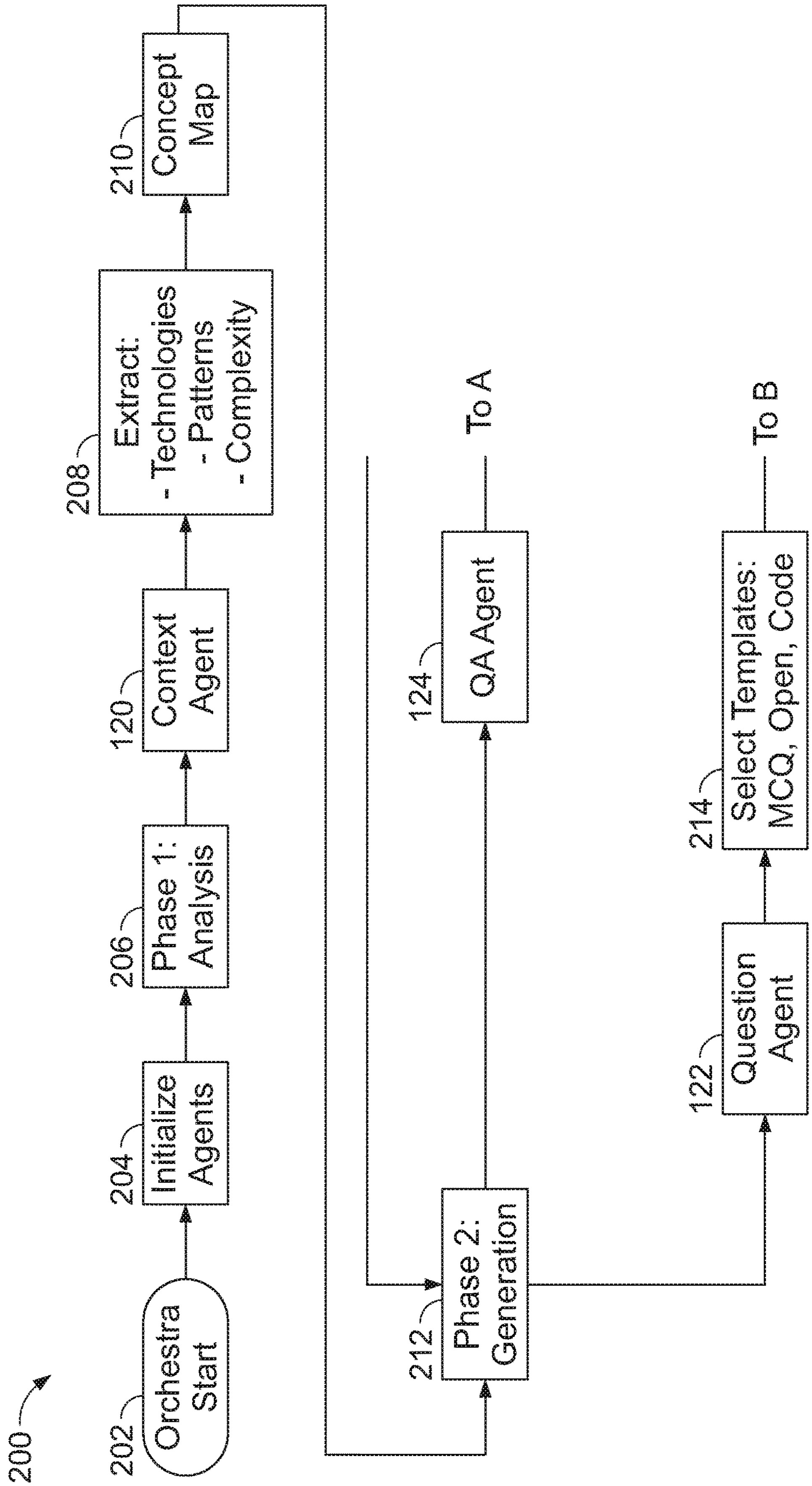
FIG. 2A shows a non-limiting, exemplary flowchart for a method of generating customized assessments through a multi-agent orchestration process according to at least some embodiments of the present invention.

Referring to FIG. 2A, a method 200 illustrates the orchestration process within the multi-agent orchestra 108. The method 200 preferably begins with a step 202 where the orchestration process initiates. The method 200 proceeds to a step 204 where specialized agents within the multi-agent system are initialized for operation.

The method 200 preferably continues to a step 206 representing a first analysis phase. During this phase, the context analysis agent 120 may process test taker work data to extract relevant information. The context analysis agent 120 may operate as a specialized agent that processes and categorizes test taker work history, extracting concepts, frameworks, and patterns from the input data. The method 200 may then advance to a step 208 where specific extraction operations occur, including identification of technologies, patterns, and complexity metrics from the analyzed context.

Following the extraction operations, the method 200 may proceed to a step 210 where the extracted information is organized into a structured concept map. This concept mapping provides a foundation for subsequent question generation activities. The method 200 may then move to a step 212 representing a second generation phase where assessment question creation begins.

From step 212, the method 200 may branch into parallel processing pathways. A first pathway may proceed to the quality assurance agent 124, while a second pathway may proceed to the question generation agent 122. The question generation agent 122 may operate as a specialized agent that creates initial assessment questions using large language models. The method 200 may continue from the question generation agent 122 to a step 214 where specific question templates are selected, including multiple choice questions, open-ended questions, and code-based questions.

With continued reference to FIG. 2A, the quality assurance agent 124 may function as a specialized agent that evaluates question quality and relevance. The quality assurance agent 124 may implement scoring mechanisms that rate generated questions on a scale from 0.0 to 1.0 based on various quality criteria.

Figure 2B:
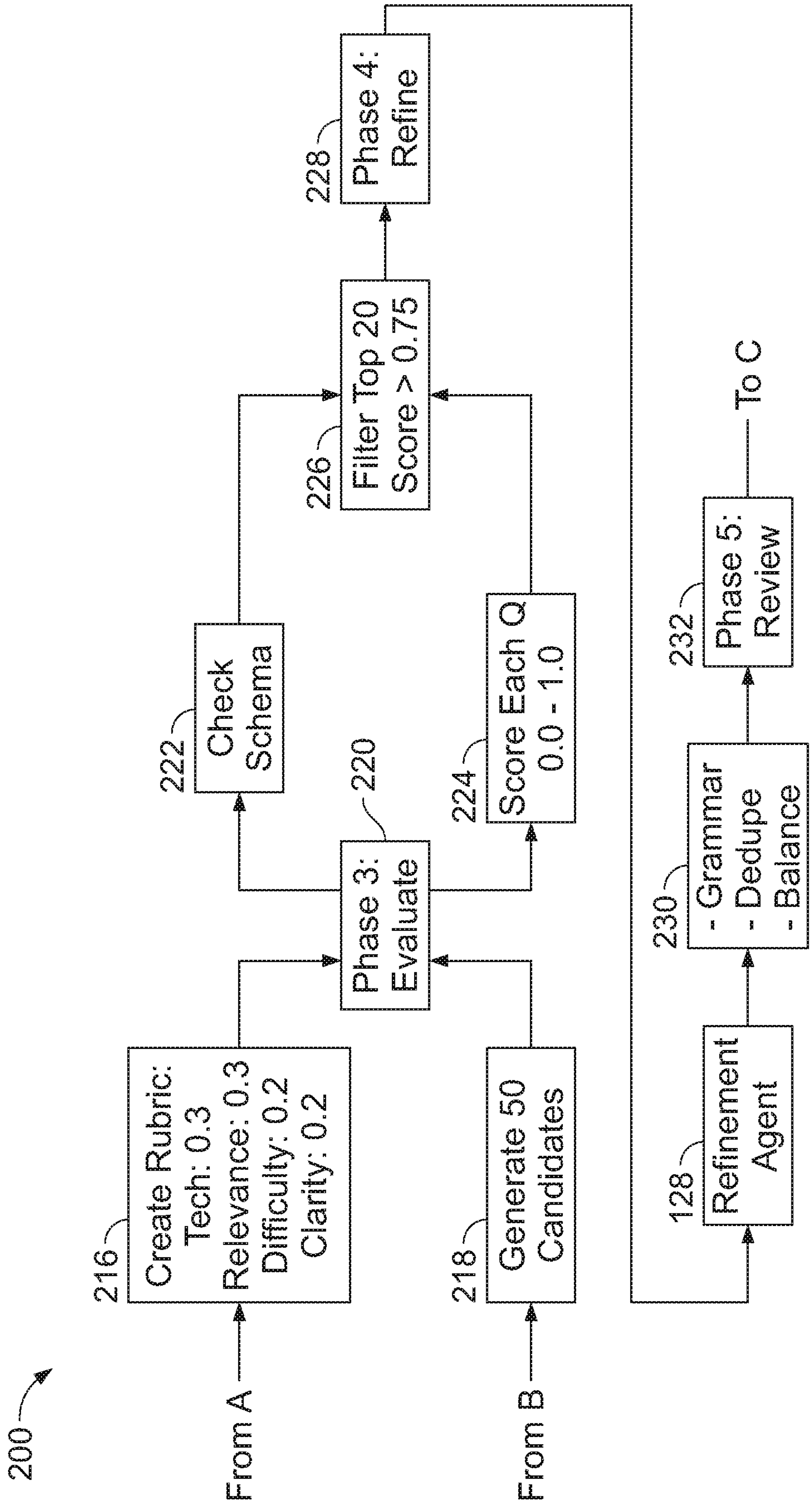
FIG. 2B shows a non-limiting, exemplary flowchart for a method detailing a refinement process within the multi-agent orchestra according to at least some embodiments of the present invention.

The method then proceeds to FIG. 2B. Note that "To A" in FIG. 2A continues to "From A" in FIG. 2B. Similarly, "To B" in FIG. 2A continues to "From B" in FIG. 2B.

Referring to FIG. 2B, the method 200 may continue with inputs from the parallel processing pathways. A step 216 may involve creating evaluation rubrics with specified weighting parameters, including technical accuracy weighted at 0.3, relevance weighted at 0.3, difficulty weighted at 0.2, and clarity weighted at 0.2. This information is preferably obtained from the quality assurance agent 124 shown in FIG. 2A. These weights are intended as examples only and are not meant to be limiting. Simultaneously, a step 218 may involve generating multiple question candidates for subsequent evaluation, based on information obtained from step 214 in FIG. 2A.

The method 200 then proceeds to a step 220 representing a third evaluation phase where both rubric creation and candidate generation converge. From step 220, the method 200 may branch into parallel validation operations. A step 222 may involve schema checking of the generated content, while a step 224 may involve scoring each question using the established rubric criteria. Schema checking may involve review of the schema, such as examining a JSON schema for completeness, correctness and accuracy.

Both validation operations may feed into a step 226 where filtering occurs to select top-performing candidates with scores exceeding a threshold such as 0.75. The method 200 may then advance to a step 228 representing a fourth refinement phase. During this phase, refinement agent 128 may operate to iteratively improve the questions based on feedback from previous evaluation steps. The refinement agent 128 may function as a specialized agent that enhances question quality through iterative processing.

The method 200 may continue to a step 230 where quality enhancement operations are applied, including grammar checking, deduplication processes, and balance adjustments to ensure comprehensive coverage. Following these enhancements, the method 200 may proceed to a step 232 representing a fifth review phase where final quality assessment occurs.

The quality assurance agent 124 may evaluate each candidate assessment question against four primary scoring criteria that together assess whether the question is appropriate for inclusion in a finalized assessment for the specific test taker. Each criterion may be assigned a numerical weight reflecting its relative importance to overall question quality, and the quality assurance agent 124 may compute an overall quality score for each candidate question as a weighted combination of the individual criterion scores.

A first criterion comprises technical accuracy, which the quality assurance agent 124 may determine by comparing the technical concepts referenced in the candidate assessment question against the concepts present in the test taker's temporal knowledge graph. A candidate question that references technical concepts, code constructs, frameworks, or libraries that are accurately represented in the test taker's temporal knowledge graph as demonstrated skills may receive a high technical accuracy score, while a question that references concepts inaccurately, conflates distinct technical concepts, or contains technically incorrect assertions about programming constructs, APIs, or framework behaviors may receive a reduced technical accuracy score. The quality assurance agent 124 may verify technical accuracy by executing automated checks against authoritative technical references and by comparing question content against the specific code patterns associated with the relevant concept nodes in the temporal knowledge graph.

A second criterion comprises relevance, which the quality assurance agent 124 may determine by calculating the semantic similarity between the content of the candidate assessment question and the recently active concepts in the test taker's temporal knowledge graph. The quality assurance agent 124 may generate embeddings representing the semantic content of the candidate question and compute cosine similarity scores between the question embeddings and the embeddings associated with concept nodes in the temporal knowledge graph, wherein higher cosine similarity scores indicate greater relevance of the question to the test taker's demonstrated work. Concepts that have appeared in recent commits and that exhibit high usage frequency in the temporal knowledge graph may be weighted more heavily in the relevance calculation than concepts that have not appeared recently or that exhibit low usage frequency, ensuring that relevance scoring reflects the current state of the test taker's active skill set rather than historical skills that may no longer represent active competencies.

A third criterion comprises difficulty alignment, which the quality assurance agent 124 may determine by comparing the complexity metrics of the candidate assessment question against the skill level indicator detected for the relevant concept in the temporal knowledge graph. The quality assurance agent 124 may analyze the cognitive complexity required to answer the candidate question correctly, including the number of technical concepts the question requires the test taker to apply simultaneously, the sophistication of the reasoning required to arrive at a correct response, and the degree to which the question requires integration of multiple skills versus application of a single isolated concept. A candidate question whose difficulty aligns with the skill progression level indicated by the relevant concept node in the temporal knowledge graph may receive a high difficulty alignment score, while a question that is substantially easier or harder than the test taker's demonstrated competency level for the relevant concept may receive a reduced difficulty alignment score.

A fourth criterion comprises temporal appropriateness, which the quality assurance agent 124 may determine by verifying that the technical concepts referenced in the candidate assessment question correspond to concepts that the test taker has demonstrated within a configurable recent time window in the temporal knowledge graph. The quality assurance agent 124 may retrieve the most recent usage timestamp from the concept nodes associated with the candidate question and compare these timestamps against the configurable time window to determine whether the concepts being assessed reflect skills the test taker has actively applied recently. A candidate question referencing concepts whose most recent usage timestamps fall within the configurable time window may receive a high temporal appropriateness score, reflecting that the question targets skills the test taker is currently active with and that assessment of these skills will produce meaningful and current evaluation data. A candidate question referencing concepts whose most recent usage timestamps fall outside the configurable time window may receive a reduced temporal appropriateness score, reflecting that the test taker may not have recently applied these skills and that assessment results may therefore not accurately reflect current competency. The configurable time window may be adjusted by system administrators to reflect organizational preferences regarding the recency of skills considered appropriate for assessment, with shorter time windows producing assessments focused on very recent work and longer time windows permitting assessment of skills demonstrated across a broader historical range.

Optionally, in addition to or replacement for any of the above, a fifth criterion may be provided which comprises clarity, which the quality assurance agent 124 may determine by evaluating the grammatical correctness, unambiguous phrasing, and comprehensibility of the candidate assessment question. The quality assurance agent 124 may assess whether the question can be interpreted in multiple ways that would lead a test taker to different answers, whether the question contains grammatical errors or awkward phrasing that could impede comprehension, and whether the question provides sufficient context for a test taker at the indicated skill level to understand what is being asked without requiring information beyond what is provided in the question text. Clarity scoring may be performed through integrated grammar checking systems combined with semantic analysis of question structure to identify ambiguous pronoun references, unclear technical terminology, and insufficient contextual framing.

The quality assurance agent 124 may compute an overall quality score for each candidate assessment question as a weighted combination of scores across these criteria, wherein the weights assigned to each criterion may be configured based on organizational assessment priorities. In one non-limiting example, technical accuracy may be weighted at 0.3, relevance may be weighted at 0.3, difficulty alignment may be weighted at 0.2, and clarity may be weighted at 0.2, with temporal appropriateness applied as a threshold filter that rejects candidate questions whose temporal appropriateness score falls below a minimum acceptable value regardless of scores on other criteria. The quality assurance agent 124 may reject candidate assessment questions whose overall quality score falls below a threshold value and may provide quality score breakdowns to the refinement agent 128 identifying which specific criteria contributed to low scores, enabling the refinement agent 128 to apply targeted improvements rather than regenerating questions without guidance about the specific deficiencies requiring correction.

Figure 2C:
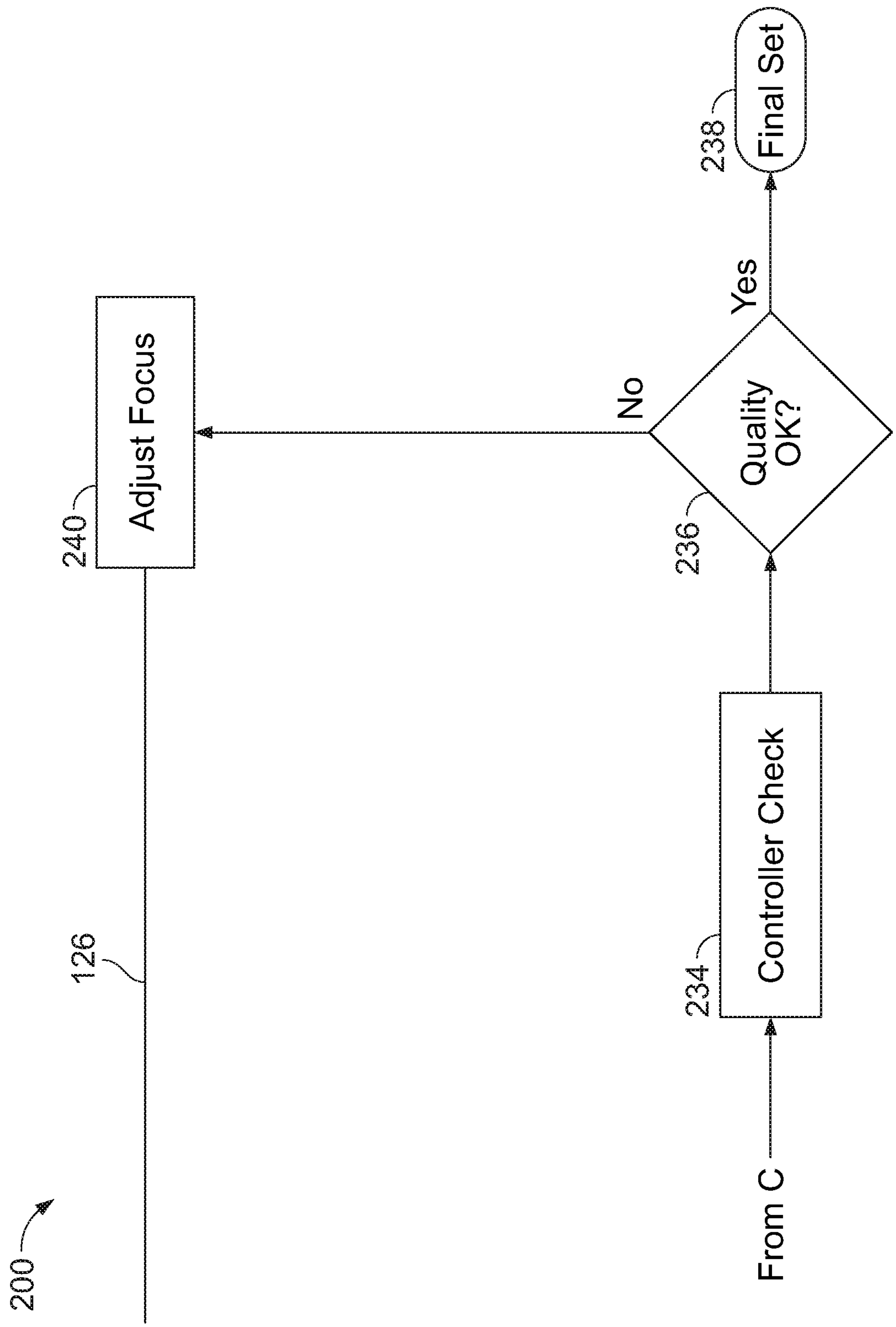
FIG. 2C shows a non-limiting, exemplary flowchart for a method implementing validation and quality control processes according to at least some embodiments of the present invention.

The method then proceeds to FIG. 2C. Note that "To C" in FIG. 2B continues to "From C" in FIG. 2C.

Referring to FIG. 2C, the method 200 may continue with a step 234 where controller evaluation is performed. The step 234 may involve the system controller 110 determining the current state of the assessment generation process. The method 200 may then proceed to a step 236 implementing a quality decision point where the system determines whether generated content meets predefined quality standards.

If quality standards are not satisfied, the method 200 may proceed to a step 240 where parameter adjustments are implemented. Validation agent 126 may participate in this feedback process, where the validation agent 126 operates as a specialized agent that ensures schema compliance and format consistency. The validation agent 126 may provide feedback that enables iterative refinement through repeated validation cycles.

If quality standards are satisfied at step 236, the method 200 may proceed to a step 238 where the process reaches completion with validated assessment content ready for output generation. The multi-agent orchestra 108 may coordinate these specialized agents through the system controller 110, enabling parallel processing and task distribution while maintaining communication pathways between the context analysis agent 120, question generation agent 122, quality assurance agent 124, validation agent 126, and refinement agent 128.

Figure 3:
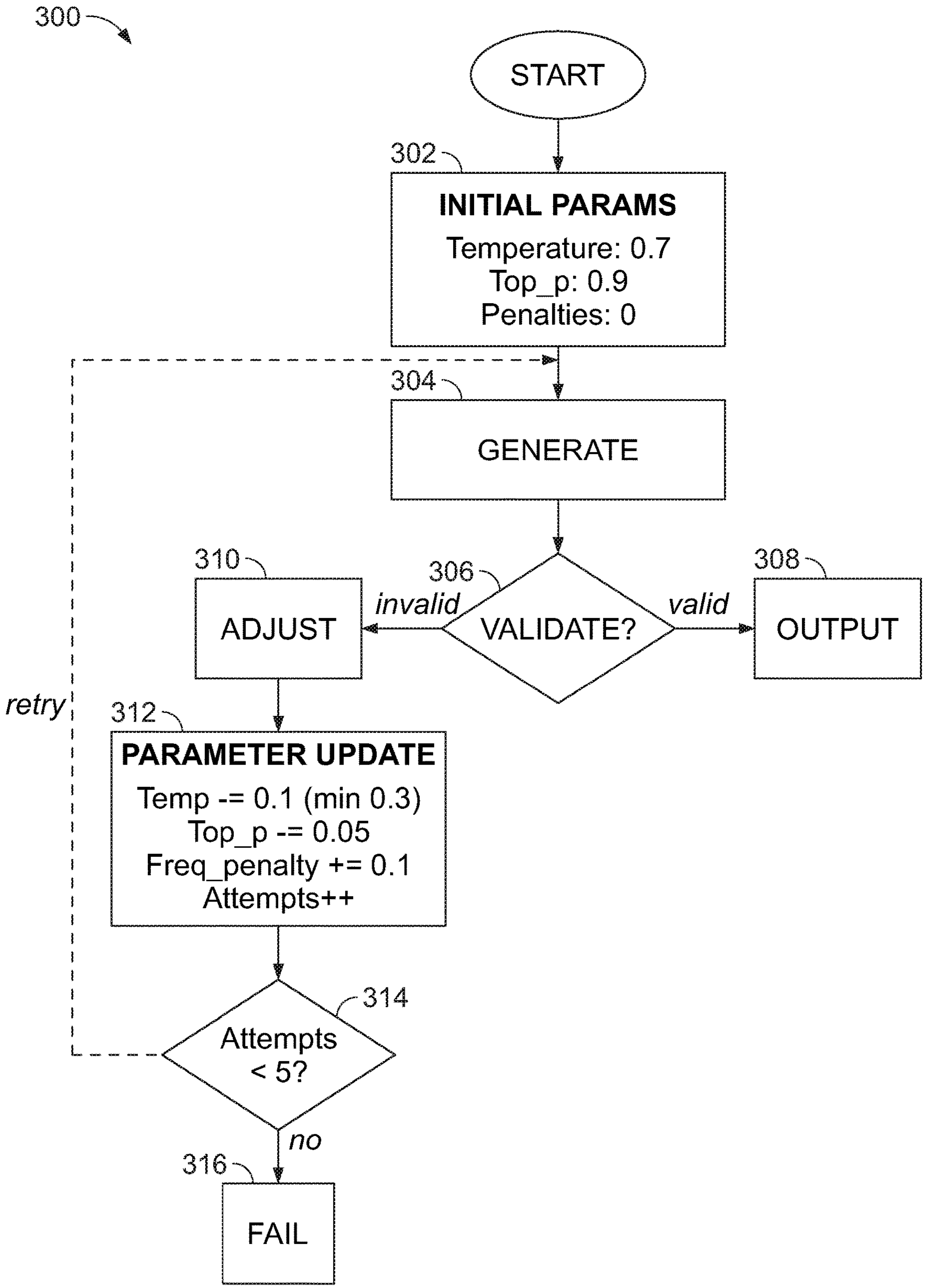
FIG. 3 shows a non-limiting, exemplary flowchart for a method of adaptive parameter adjustment for generating valid assessment outputs according to at least some embodiments of the present invention.

Referring to FIG. 3, a method 300 for adaptive parameter adjustment provides systematic control over assessment generation quality through iterative parameter refinement. The method 300 begins at a step 302, where initial parameters may be established to balance creative variety with generation reliability. In some cases, step 302 may set a temperature parameter to 0.7, a top_p parameter to 0.9, and penalty parameters to 0. The temperature parameter of 0.7 may provide sufficient randomness for diverse question generation while maintaining coherence, and the top_p parameter of 0.9 may allow broad token selection during the generation process.

Temperature at 0.7 represents a value within a preferred range of approximately 0.5 to 0.8 for assessment question generation. Temperature controls the softmax function applied to the model's output logits, where higher values flatten the probability distribution and lower values sharpen it. Without wishing to be limited by a single theory, the temperature has a preferred range, such that values outside of that range may not provide the desired results. For example, at temperature 1.0 or above, the probability distribution becomes too flat, causing the model to select low-probability tokens that may result in grammatically incorrect or semantically incoherent questions. As another example, at temperature values below 0.4, the distribution becomes overly peaked, causing the model to repeatedly select only the highest-probability tokens, resulting in repetitive or formulaic question structures. Temperature 0.7 softens the distribution sufficiently to produce varied question phrasings, different sentence structures, vocabulary choices, and conceptual framings. This is all done while maintaining enough probability concentration on high-quality tokens to preserve grammatical correctness and semantic coherence.

Top_p at 0.9 operates through nucleus sampling, wherein the model considers only tokens comprising the top cumulative probability mass equal to the top_p value. A top_p value of 0.9 permits selection from tokens within the top 90% of cumulative probability, which typically encompasses 10-50 candidate tokens depending on context. This range is sufficiently broad to enable diverse word choices and natural language variation while excluding the long tail of improbable tokens (the bottom 10% of probability mass) that could introduce errors, nonsensical phrases, or off-topic content. Lower top_p values such as 0.5 would overly constrain token selection, while higher values such as 0.95 or 1.0 would permit selection of tokens with very low probability that may degrade output quality.

Frequency and presence penalty parameters start at 0 to permit natural generation patterns without artificial constraints on token repetition. During initial generation attempts, zero penalties allow the model to use repeated technical terminology and consistent phrasing where contextually appropriate. When validation failures occur and regeneration is required, penalty parameters may be incrementally increased (for example, by 0.1 per retry attempt up to a maximum of 0.5) to encourage the model to explore alternative phrasings and reduce repetitive patterns that may have contributed to the validation failure.

Following parameter initialization, the method 300 may proceed to a step 304, where the system may generate assessment questions based on the current parameter configuration. Step 304 may utilize the established parameters to control the behavior of language models during question creation. In some cases, the generation process may produce multiple candidate questions that undergo subsequent evaluation.

The method 300 may continue to a step 306, which may implement a validation decision point to determine output quality. The step 306 may evaluate generated questions against predefined criteria including structural compliance, semantic coherence, and format consistency. In some cases, the validation process may involve both automated schema checking and semantic analysis through fine-tuned models.

When validation succeeds, the method 300 may proceed to a step 308, where validated output may be delivered for final processing. The step 308 may format the approved questions according to specified schemas and prepare the assessment for deployment. In some cases, the step 308 may include additional quality checks before final output generation.

If validation fails at the step 306, the method 300 may proceed to a step 310, where parameter adjustment may occur to improve generation quality. Step 310 may analyze validation failure patterns and determine appropriate parameter modifications. In some cases, step 310 may implement systematic adjustments based on the type and frequency of validation errors encountered.

The method 300 may continue to a step 312, where specific parameter updates may be applied according to predetermined adjustment ranges. For example, step 312 may reduce the temperature parameter by 0.1 decrements with a minimum threshold of 0.3 to progressively constrain generation randomness. In some cases, the step 312 may adjust the top_p parameter by 0.05 decrements from the initial value of 0.9 toward a minimum of 0.7, thereby narrowing the token selection range. The step 312 may also increment the frequency_penalty parameter by 0.1 from an initial value of 0 toward a maximum of 0.5 to reduce repetitive content generation. Additionally, step 312 may increment an attempts counter (counter of number of attempts) to track the number of generation cycles performed.

Following parameter updates, the method 300 may proceed to a step 314, which preferably evaluates whether the attempt limit has been reached. Step 314 may compare the current attempt count against a maximum threshold of 5 attempts to prevent infinite loops. In some cases, step 314 may implement alternative strategies when the attempt count exceeds 3, such as switching to different language models or simplifying generation requirements.

When the attempt limit has not been reached, method 300 may return from step 314 to step 304 to regenerate output with the adjusted parameters. This iterative loop may continue until either valid output is produced or the maximum attempt threshold is exceeded. In some cases, the iterative process may achieve valid output within 2-3 attempts due to the progressive parameter constraints.

When the maximum attempt limit is reached, method 300 may proceed to a step 316, where the generation process may terminate without producing valid output. Step 316 may generate diagnostic information for human review and log the failure conditions for system improvement. In some cases, the step 316 may trigger alternative processing pathways or alert administrators to manual intervention requirements.

Figure 4:
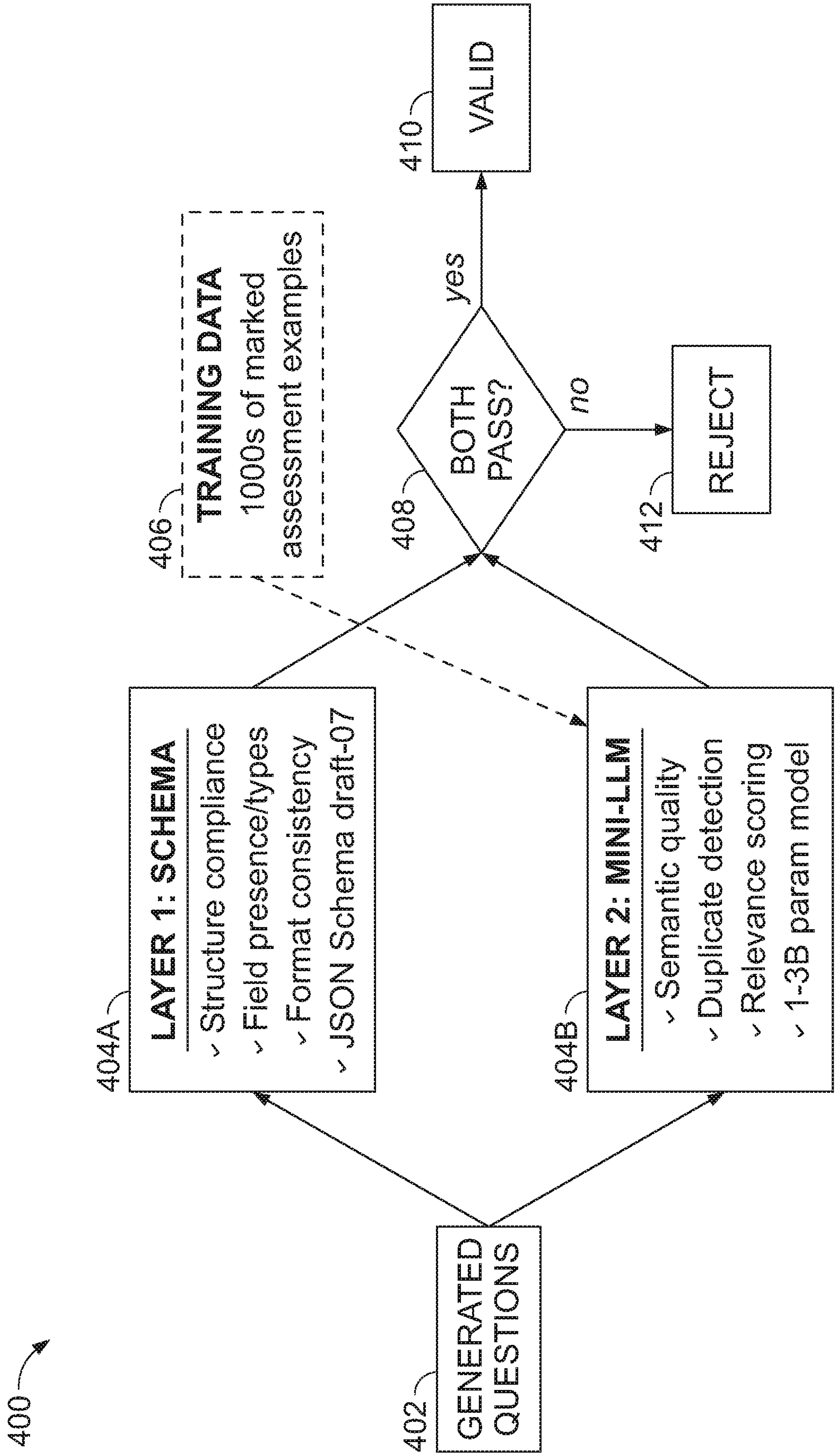
FIG. 4 shows a non-limiting, exemplary flowchart for a system implementing a dual-layer validation process for generated questions according to at least some embodiments of the present invention.

Referring to FIG. 4, a system 400 implements a dual-layer validation process for assessment question quality assurance. The system 400 receives generated questions 402 from the multi-agent orchestra and processes the generated questions 402 through two parallel validation pathways to ensure both structural and semantic compliance.

The dual-layer validation comprises a primary layer using JSON Schema validation for structural compliance and a secondary layer using a fine-tuned mini-LLM with 1-3B parameters for semantic validation. A layer 1 404A performs JSON Schema validation operations on the generated questions 402. The layer 1 404A may execute structural compliance checking to verify that all required fields are present within the generated questions 402. The layer 1 404A may validate nested object structures and confirm array length constraints to prevent malformed data from propagating through the system 400. Field presence and type validation operations may be performed by the layer 1 404A to verify data types including string, number, boolean, and null values. The layer 1 404A may enforce enum restrictions and validate regex patterns to confirm conditional dependencies between question elements. Format consistency enforcement may be implemented by the layer 1 404A to standardize date/time formats, validate URI/URL structures, ensure consistent character encoding, and normalize whitespace within the generated questions 402.

As further shown in FIG. 4, the system 400 includes a secondary validation layer that utilizes a mini-LLM for semantic quality assessment, shown as layer 2 404B. The layer 2 404B may operate with a 1-3B parameter model that provides semantic quality evaluation capabilities while maintaining rapid inference performance. The mini-LLM validation layer featured in layer 2 404B may catch semantic issues beyond structural validity that the layer 1 404A cannot detect. Duplicate detection operations may be performed by the secondary layer to identify repeated questions within the generated questions 402. Relevance scoring may be calculated by the secondary layer to measure the relationship between the generated questions 402 and the source context from test taker work history, for example according to source concepts in the temporal knowledge graph.

Training data 406 comprising thousands of marked assessment examples provides input to the secondary validation layer. The training data 406 may include human-marked assessment examples or LLM-marked assessment examples that establish quality benchmarks for the validation process. The training data 406 enables the mini-LLM in layer 2 404B to learn patterns of high-quality assessment questions and identify common quality issues within generated content.

With continued reference to FIG. 4, a validation point 408 receives validation results from both the layer 1 404 and the layer 2 404B. The validation point 408 may implement decision logic that requires both validation layers to pass before accepting the generated questions 402. The system 400 maintains quality metrics including 98%+ grammatical correctness, relevance score>0.7 cosine similarity, and uniqueness<0.3 similarity between questions. The validation point 408 may evaluate the generated questions 402 against these quality metric thresholds to determine acceptance or rejection.

When both validation layers pass the quality requirements, the validation point 408 may direct the generated questions 402 to a valid 410 outcome. The valid 410 state indicates that the generated questions 402 meet both structural and semantic quality standards and may proceed to the output generation phase. In cases where either validation layer fails to meet the established thresholds, the validation point 408 may direct the generated questions 402 to a reject 412 outcome. The reject 412 state may trigger parameter adjustment feedback to the system controller for regeneration of the generated questions 402 with modified generation parameters.

Without wishing to be limited by a closed list, the bidirectional feedback architecture of the dual-layer validation system addresses a specific technical degradation problem that affects automated validation systems operating over extended periods. Language model generation patterns as described herein are not static. As generation parameters are adjusted through iterative refinement cycles and as the distribution of input contexts changes across different test takers, the statistical characteristics of generated outputs shift over time. A static validation schema defined at system initialization reflects the generation patterns observed during that initialization period and becomes progressively less representative of actual generation behavior as operational time accumulates. In conventional automated generation systems, this schema drift results in increasing rates of validation failure for outputs that are semantically valid but structurally divergent from the original schema assumptions, requiring human operators to periodically identify failure pattern causes and manually update schema rules.

The present invention, in at least some embodiments, preferably addresses this degradation through a feedback mechanism in which the second validation layer detects systematic semantic validation failures by identifying recurring patterns across failed candidate assessment questions, generates schema refinement recommendations with associated confidence scores, and provides those recommendations to the first validation layer for automatic incorporation into schema checking rules. The first validation layer correspondingly provides structural failure context to the second validation layer to enable root cause analysis that distinguishes genuine generation errors from schema rules that have become misaligned with current generation patterns. This bidirectional feedback enables the validation system to maintain effectiveness as generation patterns evolve without requiring manual schema updates or retraining of the language model components, solving the schema drift degradation problem through automated architectural self-correction rather than periodic human intervention.

Figure 5A:
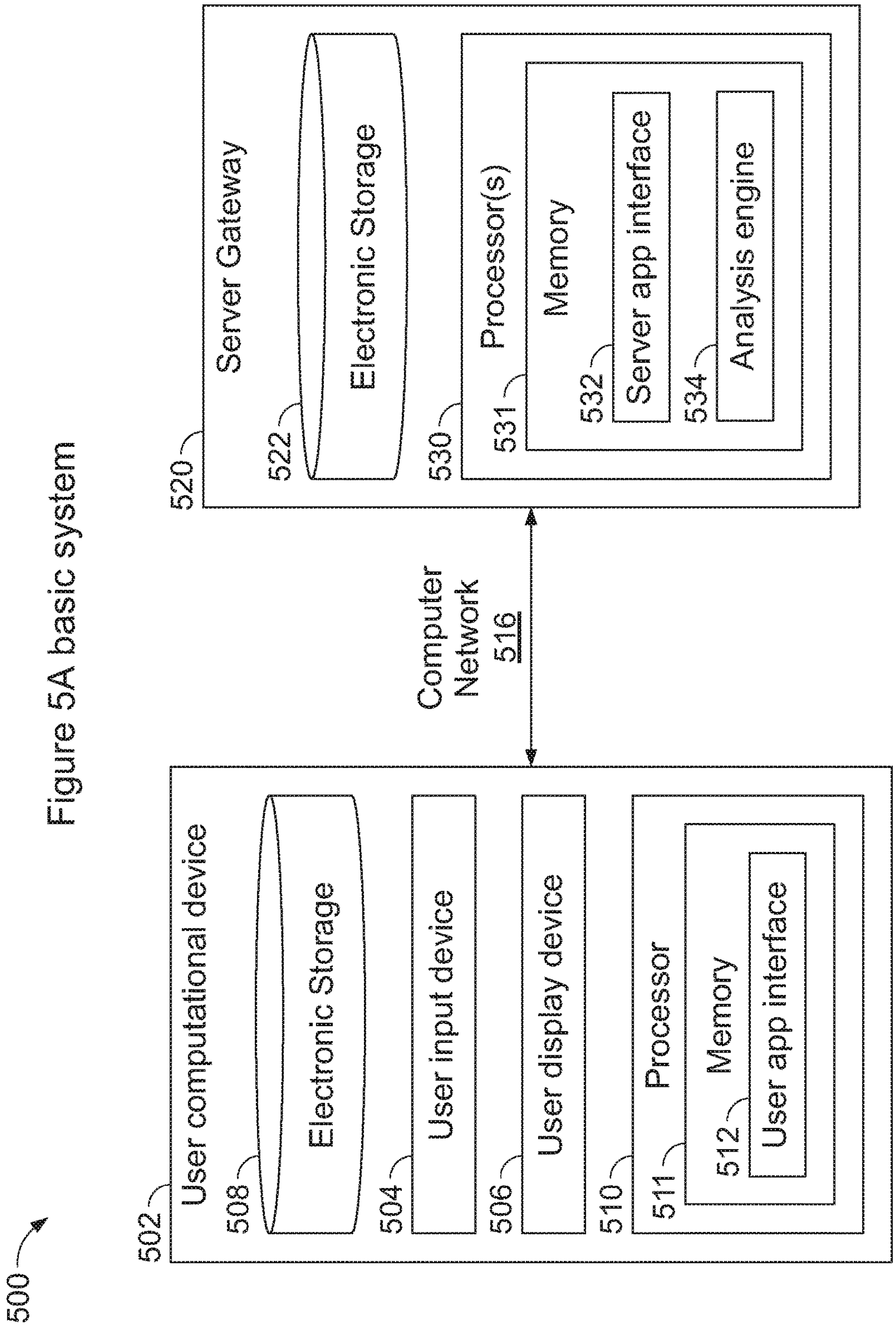
FIG. 5A shows a non-limiting, exemplary block diagram of a basic system comprising a user computational device and a server gateway according to at least some embodiments of the present invention.

Referring to FIG. 5A, a system 500 may be implemented using a distributed computing architecture that enables assessment generation and processing operations. The system 500 may comprise a user computational device 502 and a server gateway 520 that communicate through a network 516 to facilitate data exchange and computational processing. User computational device 502 may be used as described herein to enable a test taker to be assessed to communicate with system 500.

The user computational device 502 may include various hardware components configured to enable user interaction and data processing. A user input device 504 may be connected to the user computational device 502 to receive input from users, such as commands, data entries, or configuration parameters related to assessment generation requests. The user input device 504 may comprise keyboards, mice, touchscreens, or other input mechanisms that allow users to interact with the system 500. A user display device 506 may be operatively connected to the user computational device 502 to present visual information to users, including generated assessments, system status information, and user interface elements. The user display device 506 may comprise monitors, screens, or other visual output devices capable of displaying assessment content and system feedback.

The user computational device 502 may further include electronic storage 508 configured to store data locally on the user device. The electronic storage 508 may maintain user preferences, cached assessment data, application files, and temporary processing data. A processor 510 may be incorporated within the user computational device 502 to execute computational operations and manage device functions. The processor 510 may contain memory 511 that provides temporary storage for active processes and data being processed by the user computational device 502. The memory 511 may store application code, user session data, and intermediate processing results during assessment generation workflows.

The processor 510 may also contain a user app interface 512 that manages communication protocols and data formatting between the user computational device 502 and external systems. The user app interface 512 may handle authentication, data transmission formatting, and protocol management for interactions with remote servers. In some cases, the user app interface 512 may implement application programming interfaces (APIs) that enable standardized communication with the server gateway 520.

As further shown in FIG. 5A, the server gateway 520 may provide centralized processing capabilities for the system 500. The server gateway 520 may include electronic storage 522 configured to maintain large datasets, test taker work histories, exemplar test formats, and generated assessment libraries. The electronic storage 522 may store persistent data that supports multiple users and maintains historical information across assessment generation sessions.

The server gateway 520 may incorporate one or more processors 530 that execute the computational operations for assessment generation. The one or more processors 530 may contain memory 531 that provides working storage for active processing operations, including temporary data structures used during multi-agent orchestration and validation processes. The memory 531 may maintain runtime data for machine learning models, intermediate processing results, and system state information during assessment generation workflows.

The one or more processors 530 may also contain a server app interface 532 that manages communication protocols with client devices and external data sources. The server app interface 532 may handle incoming requests from user computational devices, format responses, and coordinate data exchange operations across the network 516. In some cases, the server app interface 532 may implement load balancing and request queuing to manage multiple concurrent assessment generation requests.

An analysis engine 534 may be incorporated within the one or more processors 530 to perform the computational analysis operations for assessment generation. The analysis engine 534 may execute the multi-agent orchestration processes, context analysis operations, and validation procedures described in the system architecture. In some cases, the analysis engine 534 may coordinate with machine learning models and natural language processing components to generate customized assessments based on test taker work data.

The network 516 may facilitate bidirectional communication between the user computational device 502 and the server gateway 520. The network 516 may comprise internet connections, local area networks, wide area networks, or other communication infrastructures that enable data transmission between distributed system components. In some cases, the network 516 may implement secure communication protocols to protect user data and assessment content during transmission between the user computational device 502 and the server gateway 520.

A computer such as user computational device 502 in FIG. 5A may serve as the primary interface through which individuals access the assessment generation system for evaluation purposes. Test takers who require customized assessments based on their work history may interact with the system through this device to initiate assessment creation processes. The user computational device 502 or a similar device may enable test takers to upload their work artifacts, specify assessment parameters, and receive generated evaluations tailored to their demonstrated skills and experience.

Through similar devices to the user input device 504 and user display device 506, test takers may provide various forms of work history data including code repositories, documentation, project files, and other professional artifacts that serve as the foundation for assessment generation. The user computational device 502 may facilitate the submission of version control histories, creative portfolios, technical writings, or analytical work samples that the system analyzes to create relevant evaluation questions. Users may also configure assessment preferences, select difficulty levels, and specify the scope of skills they wish to evaluate through the interface provided by the user computational device 502.

The user computational device 502 may present the final generated assessments to test takers through the user display device 506 or another such device, allowing them to review questions, access scoring rubrics, and understand evaluation criteria before beginning their assessment. test takers may interact with multiple choice questions, respond to open-ended prompts, or complete other assessment formats directly through the user computational device 502. The device may also provide feedback on assessment performance, display results, and enable test takers to request additional assessments or modifications based on their evolving professional development needs.

Figure 5B:
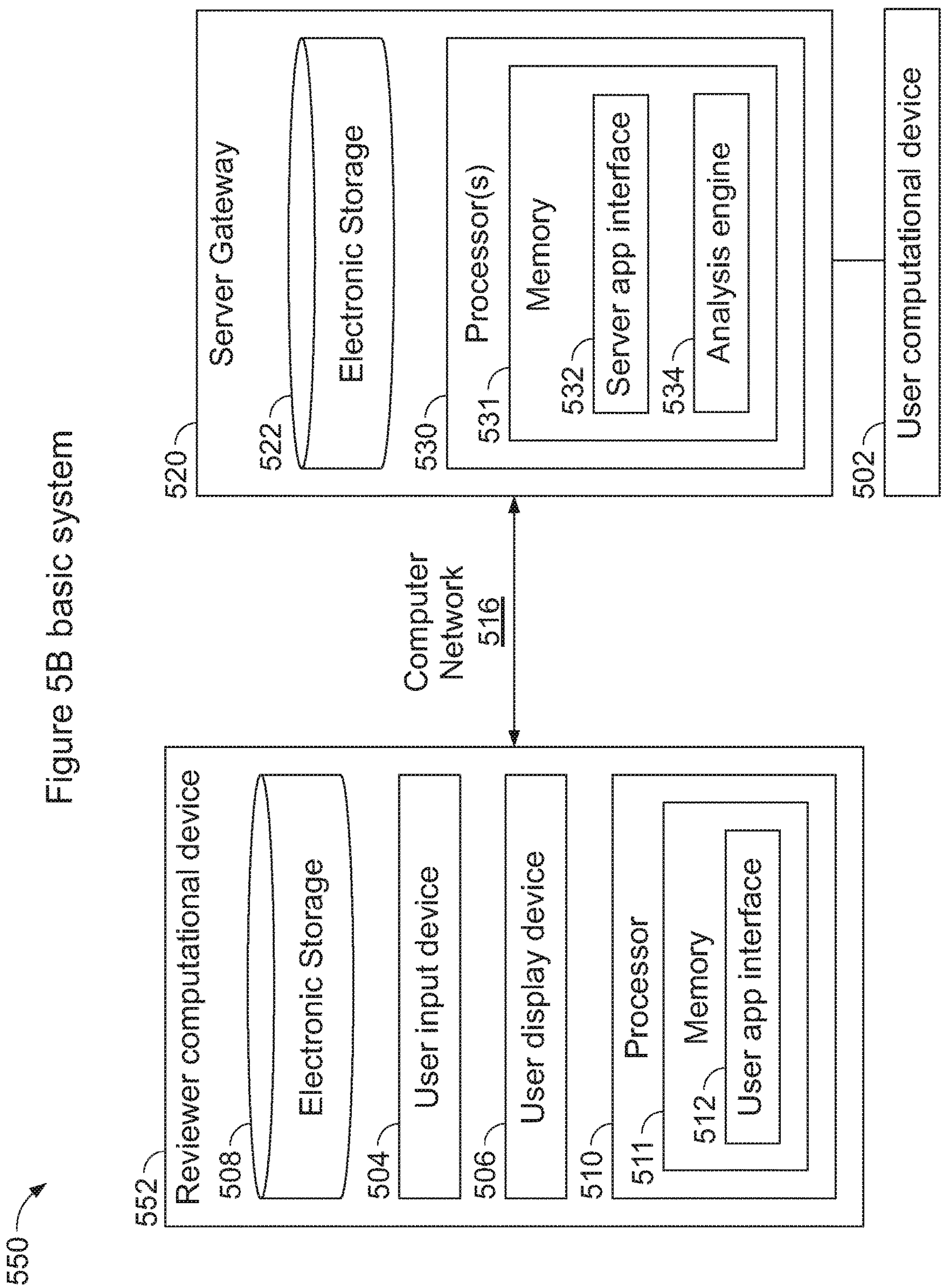
FIG. 5B shows a non-limiting, exemplary block diagram of a basic system comprising a reviewer computational device, a server gateway, and a user computational device according to at least some embodiments of the present invention.

Referring to FIG. 5B, a basic system 550 may extend the computational architecture to incorporate reviewer capabilities for assessment quality control and/or to design the initial types of assessments as previously described. The basic system 550 may include a reviewer computational device 552 that connects to the server gateway 520 and user computational device 502 through the network 516. The reviewer computational device 552 may enable human-in-loop calibration functionality by providing administrator review and quality assessment capabilities within the distributed architecture.

The reviewer computational device 552 may comprise electronic storage 508, a user input device 504, a user display device 506, and a processor 510. The processor 510 may contain memory 511 and a user app interface 512. The user input device 504 and user display device 506 may enable interaction with the reviewer computational device 552, allowing administrators to review generated assessments and provide quality feedback. The electronic storage 508 may provide data storage capabilities for storing review data, quality metrics, and calibration parameters.

In some cases, the reviewer computational device 552 may communicate with the server gateway 520 through the network 516 to access generated assessments for review. The user app interface 512 on the reviewer computational device 552 may facilitate communication with the server app interface 532 on the server gateway 520. The analysis engine 534 within the server gateway 520 may process review feedback received from the reviewer computational device 552 and incorporate the feedback into assessment generation parameters.

The basic system 550 may enable bidirectional communication between the reviewer computational device 552, the server gateway 520, and the user computational device 502 through the network 516. In some cases, administrators using the reviewer computational device 552 may evaluate assessment quality on rating scales, mark approved questions, and provide preference feedback that the server gateway 520 may incorporate into future assessment generation processes. The distributed architecture of the basic system 550 may allow multiple reviewers to simultaneously evaluate different assessments while maintaining centralized coordination through the server gateway 520.

The reviewer computational device 552 may serve as a design workstation where administrators and subject matter experts create the foundational assessment templates and exemplar formats that guide the automated generation process. For example and without limitation, reviewers may develop initial question structures, define assessment categories, and establish quality standards that the system uses as reference patterns. The reviewer computational device 552 may enable the creation of template libraries that specify question formats, answer structures, difficulty progression models, and evaluation rubrics that serve as blueprints for the multi-agent orchestra during assessment generation.

Design work conducted through the reviewer computational device 552 may involve establishing assessment taxonomies that categorize different skill domains, technical competencies, and knowledge areas relevant to various professional fields. Reviewers may utilize the device to create mapping frameworks that connect specific work artifacts to appropriate assessment topics, ensuring that generated questions align with demonstrated test taker capabilities. The reviewer computational device 552 may facilitate the development of scoring methodologies, difficulty calibration systems, and quality metrics that the automated system applies during question generation and validation processes.

The reviewer computational device 552 may also support the creation of organizational assessment standards and customization parameters that align generated content with specific institutional requirements or industry practices. Reviewers may design preference profiles that influence question style, complexity levels, and subject matter emphasis based on organizational needs or target audience characteristics. Through the reviewer computational device 552, administrators may establish feedback collection mechanisms, quality assurance protocols, and continuous improvement processes that enable the system to evolve and refine its assessment generation capabilities over time based on accumulated usage data and performance outcomes.

The server gateway 520 may implement a human-in-the-loop calibration component comprising additional processors and memory that execute a closed-loop technical control system for continuously refining assessment generation parameters based on administrator expertise. The calibration component may present generated assessments to administrators through a calibration interface executing on the reviewer computational device 552, where the calibration interface displays each candidate assessment question alongside its corresponding source commit identifiers extracted from the temporal knowledge graph. The interface may also display computed quality scores from the quality assurance agent as numerical values, detected skill level indicators extracted from the temporal knowledge graph, and selectable interface elements configured to capture administrator input as structured data entries that can be processed computationally.

The calibration interface may provide multiple input mechanisms through which administrators can provide feedback on generated assessments. The interface may display numerical rating controls that enable administrators to assign quality ratings on a continuous scale from 0.0 to 1.0 for individual questions, where the ratings are captured as floating-point values rather than subjective text descriptions. Text editing controls may allow administrators to propose specific modifications to question text, with the proposed changes captured as character-level edit operations including insertions, deletions, and substitutions at specific text positions. Difficulty adjustment controls may provide increment and decrement buttons or radio button selections that enable administrators to indicate whether a question's difficulty should increase, decrease, or remain unchanged, with these selections captured as integer values of +1, −1, or 0 respectively. Relevance feedback controls may enable administrators to flag questions as misaligned with demonstrated test taker skills by selecting from a list of technical concepts displayed from the temporal knowledge graph, with selections recorded as boolean flags associated with specific concept identifiers. Bias detection controls may enable administrators to mark potentially problematic questions and categorize the type of bias detected, with these markings stored as enumerated values linked to question identifiers.

The calibration component may receive administrator input through these interface elements and automatically convert the input into machine-readable calibration data structures stored in memory on the server gateway 520. The conversion process may transform test taker interface events such as button clicks, text entries, and slider movements into structured data records that can be processed by computational algorithms or processes. Numerical rating values entered through rating controls may be stored as floating-point rating vectors, where each vector element corresponds to a quality dimension such as technical accuracy, clarity, or relevance. Text modification proposals may be converted into text modification records that specify the original text, the modified text, and the character positions where changes occur, enabling computational analysis of which text patterns administrators prefer to modify. Difficulty adjustment selections may be aggregated into difficulty adjustment flag arrays organized by skill level and technical concept, enabling statistical analysis of systematic calibration patterns. Relevance feedback selections may be converted into relevance mismatch indicator structures that link question identifiers to technical concept identifiers, enabling correlation analysis between question characteristics and relevance problems. Bias detection markings may be transformed into bias detection marker records that associate question identifiers with bias type categories, enabling pattern extraction across multiple flagged questions.

The calibration component may automatically analyze the calibration data structures to compute statistical metrics that identify patterns in administrator feedback across multiple assessments. Pattern detection algorithms executing on the server gateway processors may calculate mean values and standard deviations of numerical rating vectors, grouping ratings by question template type to identify which templates consistently receive high ratings above a threshold such as 0.8 and which templates consistently receive low ratings below a threshold such as 0.5. The algorithms may aggregate difficulty adjustment flags grouped by skill level indicators, computing the percentage of questions at each skill level that receive difficulty increase flags, difficulty decrease flags, or no adjustment, thereby identifying systematic difficulty calibration errors where, for example, 60 percent of questions marked as intermediate difficulty receive difficulty increase flags, indicating that the system systematically underestimates question difficulty at that skill level. Correlation analysis may compute correlation coefficients between relevance mismatch indicators and characteristics of the temporal knowledge graph such as concept recency, concept usage frequency, and concept complexity, identifying which graph characteristics predict relevance problems. Pattern mining algorithms may analyze bias detection markers to extract common features shared by flagged questions, such as frequently co-occurring keywords, sentence structures, or technical domains that correlate with bias reports.

Based on the identified statistical patterns, the calibration component may automatically generate parameter modification instructions that specify how agent operational parameters should be adjusted to address systematic issues revealed in administrator feedback. The parameter modification generation process may compute prompt weight adjustments encoded as floating-point multipliers between 0.0 and 2.0, where multipliers greater than 1.0 increase the influence of prompt components associated with successful question characteristics, and multipliers less than 1.0 decrease the influence of components associated with unsuccessful characteristics. For example, if questions generated using template A consistently receive ratings above 0.8 while questions using template B consistently receive ratings below 0.5, the system may compute a weight multiplier of 1.3 for template A and 0.7 for template B, causing the question generation agent to select template A with 86 percent higher probability than baseline. Difficulty calibration offset values may be computed as the mean of difficulty adjustment flags for each skill level, resulting in floating-point offsets such as +0.3 for intermediate level questions if administrators consistently flag them as too easy, or −0.2 for advanced level questions if administrators consistently flag them as too difficult. These offset values may be added to complexity scores computed during question evaluation, shifting the difficulty classification thresholds. Relevance threshold modifications may be computed based on correlation analysis, adjusting the minimum acceptable cosine similarity score between question content and temporal knowledge graph concepts, such as increasing the threshold from 0.7 to 0.78 if correlation analysis reveals that questions with similarity below 0.78 frequently receive relevance mismatch flags. Bias detection rule additions may be generated by extracting regular expression patterns or keyword lists from questions marked with bias flags, creating new validation rules that can identify similar questions during future generation.

Without wishing to be limited by a closed list, the temporal knowledge graph represents a technical improvement over conventional relational database and flat data structure approaches to skill representation. In a conventional relational database, representing the relationships between technical concepts requires multi-table join operations whose computational cost scales with the number of relationship types and the depth of relationship chains being queried. A query to identify concepts for which all prerequisite concepts have been mastered, and which have themselves been introduced but not yet fully mastered, requires multiple nested joins across skill records, dependency records, and temporal records simultaneously.

By contrast, the temporal knowledge graph of the present invention, in at least some embodiments and without wishing to be limited by a closed list, represents prerequisite relationships, refinement progressions, usage correlations, and mastery indicators as typed edges directly connecting concept nodes, enabling these same queries to be executed as graph traversal operations that follow edge types selectively without constructing intermediate join tables. The computational characteristics of graph traversal for connected node retrieval are fundamentally different from relational join operations for equivalent queries involving multiple relationship types across temporal sequences. This architectural difference enables the system to efficiently identify boundary concepts (for example, those with proficiency scores between 0.5 and 0.8 whose prerequisite concept nodes have readiness scores above 0.7) through targeted graph traversal that a conventional relational schema representing equivalent data would require substantially more complex and computationally expensive query operations to replicate.

The calibration component may automatically transmit the parameter modification instructions to agents in the multi-agent orchestra through the existing message passing infrastructure. The transmission process may serialize parameter modification instructions into message packets that conform to the message passing protocol, including header fields that specify the destination agent identifier, message type identifier, and priority level. The serialized messages may be written to agent-specific message queues in shared memory that the target agents monitor for incoming instructions. Priority flags may be set to ensure that parameter update messages are processed before new question generation requests, preventing agents from generating additional questions using outdated parameters while updates are pending. The asynchronous message passing system enables parameter updates to be delivered to distributed agents without blocking the calibration component or requiring synchronous acknowledgment.

Without wishing to be limited by a closed list, the asynchronous message passing architecture of the present invention, provides a measurable technical improvement in assessment generation throughput compared to conventional batch-oriented pipeline implementations. In a conventional batch-oriented assessment generation pipeline, each processing stage must produce a complete output artifact before the downstream stage begins operation, yielding total end-to-end latency that approximates the sum of the durations of all sequential stages.

In the present invention, in at least some embodiments, the partial result message type carries intermediate processing results together with a confidence score indicating reliability of the partial results and a completion percentage indicating progress toward final output, enabling downstream agents to begin processing before upstream agents have completed their full output. Where agent processing stages have overlapping operational periods, total pipeline latency is reduced from approximately the sum of all stage durations toward approximately the duration of the longest individual processing path among concurrently executing agents. This reduction is a direct consequence of the structured partial result message format, which provides downstream agents with sufficient confidence and completion metadata to determine whether partial results are reliable enough to begin downstream processing, rather than requiring agents to wait for a completion signal before initiating operation. The system controller further compounds this benefit through the adaptive task allocation mechanism, which routes subtasks to agents based on current capacity utilization signals, preventing processing bottlenecks from forming at individual agents and distributing workload across available agent capacity during peak generation periods.

Agents in the multi-agent orchestra may automatically modify their operational parameters upon receiving parameter modification instructions, implementing the requested changes immediately without requiring manual configuration or system restart. The question generation agent may load updated prompt weights from received message packets and store the weights in its local memory, then apply the updated weights as multipliers to prompt component selection probabilities during subsequent language model invocations. For example, if the agent previously selected among five question templates with equal 20 percent probability each, and receives a weight multiplier of 1.3 for template A and 0.7 for template B, the agent may recompute selection probabilities as 26 percent for template A, 14 percent for template B, and 20 percent for each of the other three templates, thereby increasing the generation frequency of questions similar to high-rated examples and decreasing the frequency of questions similar to low-rated examples. The quality assurance agent may load difficulty calibration offset values from parameter update messages and add these offsets to complexity scores computed for each question before comparing against skill level thresholds. If a question computes a raw complexity score of 0.65 and the agent receives an offset of +0.3 for intermediate level questions, the adjusted complexity score of 0.95 may cause the question to be reclassified from intermediate to advanced difficulty, aligning the classification with administrator feedback. The quality assurance agent may also load updated relevance threshold values and compare question-to-context cosine similarity scores against the new thresholds rather than baseline thresholds, filtering out questions that fall below the adjusted minimum similarity requirement. The validation agent may load bias detection rule additions and execute the new rules during semantic validation passes, rejecting questions whose text matches the newly identified problematic patterns before the questions can be included in final assessments.

The calibration component may implement a closed-loop technical feedback system that automatically measures the effectiveness of parameter modifications and reverts ineffective changes without requiring administrator intervention. Before applying parameter modifications to the multi-agent orchestra, the calibration component may store baseline performance metrics in memory, where baseline metrics include the mean quality rating across all questions generated during a recent time window such as the previous week, the difficulty calibration accuracy computed as the percentage of questions receiving no difficulty adjustment flags, and the relevance match percentage computed as the percentage of questions receiving no relevance mismatch flags. After transmitting parameter modifications to agents, the calibration component may continue monitoring performance metrics from newly generated assessments, computing current metrics using the same statistical methods applied to baseline data. Comparison algorithms may compute delta values representing the change in each performance metric, where delta values equal current metric values minus baseline metric values, such that positive deltas indicate improvement and negative deltas indicate degradation. If delta values indicate that modifications improved performance, such as a positive delta of +0.15 in mean quality ratings or +12 percent in difficulty calibration accuracy, the calibration component may retain the modified parameters as the new baseline configuration. However, if delta values indicate performance degradation, such as a negative delta of −0.08 in mean quality ratings or −5 percent in relevance match percentage, the calibration component may automatically execute rollback operations without waiting for administrator review or approval.

The automatic rollback mechanism may retrieve the previous parameter configuration from version-controlled storage in memory and transmit the original parameter values back to agents through the message passing protocol, instructing agents to reload their previous operational settings. The rollback process may execute within seconds of detecting performance degradation, minimizing the number of assessments generated using ineffective parameters. This closed-loop control system creates a self-regulating mechanism where the calibration component automatically proposes parameter changes based on administrator feedback, automatically deploys the changes to distributed agents, automatically measures the results, and automatically reverses changes that fail to improve outcomes, all without requiring manual intervention once administrators provide their initial feedback through the calibration interface.

The calibration component may implement version control of parameter configurations by storing each unique parameter configuration as a versioned record in memory with an associated timestamp and version identifier. The version control system may maintain a directed acyclic graph of parameter configuration history, where each node represents a configuration version and each edge represents a modification event that produced a new version from a previous version. A current version pointer may indicate which parameter configuration version is actively deployed to agents at any given time. Rollback operations may be executed by updating the current version pointer to reference a previous version in the history graph and transmitting the referenced parameter configuration to all agents through the message passing system. This version control architecture enables not only immediate rollback to the most recent prior configuration, but also rollback to any historical configuration, such as reverting to a configuration from two weeks ago if recent modifications prove problematic. Version metadata may include performance metrics observed while each configuration was active, enabling the calibration component to identify historically successful configurations for redeployment.

The calibration component may implement A/B testing of parameter modifications to validate their effectiveness before full deployment across the entire multi-agent orchestra. The A/B testing mechanism may partition agents into two or more groups, configuring a first subset of agents to use modified parameter configurations while configuring a second subset to continue using baseline configurations. Assessment generation requests may be routed alternately between the first subset and second subset through the task allocation mechanism in the system controller, ensuring that both configurations process similar volumes and types of requests. The calibration component may compute separate performance metrics for assessments generated by the first subset versus assessments generated by the second subset, enabling direct statistical comparison between modified and baseline configurations under identical operating conditions. If performance metrics from the first subset exceed those from the second subset by a threshold percentage such as 10 percent improvement in mean quality ratings or 5 percent improvement in difficulty calibration accuracy, the calibration component may automatically promote the modified parameters to all agents in the orchestra, updating the baseline configuration. Conversely, if the second subset produces superior metrics, the calibration component may automatically revert the first subset to baseline parameters, discarding the ineffective modifications. The A/B testing approach provides rigorous validation of parameter changes while limiting risk, as only a subset of assessments are generated using potentially problematic modifications.

The calibration component may implement gradual rollout of parameter modifications as an alternative to immediate full deployment, reducing risk while enabling faster validation than traditional A/B testing. The gradual rollout mechanism may use confidence-weighted blending of modified and baseline parameters, where agents apply a weighted combination of both parameter sets rather than using one exclusively. Blend weights may start with 90 percent baseline and 10 percent modified, gradually shifting toward 50-50 blending, then 10 percent baseline and 90 percent modified, and finally 100 percent modified if performance metrics remain stable or improve at each stage. The blending process may be implemented through probabilistic parameter selection, where agents randomly choose between baseline and modified parameter values for each decision point according to the current blend weights. For example, at 70 percent baseline and 30 percent modified blending, an agent selecting a question template may have a 70 percent probability of using template selection weights from the baseline configuration and 30 percent probability of using weights from the modified configuration. This gradual transition enables early detection of performance issues while minimizing the impact of problematic modifications, as the majority of questions continue to use validated baseline parameters until the modified parameters demonstrate reliable improvement.

Through these automated mechanisms, the human-in-the-loop calibration component creates a continuous improvement cycle where administrator expertise progressively refines agent behavior without requiring manual parameter tuning or individual assessment review. Administrators interact with the calibration interface to provide structured feedback on a relatively small sample of generated assessments, such as 10 to 20 questions per calibration session. The calibration component automatically extracts patterns from this feedback, translates patterns into computational parameter adjustments, deploys adjustments to distributed agents, measures the impact of changes, and either retains improvements or reverts degradations. This automation enables the system to benefit from human expertise at the strategic level of defining quality standards and identifying systematic issues, while eliminating the need for human involvement in the tactical level of parameter configuration and ongoing quality monitoring. The result is a system that evolves its assessment generation capabilities based on accumulated administrator feedback, progressively improving alignment with organizational quality standards and domain-specific requirements through iterative refinement of agent operational parameters.

Figure 6:
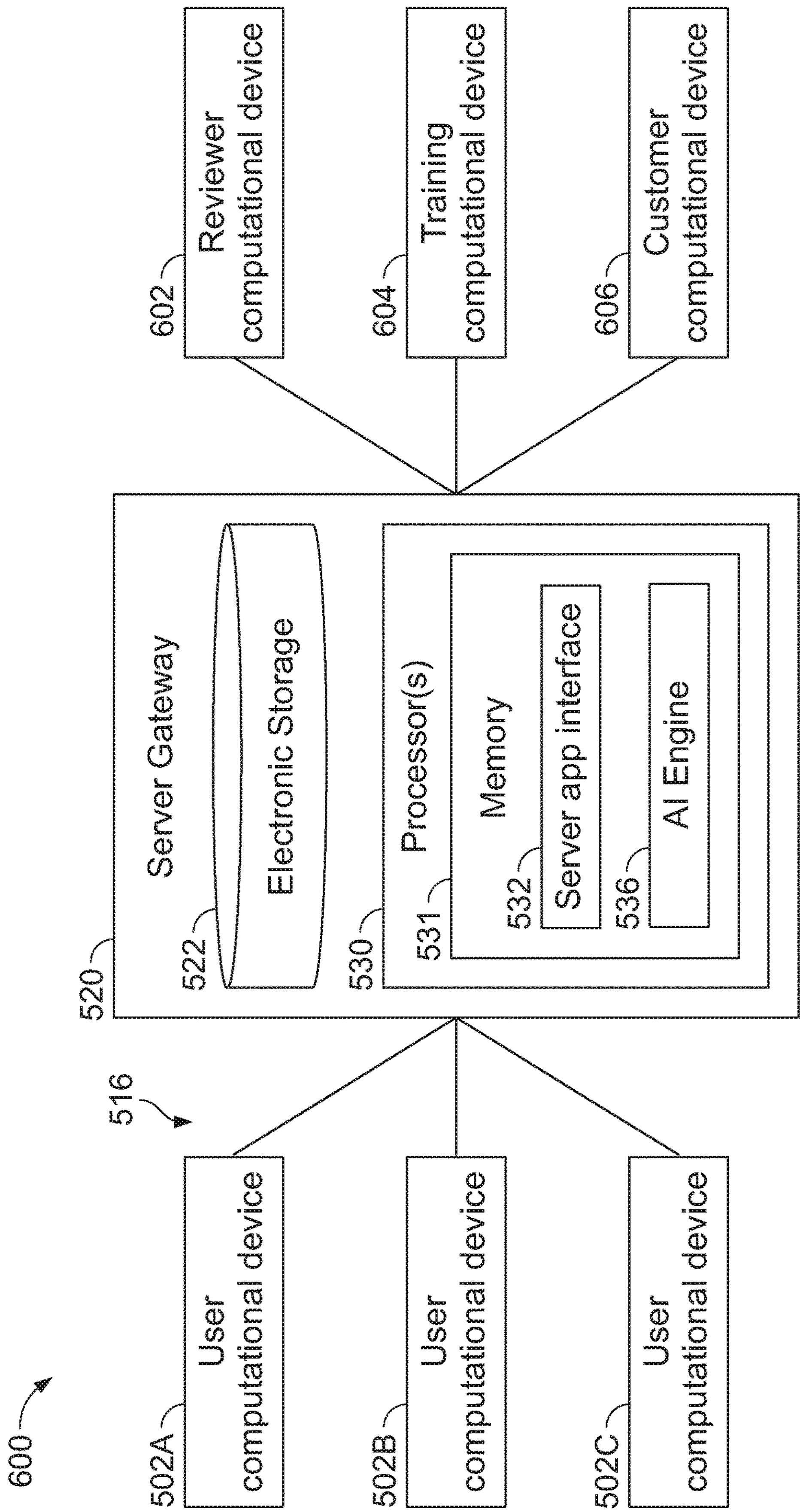
FIG. 6 shows a non-limiting, exemplary block diagram of a distributed computational system architecture according to at least some embodiments of the present invention.

Referring to FIG. 6, the system may be implemented as a distributed multi-user network architecture that enables collaborative workflows and distributed processing across specialized functional roles. The distributed architecture may include multiple user computational devices 502A, 502B, and 502C that connect via a network 516 to a server gateway 520. The server gateway 520 may contain an AI engine 536 that performs artificial intelligence processing functions for assessment generation operations.

The user computational devices 502A, 502B, and 502C may represent different users or organizations accessing the assessment generation system simultaneously. Each user computational device may communicate with the server gateway 520 through the network 516, enabling data transmission and processing requests to be sent to and from the central server infrastructure. The network 516 may facilitate bidirectional communication between the multiple user computational devices and the server gateway 520.

As further shown in FIG. 6, the server gateway 520 may be connected via an extended network 600 to additional specialized computational devices that support different functional roles within the assessment generation ecosystem. The extended network 600 may connect a reviewer computational device 602, a training computational device 604, and a customer computational device 606 to the server gateway 520. This extended network architecture may enable distributed processing and collaboration across different specialized functions.

The reviewer computational device 602 may be operated by administrators or subject matter experts who perform human-in-the-loop calibration functions and/or may design assessments as previously described. The reviewer computational device 602 may access generated assessments through the extended network 600 and provide feedback ratings that are incorporated into the system prompts for future assessment generation. The training computational device 604 may be dedicated to machine learning model training operations, including fine-tuning the mini-LLM validator and updating the AI engine 536 based on accumulated assessment examples and quality feedback.

The customer computational device 606 may represent end-user organizations that consume the generated assessments for their evaluation purposes. The customer computational device 606 may receive formatted assessment outputs through the extended network 600 and integrate the assessments into existing quiz platforms or learning management systems.

The AI engine 536 within the server gateway 520 may coordinate the multi-agent orchestra operations and manage the distributed processing workload across the network architecture. The AI engine 536 may distribute computational tasks to appropriate devices based on their specialized functions, such as directing validation tasks to the training computational device 604 or routing assessment reviews to the reviewer computational device 602. This distributed approach may enable parallel processing capabilities that reduce overall assessment generation time while maintaining quality standards across multiple concurrent users and assessment requests.

Figure 7A:
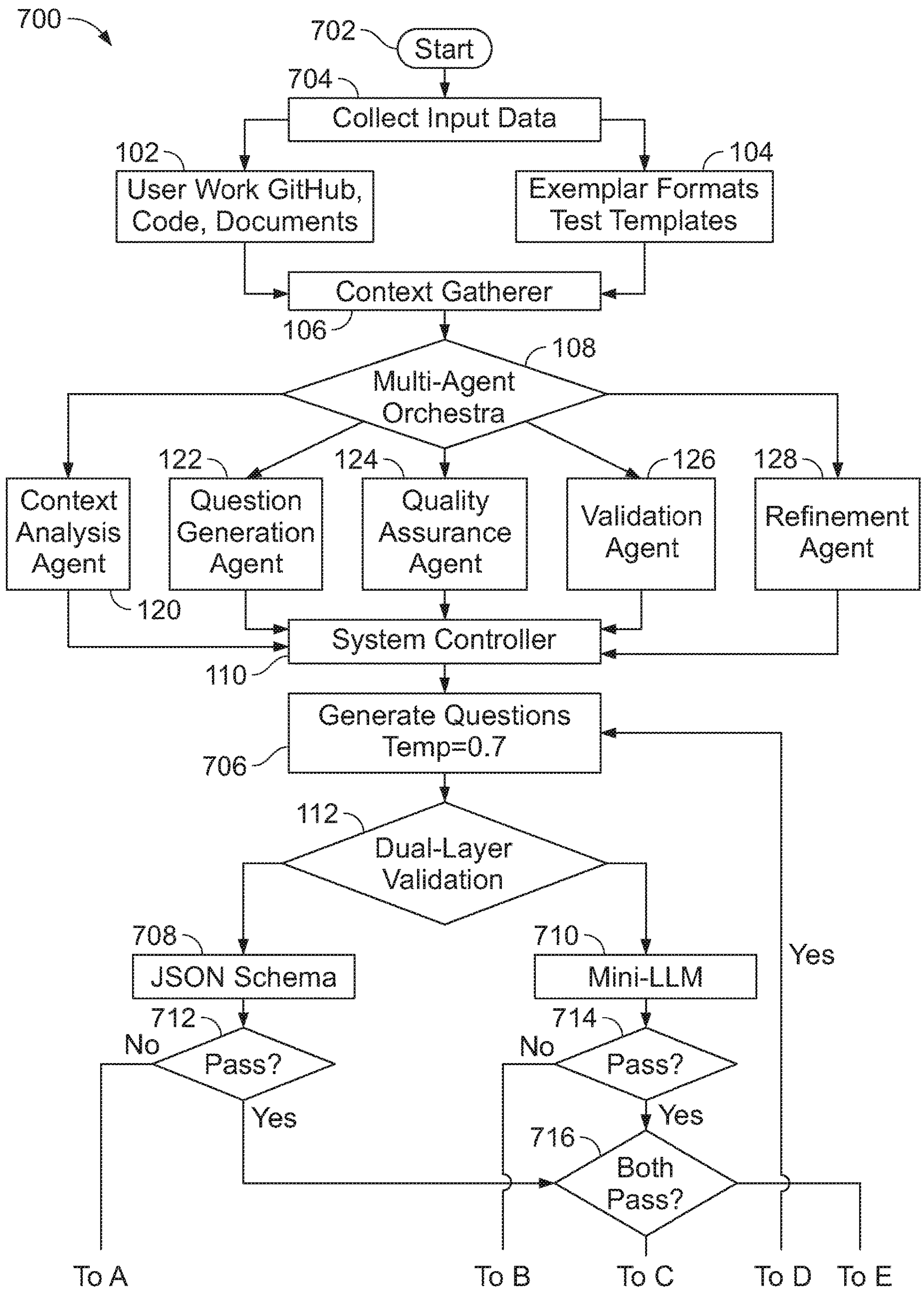
FIG. 7A shows a non-limiting, exemplary flowchart for a method of generating customized assessments through multi-agent orchestration and validation according to at least some embodiments of the present invention.

Referring to FIG. 7A, a method 700 preferably generates customized assessments through multi-agent orchestration and validation. The method 700 begins with a step 702, where the process is initiated to commence assessment generation operations. The method 700 then proceeds to a step 704, where a context gatherer 106 may collect input data from test taker work 102 and exemplar formats 104. The test taker work 102 may include version control contributions, code repositories, documentation, and other digital artifacts representing professional activities. The exemplar formats 104 may provide template structures and approved question formats that guide assessment generation. It should be noted that this non-limiting example relates to an assessment of test taker work 102 that includes software code and related items. One of ordinary skill in the art could easily generalize this process to other types of test taker work 102.

Following data collection, the method 700 may continue with the context gatherer 106, which may process and organize the collected data to extract relevant patterns and contextual information. The context gatherer 106 may pre-process the test taker work 102 to identify technologies, programming languages, and skill evolution patterns. The context gatherer 106 may also analyze the exemplar formats 104 to understand desired question structures and formatting requirements.

The method 700 may then proceed to operations with multi-agent orchestra 108, which may receive the processed context from the context gatherer 106. Within the multi-agent orchestra 108, the method 700 may then continue with coordination by system controller 110, which may coordinate multiple specialized agents. The system controller 110 may distribute tasks and manage communication between context analysis agents 120, question generation agents 122, quality assurance agents 124, validation agents 126, and refinement agents 128 operating within the multi-agent orchestra 108.

The method 700 may then move to a step 706, which represents a dual-layer validation decision point. At the step 706, a dual-layer validation 112 may evaluate whether the generated questions pass both structural and semantic validation criteria. The dual-layer validation 112 may comprise a primary layer 708 using JSON Schema validation for structural compliance and a secondary layer 710 using a fine-tuned mini-LLM with 1-3B parameters for semantic validation. The primary layer may check structural compliance, field presence, type validation, and format consistency. The secondary layer may perform semantic quality assessment, duplicate detection, and relevance scoring through the fine-tuned mini-LLM.

If the validation passes at the step 706, the method 700 may proceed to a step 712, which represents another validation checkpoint, determining whether the output of primary layer 708 is valid. If not, then the method proceeds from "To A" in FIG. 7A, to the path labeled "From A" in FIG. 7B. Step 714 is a checkpoint for determining whether the output of secondary layer 710 is valid. If not, then the method proceeds from "To B" in FIG. 7A, to the path labeled "From B" in FIG. 7B.

However, if the output of one or both of steps 712 and 714 passes validation, then the method proceeds to step 716, to determine whether the output of both steps 712 and 714 passes validation. From there, the method may proceed from "To C" in FIG. 7A to "From C" in FIG. 7B; or from "To E" in FIG. 7A to "From E" in FIG. 7B, depending on the output of step 716.

Figure 7B:
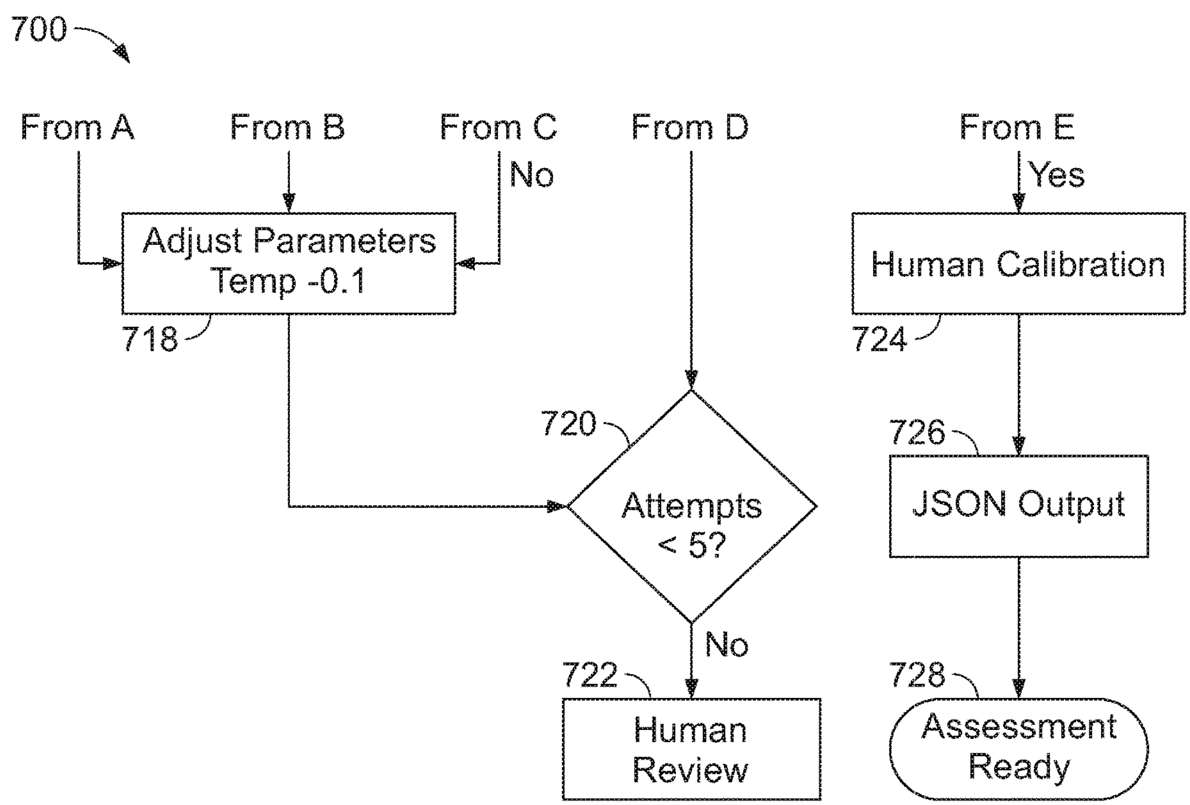
FIG. 7B shows a non-limiting, exemplary flowchart for a method implementing quality control and output generation processes for assessment creation according to at least some embodiments of the present invention.

With reference to FIG. 7B, the method 700 may implement quality control and output generation processes for assessment creation. The method 700 may proceed to step 718 for adjusting parameters, specifically showing temperature reduction of 0.1 as a non-limiting example of a parameter modification. Entry points "From A," "From B," and "From C" with a "No" designation (indicating that the output of both steps 712 and 714 did not pass validation at step 716) may direct the process flow to the step 718.

Following parameter adjustment at the step 718, the method 700 may proceed to a step 720, which may implement a decision point to evaluate whether attempts are less than a threshold number such as 5 for example. The step 720 represents a conditional check that determines the subsequent path based on the attempt count. If the condition at the step 720 is not satisfied, such that more than the threshold number of attempts have been performed, the method 700 may proceed to a step 722 for human review. The step 722 may involve manual evaluation of generated content when automated processes do not produce valid outputs within the attempt threshold.

If the condition at the step 720 is satisfied, then the method 700 may proceed back to step 706 in FIG. 7A.

If the method continues from the entry point "From E," because the output of both steps 712 and 714 did pass validation at step 716, preferably the method continues to a step 724 for human calibration. The step 724 may incorporate administrator feedback and quality assessment into the system. The human-in-loop calibration may include an initial calibration phase where administrators review 5-10 sample assessments using thumbs up/down or 1-5 scale ratings, as a non-limiting example. The calibration process may enable preference learning and incorporation of organizational standards into the assessment generation system.

Following the step 724, the method 700 may continue to a step 726 for JSON output generation. The step 726 may format the assessment content according to standardized schemas for platform compatibility. The output generator may produce questions with multiple choice or open ended formats, prototype answers with scoring rubrics, difficulty indicators, and compatible JSON formats. The questions may include structured data fields for question text, answer options, correct responses, difficulty levels, and scoring criteria.

The method 700 may then proceed to a step 728, where the assessment may be marked as ready. The step 728 may represent the final state of the workflow where validated and formatted assessments are prepared for deployment.

Figure 8A:
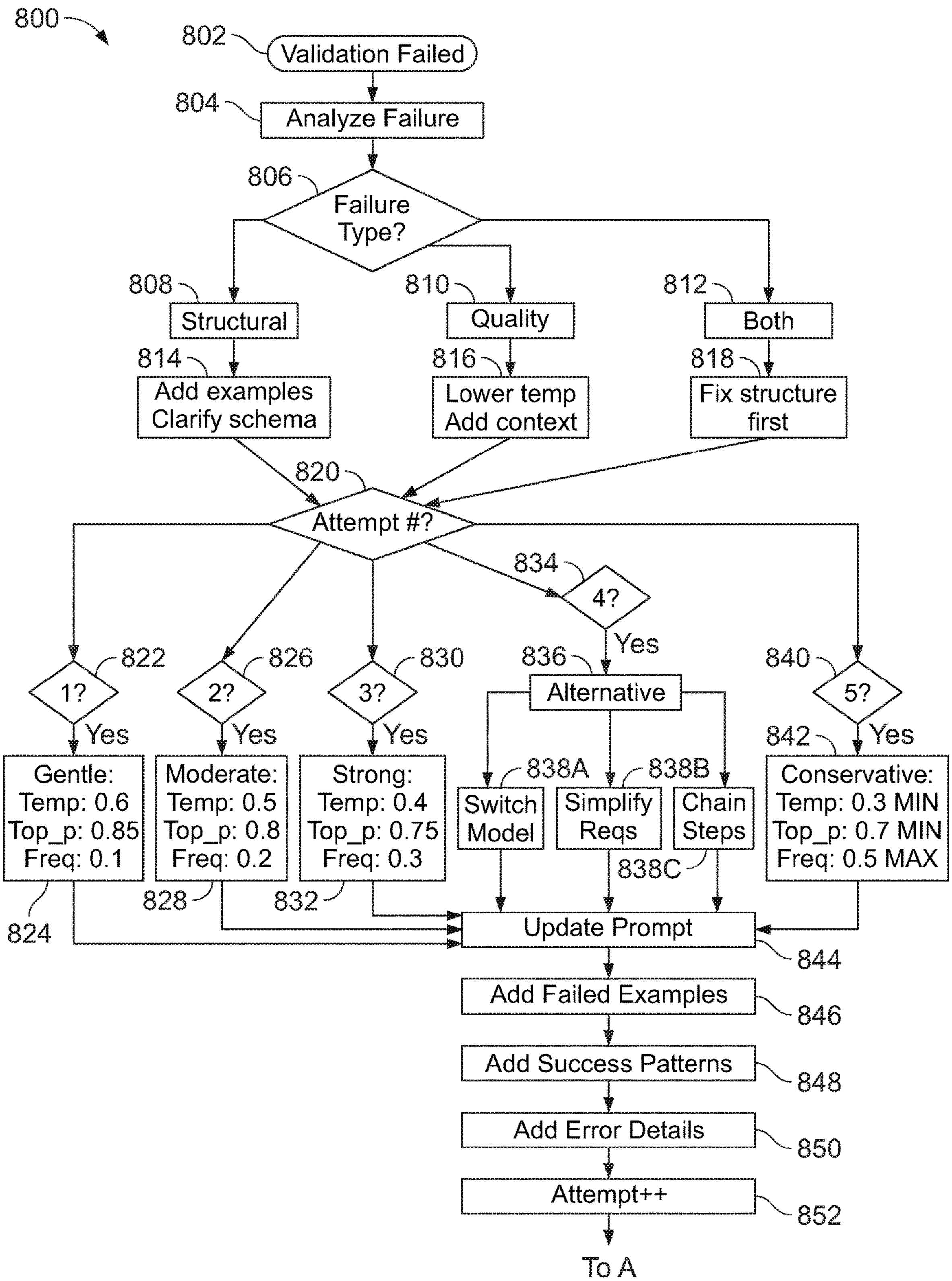
FIG. 8A shows a non-limiting, exemplary flowchart for a method of validation failure analysis and parameter adjustment according to at least some embodiments of the present invention.

Referring to FIG. 8A, a method 800 implements validation failure analysis and adaptive parameter adjustment for generating valid assessment outputs. The method 800 begins with a step 802, where a validation failure may be detected during the assessment generation process. The method 800 then proceeds to a step 804, where the system may analyze the failure type to determine appropriate corrective actions.

Following analysis, the method 800 moves to a step 806, which preferably features a decision point to determine the specific failure type. The step 806 may categorize failures into structural errors, quality deficiencies, or combinations of both failure types. Step 808 may be implemented to categorize the failure type as structural. Step 810 may be implemented to categorize the failure type as quality-related. Step 812 may be implemented to categorize the failure type as both structural and quality issues.

From step 808, the method 800 may continue to a step 814, where the system may add examples and clarify schemas to provide clearer guidance for subsequent generation attempts. From step 810, the method 800 may proceed to a step 816, where the system may lower temperature and add context to constrain generation parameters. From step 812, the method 800 may move to a step 818, where the system may fix structure first before addressing quality concerns.

The method 800 may then converge at a step 820, which preferably then determines a number of different paths or "attempts" to handle these various types of failures. From step 820, the method 800 preferably then branches to multiple parallel processing paths that implement progressive parameter constraints and/or optimizations. These paths may be run together or alternatively may be run according to the number of the attempts made (see FIG. 7B).

One path for example leads to a step 822, which may involve a decision point for gentle adjustments. If the condition at step 822 may be met, the method 800 may proceed to a step 824, where gentle temperature adjustments may be made, for example according to these non-limiting example parameters: temperature 0.6, top_p 0.85, and frequency penalty 0.1. These gentle adjustments may maintain creative variety while providing modest constraints to improve validation success rates.

Another path from step 820 may lead to a step 826, which may involve a decision point for moderate adjustments. If the condition at step 826 may be met, the method 800 may proceed to a step 828, where moderate adjustments may be applied, for example according to the non-limiting parameter values of temperature 0.4, top_p 0.75, and frequency penalty 0.2. The moderate adjustments may provide increased constraints while maintaining sufficient generation flexibility.

A third path from step 820 may lead to a step 830, which may involve a decision point for strong adjustments. If the condition at step 830 may be met, the method 800 may proceed to a step 832, where strong adjustments may be implemented, for example according to the non-limiting parameter values of temperature 0.3, top_p 0.7, and frequency penalty 0.3. The strong adjustments may significantly constrain generation parameters to increase validation success probability.

A fourth path from step 820 may lead to a step 834, which may involve a decision point for alternative processing strategies. From step 834, the method 800 may branch to a step 836, which may represent an alternative processing path, which may be implemented alone or in combination with any other path (for example, without regard to the number of attempts). From step 836, the method 800 may proceed to a step 838A, where the system may switch models to alternative language models with different capabilities. Alternatively, from step 836, the method 800 may proceed to a step 838B, where the system may use chain steps to break complex generation tasks into smaller components. As another alternative, from step 836, the method 800 may proceed to a step 838C, where the system may simplify requirements to reduce generation complexity. Optionally, one or more of steps 838A-C are performed together. Also, additionally or alternatively, other types of steps may be performed at 838, to try to overcome the previous failure(s).

A fifth path from step 820 may lead to a step 840, which involves a decision point for conservative adjustments. If the condition at step 840 may be met, the method 800 may proceed to a step 842, where conservative adjustments may be applied, for example according to the non-limiting parameter values of temperature 0.2 MIN, top_p 0.7, and frequency penalty 0.5 MAX. The conservative adjustments may represent the most constrained parameter settings to maximize validation success probability. Step 840 may also be performed with any of these steps as described herein.

All processing paths may converge at a step 844, where the system may update prompts based on the failure analysis and parameter adjustments. Following step 844, the method 800 may proceed to a step 846, where the system may add failed examples to provide negative examples for subsequent generation attempts. The method 800 may then continue to a step 848, where the system may add success patterns to reinforce positive generation behaviors. Following step 848, the method 800 may proceed to a step 850, where the system may add error details to provide specific guidance for avoiding previous failures. The method 800 may then move to a step 852, where the system may attempt regeneration with the adjusted parameters and enhanced prompts. The method then preferably continues from "To A" to the point labeled "From A" in FIG. 8B.

Figure 8B:
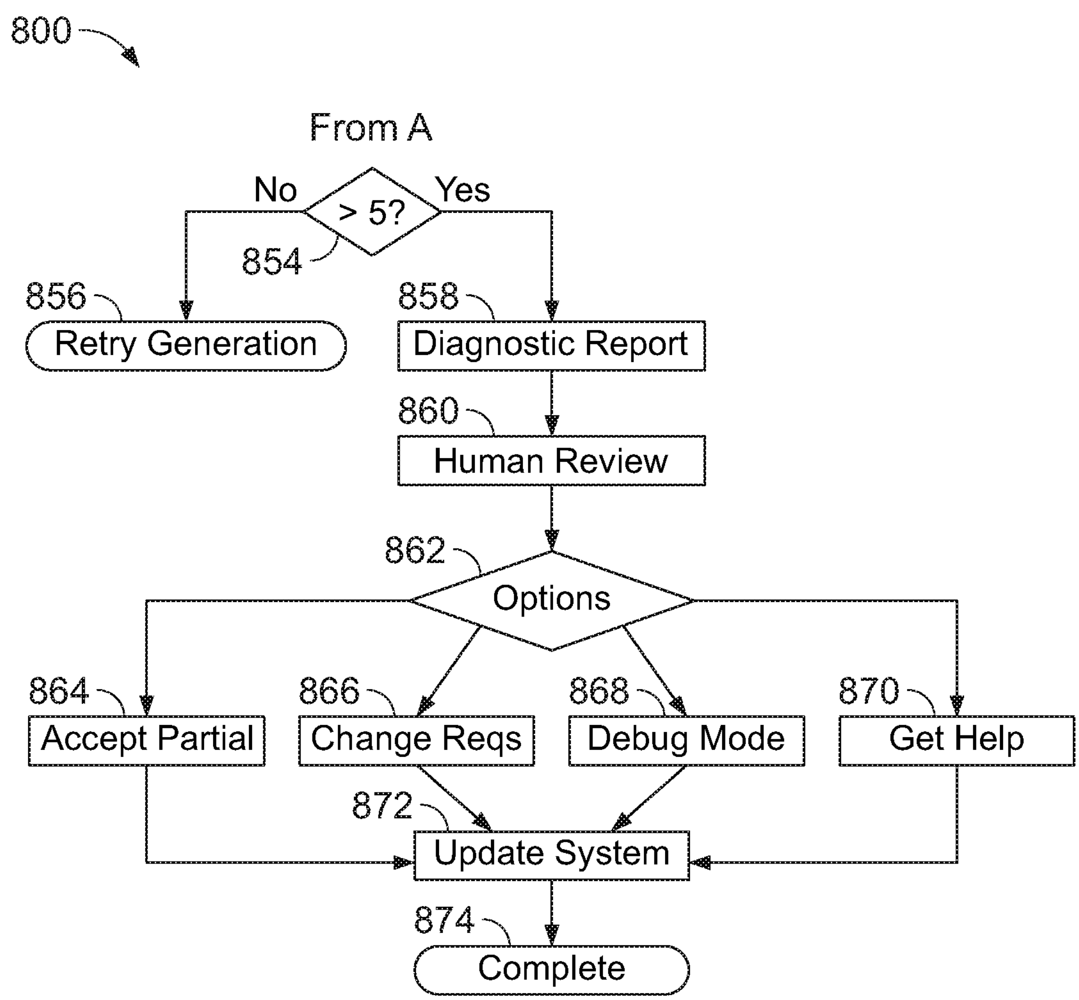
FIG. 8B shows a non-limiting, exemplary flowchart for a method implementing human review and system update operations according to at least some embodiments of the present invention.

With continued reference to FIG. 8B, the method 800 may proceed from a decision point labeled "From A" to step 854, which may evaluate a condition indicated by ">5?" to determine whether the maximum number of generation attempts has been exceeded as determined according to a threshold, of which five is a non-limiting example. If the condition is not met, such that the threshold number of attempts has not been performed, the method 800 may proceed to a step 856, where retry generation operations may be performed with the adjusted parameters. If the condition is met, indicating that the threshold number of attempts has been exceeded, the method 800 may proceed to a step 858, where a diagnostic report may be generated to document the failure patterns and attempted corrections.

Following step 858, the method 800 may continue to a step 860, where human review operations may be conducted to evaluate the diagnostic information and determine appropriate interventions. After human review, the method 800 may proceed to a step 862, which may represent a decision point labeled "Options" that determines the subsequent processing path based on human evaluation.

From step 862, the method 800 may branch to multiple alternative paths, which may be performed separately or a plurality of which may be performed in combination. One path may lead to a step 864, where accept partial operations may be performed to utilize successfully generated portions of the assessment. Another path from step 862 may lead to a step 866, where change request operations may be executed to modify generation requirements or constraints. A third path from step 862 may lead to a step 868, where debug mode operations may be initiated to provide detailed analysis of generation failures. A fourth path from step 862 may lead to a step 870, where get help operations may be performed to escalate the issue for additional technical support.

All four paths from steps 864, 866, 868, and 870 then preferably converge at a step 872, where update system operations may be conducted to incorporate the results from any of the preceding alternative processing paths. Following step 872, the method 800 may proceed to a step 874, where complete operations may finalize the process and document the resolution approach for future reference.

Figure 9A:
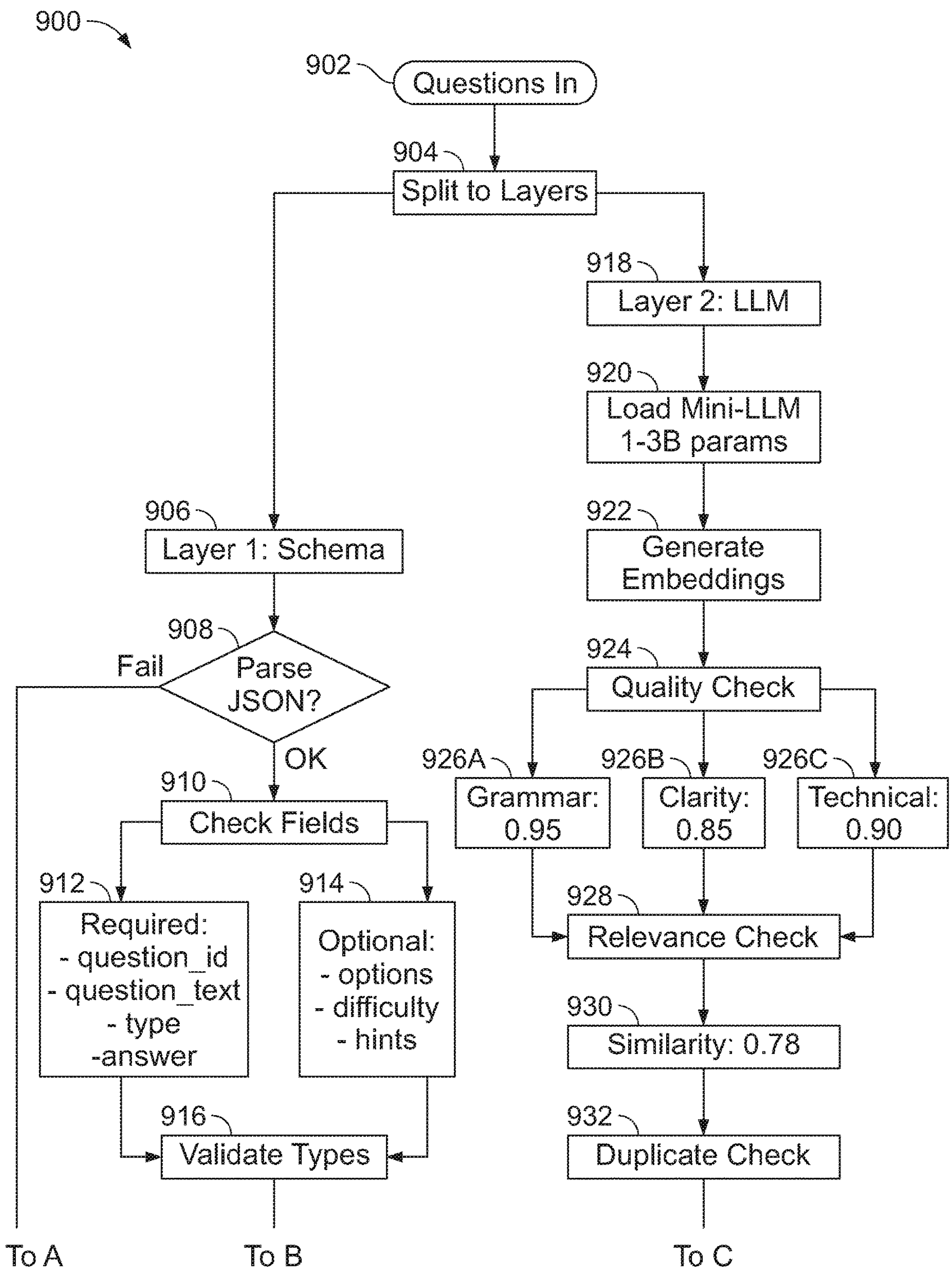
FIG. 9A shows a non-limiting, exemplary flowchart for a method of processing and validating assessment questions through a multi-layered quality control system according to at least some embodiments of the present invention.

Referring to FIG. 9A, a method 900 may implement processing and validation of assessment questions through a dual-layer quality control system. The method 900 may begin with a step 902, where questions may be received as input to the validation process. The method 900 may then proceed to a step 904, where the questions may be split into layers for parallel processing.

Following the split operation, the method 900 may diverge into two parallel processing paths. A first path may proceed to a step 906, labeled as Layer 1: Schema, which may perform structural validation operations. A second path may proceed to a step 918, labeled as Layer 2: LLM, which may perform semantic validation operations using a language model.

Considering now the first processing path, the method 900 may proceed from step 906 to a step 908, which may implement a decision point to parse JSON format, as a non-limiting example of a format to be analyzed. The step 908 may evaluate whether the question data conforms to valid JSON structure using JSON Schema draft-07 with Pydantic for strict structural compliance checking.

If the JSON parsing fails, the method 900 may proceed through the point in FIG. 9A marked "To A" to the point in FIG. 9B marked "From A", and hence to step 934 as described in greater detail below.

If the JSON parsing succeeds, the method 900 may proceed to a step 910, where field checking operations may be performed. From step 910, the method 900 may continue to a step 912, where required fields may be validated. The step 912 may verify the presence of such non-limiting examples of fields as question_id, question_text, type, and answer fields within the question data structure to ensure all required fields are present and prevent malformed data from propagating through the system. The method 900 may also process optional fields through a step 914, which may validate such non-limiting examples of fields as options, difficulty, and hints fields that may be present in the question data.

Both the step 912 and the step 914 may converge at the step 916, where type validation operations may be performed to ensure data type consistency across all fields. The step 916 may verify data types including but not limited to string, number, boolean, and null values, enforce enum restrictions, validate regex patterns, and confirm conditional dependencies to prevent type mismatches that could cause runtime failures in quiz platforms. From step 916, the method preferably continues from the point marked "To B" in FIG. 9A to the point marked "From B" in FIG. 9B, as described in greater detail below.

Considering the second path, the method 900 may proceed from step 918 to a step 920, where a mini-LLM with 1-3B parameters as a non-limiting example may be loaded for semantic analysis. The step 920 may utilize a specialized model optimized for efficiency, where models in the 1-3B parameter range represent a balance between capturing complex patterns and enabling rapid inference with latency under a threshold such as 100 milliseconds. The method 900 preferably then moves to a step 922, where embeddings may be generated from the assessment questions to enable semantic comparison operations.

Following embedding generation, the method 900 preferably proceeds to a step 924, where a quality check may be performed on the generated questions. The quality check may evaluate multiple dimensions of question quality through parallel assessment criteria. The method 900 may then split into three parallel quality assessment branches: a step 926A for grammar evaluation with a non-limiting exemplary threshold of 0.95, a step 926B for clarity evaluation with a non-limiting exemplary threshold of 0.85, and a step 926C for technical accuracy evaluation with a non-limiting exemplary threshold of 0.90. The step 926A may achieve grammatical correctness via integrated grammar checking, while the step 926B may assess question comprehensibility and the step 926C may verify technical accuracy for specific programming languages, as non-limiting examples.

The three parallel quality assessment branches may converge at a step 928, where a relevance check may be performed to verify the relationship between generated questions and source context. The method 900 may then proceed to a step 930, where a similarity calculation may be performed with a non-limiting exemplary threshold of 0.78 to measure question relevance. The step 930 may implement cosine similarity between question embeddings and source context embeddings using sentence-transformers, where a minimum similarity score to test taker's work context may be maintained, as for example with this non-limiting exemplary threshold shown.

Following similarity assessment, the method 900 may continue to a step 932, where a duplicate check may be performed to identify repeated or overly similar questions within the assessment set. The step 932 may compare questions against each other to ensure sufficient variation and uniqueness, where uniqueness may be maintained at less than a predetermined similarity threshold between questions in the set.

With continued reference to FIG. 9A and referring to FIG. 9B, the method 900 may continue from the point labeled "To A" in FIG. 9A, to the entry point labeled "From A" in FIG. 9B, by continuing to a step 934, described in greater detail below.

Figure 9B:
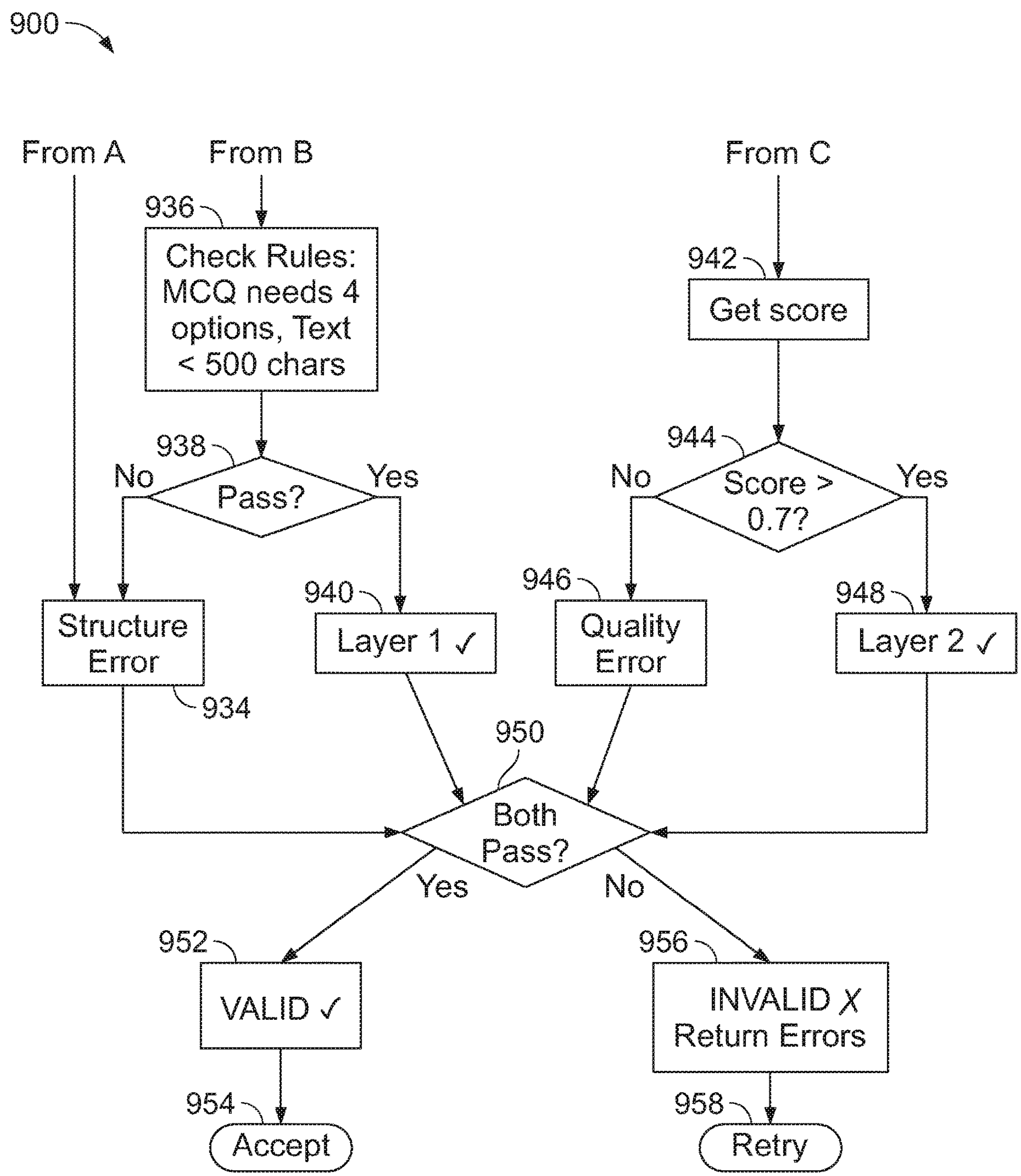
FIG. 9B shows a non-limiting, exemplary flowchart for a method implementing validation and quality assessment for generated assessment questions according to at least some embodiments of the present invention.

With continued reference to FIG. 9A and referring to FIG. 9B, the method 900 may continue from the point labeled "To B" in FIG. 9A, to the entry point labeled "From B" in FIG. 9B, by continuing to a step 936, which may receive input and perform rule checking to verify that multiple choice questions have 4 options and text contains fewer than 500 characters, as non-limiting examples of suitable parameters. The method 900 may then proceed to a step 938, which may implement a decision point to determine whether the generated content passes the structural validation rules. If the validation fails, the method 900 may proceed to a step 934, where a structure error may be identified and logged. If the validation succeeds, the method 900 may proceed to a step 940, which may process the content through Layer 1 validation.

The method 900 may continue in parallel with a step 942, which may obtain a quality score for the generated assessment content. Preferably step 942 continues from the entry point in FIG. 9B of "From C", which continues from "To C" in FIG. 9A. The method 900 may then proceed to a step 944, which may implement a decision point to determine whether the quality score exceeds a non-limiting exemplary threshold of 0.7. If the score does not exceed the threshold, the method 900 may proceed to a step 946, where a quality error may be identified. If the score exceeds the threshold, the method 900 may proceed to a step 948, which may process the content through Layer 2 validation.

The outputs from the step 934, the step 940, the step 946, and the step 948 may converge at a step 950, which may implement a decision point to determine whether both validation layers pass. The step 950 preferably represents a convergence point where both structural and semantic validation may be required for acceptance. If both validation layers pass, the method 900 preferably proceeds to a step 952, where the assessment content may be marked as valid. The method 900 may then continue to a step 954, where the validated content may be accepted for final output generation.

If either validation layer fails at the step 950, the method 900 may proceed to a step 956, where the content may be marked as invalid and error information may be returned. The method 900 may then proceed to a step 958, where the process may trigger a retry with adjusted parameters. The step 958 may implement iterative improvement through feedback loops, where validation failures may trigger parameter adjustment for regeneration.

Figure 10A:
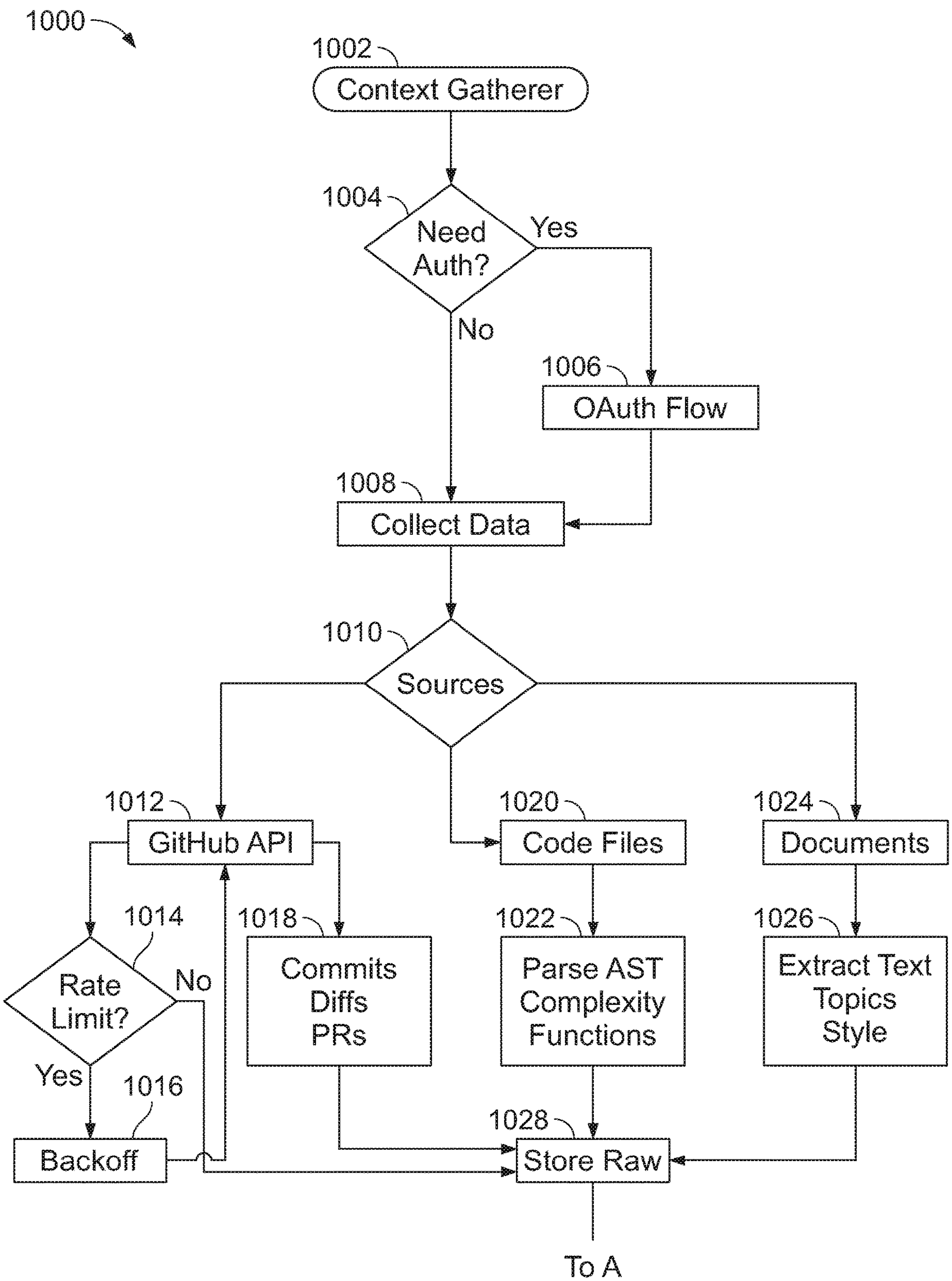
FIG. 10A shows a non-limiting, exemplary flowchart for a method of collecting and processing data from multiple sources for assessment generation according to at least some embodiments of the present invention.

Referring to FIG. 10A, a method 1000 is preferably implemented for collecting and processing data from multiple sources for assessment generation. The method 1000 preferably starts with a step 1002, where a context gatherer may initiate the data collection process. The method 1000 may then proceed to a step 1004, which may involve a decision point to determine whether authentication is needed for accessing data sources. If authentication may be needed, the method 1000 may move to a step 1006, where an OAuth flow may be executed to obtain access credentials. The OAuth flow may provide secure authentication for accessing external data repositories and services. If authentication may not be needed, the method 1000 may bypass the authentication step and proceed directly to subsequent processing.

Following the authentication decision, the method 1000 preferably continues to a step 1008, where data collection operations may be performed to gather test taker work information from various sources. The method 1000 may then move to a step 1010, which may implement a decision point to determine the types of sources from which data should be collected. The step 1010 may branch into multiple parallel paths based on the source type.

If the source is a GitHub API, as a non-limiting example, the method 1000 may proceed to a step 1012, where GitHub API operations may be executed to extract repository data, commit histories, and code contributions. The test taker work may include one or more of version control systems such as GitHub commits, GitLab merge requests, and Bitbucket pull requests; commit metadata including commit timestamp, commit message text, author identity, and branch information; file modification types including file additions, file deletions, and file modifications; and/or line-level code changes including added code lines, deleted code lines, and modified code lines. Following the GitHub API data extraction, the method 1000 may move to a step 1014, which may check whether rate limits have been reached for the API. If the rate limit may have been reached, the method 1000 may proceed to a step 1016, where a backoff mechanism may be implemented to pause processing and wait before retrying. The backoff mechanism may prevent API throttling and ensure continued data access.

Following the GitHub API connection at step 1012, the method 1000 may proceed to a step 1018, where commit-level data extraction operations may be performed to retrieve individual commit records including commit diffs, pull request content, and code review interactions. Step 1018 may parse each commit diff to identify added, modified, and deleted code segments, extract pull request descriptions and associated commentary, and capture branch merge events to establish the temporal sequence of code contributions.

If the rate limit may not have been reached, the method 1000 may bypass the backoff step and continue to data storage operations at step 1028 as described in greater detail below, for example from step 1018.

If the source type at the step 1010 instead includes code files, the method 1000 may proceed to a step 1020, where code file parsing operations may be performed. The step 1020 may involve extracting code structure, identifying programming languages, and analyzing code complexity. Following code file processing, the method 1000 may move to a step 1022, where parsing operations may be executed to extract abstract syntax tree representations, complexity metrics, and function definitions from the code files.

As further shown in FIG. 10A, if the source type at the step 1010 comprises documents, the method 1000 may proceed to a step 1024, where document processing operations may be initiated. The test taker work may include writing and content creation such as essay collections, blog posts, technical documentation, research papers, creative writing portfolios, journalism articles, and marketing copy. The test taker work may also include design artifacts such as Figma files, Sketch documents, Adobe Creative Cloud projects, CAD models, and architectural drawings. Additionally, the test taker work may include data analysis work such as Jupyter notebooks, R scripts, SQL queries, and Excel formulas. The method 1000 may then move to a step 1026, where text extraction operations may be performed to identify topics, writing style characteristics, and technical concepts from the documents.

After processing data from the various source types through one or more of the steps 1012, 1020, or 1024, and their respective subsequent steps, the method 1000 preferably converges to a step 1028, where raw data storage operations may be performed. The step 1028 may involve storing the collected and processed data in a structured format for subsequent analysis and assessment generation operations.

Figure 10B:
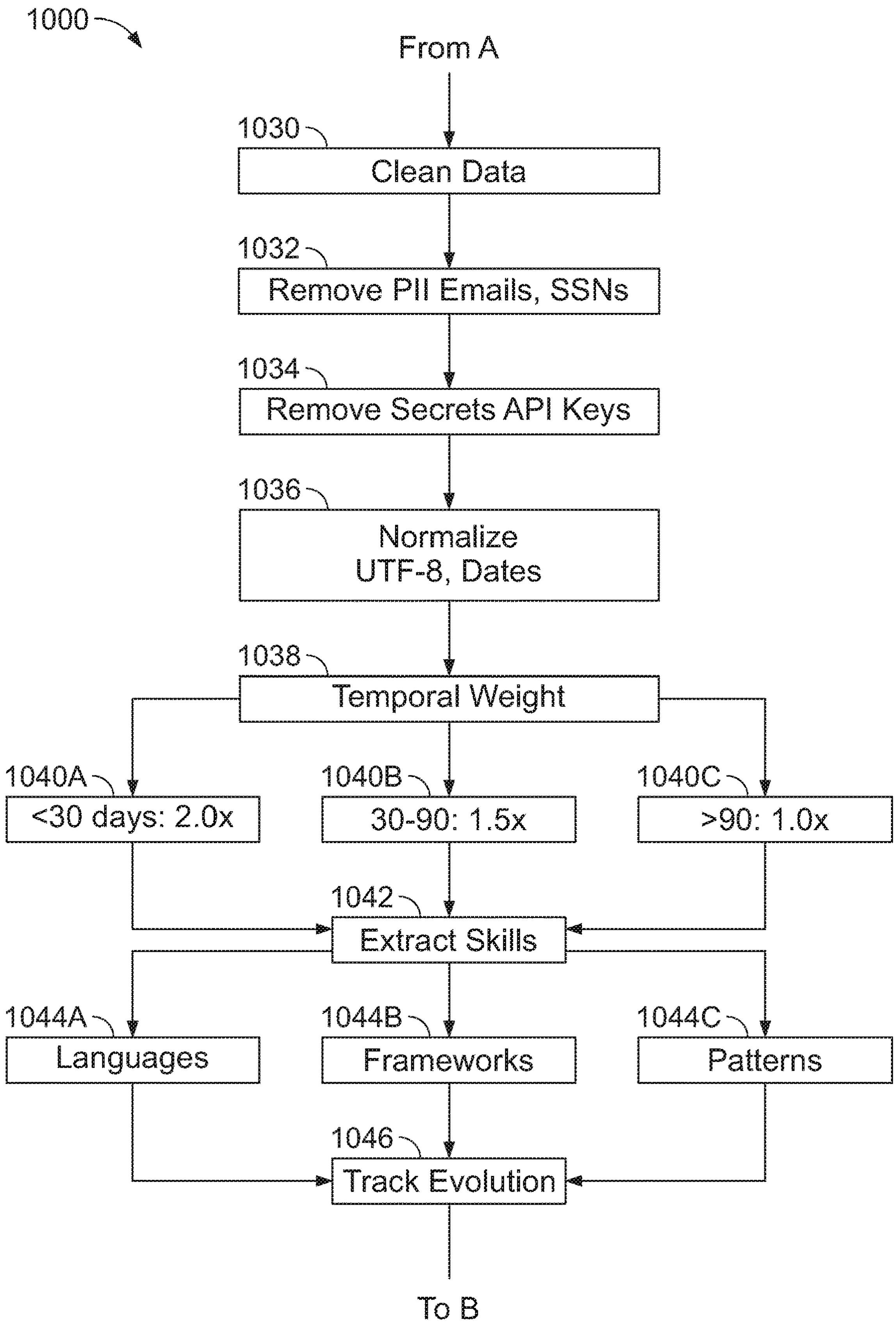
FIG. 10B shows a non-limiting, exemplary flowchart for a method of processing test taker work data through multiple stages including data cleaning and temporal weighting according to at least some embodiments of the present invention.

From the point labeled "To A" in FIG. 10A, the method preferably continues to the entry point labeled "From A" in FIG. 10B.

Referring to FIG. 10B, the method 1000 may continue with a step 1030, where data cleaning operations may be performed on the collected test taker work data. Following data cleaning, the method 1000 may proceed to a step 1032, where PII (Personally Identifiable Information) such as emails and SSNs (Social Security Numbers) for example may be removed from the dataset to ensure privacy compliance. The method 1000 may then move to a step 1034, where secrets and API keys may be removed from the processed data to prevent exposure of sensitive authentication credentials.

After removing sensitive information, the method 1000 may continue to a step 1036, where normalization operations may be applied, for example to standardize UTF-8 encoding and date formats across the dataset. Following normalization, the method 1000 may proceed to a step 1038, where temporal weighting may be applied to the test taker work data. The temporal weighting step may branch into three parallel processing paths based on the age of the work contributions. Non-limiting examples of these branches (according to work periods) and relevant exemplary weightings are now provided. A step 1040A may apply a weighting factor of 2.0× to work that may be less than 30 days old. Simultaneously, a step 1040B may apply a weighting factor of 1.5× to work that may be between 30 and 90 days old. In parallel, a step 1040C may apply a weighting factor of 1.0× to work that may be greater than 90 days old.

With continued reference to FIG. 10B, the three parallel weighting paths may converge into a step 1042, where skills may be extracted from the temporally weighted data. The skill extraction step 1042 may then branch into three parallel extraction operations, as shown according to these non-limiting examples. A step 1044A may extract programming languages from the processed data. Concurrently, a step 1044B may extract frameworks and libraries used in the test taker's work. In parallel, a step 1044C may extract patterns and coding practices demonstrated in the user contributions. The three parallel extraction paths from the steps 1044A, 1044B, and 1044C may converge into a step 1046, where the evolution of skills over time may be tracked and analyzed.

Figure 10C:
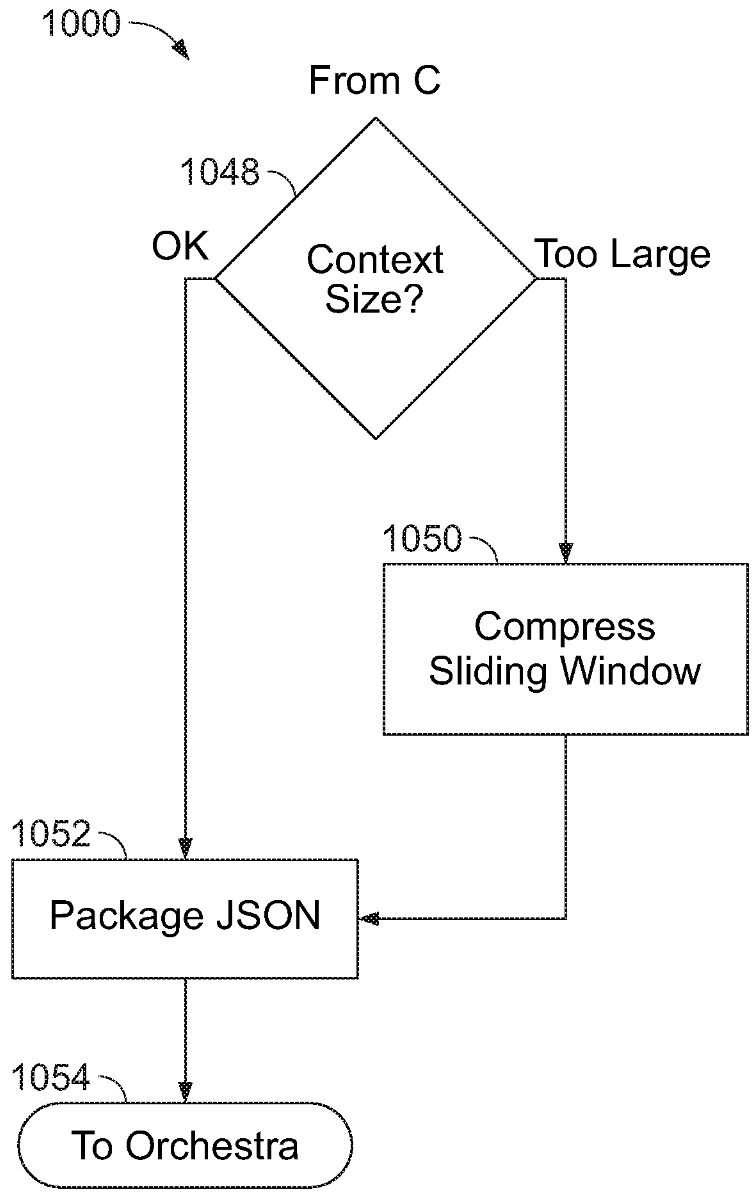
FIG. 10C shows a non-limiting, exemplary flowchart for a method addressing context window limitations during assessment generation according to at least some embodiments of the present invention.

From the point labeled "To B" in FIG. 10B, the method preferably continues to the entry point labeled "From B" in FIG. 10C.

Referring to FIG. 10C, the method 1000 preferably continues to a step 1048, which features a decision point to evaluate context size. The step 1048 may determine whether the context size exceeds a threshold of a number of tokens or other predefined limits. For example, the context size may be set at 50,000 tokens, 100,000 tokens, 500,000 tokens, one million tokens or more, and every integral number in between. If the context size is within acceptable limits, the method 1000 may proceed directly to a step 1052, where the system may package the context data in JSON format. If the context size is too large, the method 1000 may proceed to a step 1050, where the system may compress the context using a sliding window approach as a non-limiting example of a compression or reduction technique. The step 1050 may implement overlapping windows with 20% overlap or hierarchical compression techniques, or any other suitable approach, to reduce the context size while maintaining relevant information.

Following either the direct path from the step 1048 or the compression operation at the step 1050, the method 1000 then preferably converges at the step 1052, where the context data is preferably in a suitable format such as the JSON format for example. The step 1052 may structure the data according to predefined schemas to ensure compatibility with downstream processing components. The method 1000 may then proceed to a step 1054, where the suitably packaged data is preferably transmitted to the orchestration system. The step 1054 may represent the final output stage where the processed context becomes available for the multi-agent orchestra to generate assessment questions.

The system preferably operates through a coordinated workflow where test taker work data flows sequentially through multiple processing stages to generate customized assessments. The operational process begins when the system collects test taker work data from various sources including version control systems, code repositories, and documentation platforms. The collected data may undergo preprocessing to extract relevant technical concepts, programming languages, and skill indicators that form the foundation for assessment generation.

During the context gathering phase, the system may implement vector database solutions to enable semantic similarity calculations between test taker work content and potential assessment topics. The system may utilize Pinecone or Weaviate as vector database options to store and query high-dimensional embeddings representing code concepts, technical skills, and knowledge domains. These vector databases may facilitate rapid similarity searches that identify the most relevant technical areas for assessment question generation based on the test taker's demonstrated expertise.

The system may encounter context window limitations when processing large volumes of test taker work data that exceed the input capacity of language models. To address these limitations, the system may implement a sliding window approach with 20% overlap between consecutive data segments. This sliding window technique may maintain continuity across data boundaries while ensuring that no relevant context information becomes lost during processing. Alternatively, the system may employ hierarchical compression methods that preserve detailed information for recent work while progressively summarizing older contributions.

The hierarchical compression approach may apply temporal weighting factors to prioritize recent user activities over historical work. The system may assign a weighting factor of 2× to recent work compared to older contributions, ensuring that current skills and knowledge receive appropriate emphasis in the assessment generation process. This temporal weighting may enable the system to create assessments that reflect the test taker's current competency level while maintaining awareness of their historical skill development.

The multi-agent processing phase may coordinate multiple specialized agents that operate in parallel to analyze context, generate questions, and validate outputs. Each agent may focus on specific aspects of the assessment creation process, with the context analysis agent extracting technical concepts while the question generation agent creates candidate assessment items. The quality assurance agent may evaluate generated content for relevance and accuracy, while the validation agent may ensure compliance with formatting requirements.

The system may achieve performance improvements of 200-300× faster generation compared to manual assessment creation methods. This performance enhancement may result from the parallel processing capabilities of the multi-agent architecture combined with the rapid inference speeds of modern language models. The system may support real-time adaptation to feedback, enabling immediate regeneration of assessment content when validation failures occur or when human reviewers provide quality adjustments.

The validation process may incorporate dual-layer checking that combines structural validation with semantic quality assessment. The structural validation layer may verify JSON schema compliance, field presence, and format consistency across all generated assessment items. The semantic validation layer may evaluate question relevance, technical accuracy, and uniqueness to prevent duplicate content within assessment sets.

The output generation phase may produce assessments in multiple formats to accommodate different evaluation approaches. The system may generate multiple choice questions with predetermined answer options and single correct responses. Alternatively, the system may create open-ended questions that require written responses and subjective evaluation. Each generated question may include prototype answers that demonstrate expected response quality and depth.

The system may provide scoring rubrics that define evaluation criteria for each assessment item. These scoring rubrics may specify point allocations, acceptable answer variations, and quality thresholds for different response levels. The rubrics may enable consistent grading across multiple evaluators and provide clear expectations for assessment participants.

Each generated assessment item may include difficulty indicators that reflect the complexity level of the associated questions. The system may calculate difficulty ratings based on the technical complexity of the source material, the cognitive load required for correct responses, and historical performance data from similar assessment items. These difficulty indicators may enable appropriate assessment targeting for users with different skill levels and experience backgrounds.

The system may format all output data in JSON or other suitable structures that maintain compatibility with existing quiz platforms and learning management systems. The standardized output format may include question text, answer options, correct responses, difficulty ratings, and metadata fields that support integration with external assessment tools. This compatibility may eliminate the need for manual reformatting and enable direct import into established educational and evaluation platforms.

The system may implement comprehensive quality metrics and validation procedures to ensure generated assessments meet rigorous standards for technical accuracy, difficulty calibration, and semantic coherence. Technical accuracy may be verified through automated execution of code-based questions in sandboxed environments that test the validity of programming solutions and syntax. The system may cross-reference factual claims with official documentation to validate technical assertions and ensure that generated questions reflect current best practices and accurate information within specific programming languages or technical domains.

Difficulty calibration may be achieved through complexity analysis of source code combined with historical pass rate data from similar questions to ensure appropriate challenge levels. The system may analyze the computational complexity, algorithmic sophistication, and conceptual depth of test taker work samples to generate questions that match the demonstrated skill level. Semantic coherence may be measured using cosine similarity calculations between question embeddings and source context embeddings through sentence-transformers, with a minimum threshold of 0.7 similarity score required to ensure direct relevance to the test taker's work context and demonstrated competencies.

Assessment quality measurement may encompass multiple validation dimensions including syntactic validity with 98% or higher grammatical correctness achieved through integrated grammar checking systems. Semantic coherence may be evaluated based on direct relationships between generated questions and extracted user concepts, ensuring that assessments reflect actual work patterns and demonstrated skills. Difficulty calibration may be matched to the complexity of actual code contributions, creating assessments that appropriately challenge users based on their historical performance and technical sophistication levels.

Question validity criteria may establish specific thresholds for acceptance including technical accuracy verification for the specific programming language or domain, single correct answer requirements for multiple-choice formats, and relevance scores exceeding 0.7 cosine similarity to user context. The system may also enforce uniqueness requirements with less than 0.3 similarity between questions within the same assessment set to prevent redundancy and ensure comprehensive coverage of relevant topics. These validation criteria may work together to create a robust quality assurance framework that maintains high standards while enabling automated generation of personalized assessments tailored to individual test taker work histories and demonstrated competencies.

The system may implement automatic skill discovery functionality that identifies competencies beyond those explicitly specified by a system during assessment configuration. When a system establishes an assessment, the system may define specific skill domains to evaluate, such as Python programming or React framework proficiency. However, the context analysis agent may analyze the test taker's complete work history, including git commit histories and code repositories, and may identify additional skill areas that demonstrate substantial competency. The system may detect patterns indicating expertise in areas the system did not anticipate, such as cryptography library usage, database optimization work, or continuous integration and deployment pipeline development.

The discovered skill identification process may compare extracted concepts from the temporal knowledge graph against the system-specified skill domains. The system may flag skill areas that appear with substantive evidence rather than incidental usage, evaluating factors including depth of usage, number of commits, time period of activity, and whether complexity increased over the evaluation period. Skills that demonstrate repeated and progressively complex usage patterns that fall outside the system's predefined scope may be classified as discovered skills. The system may generate assessment questions for these discovered skill areas and may tag the questions to indicate they were not part of the original assessment request, enabling the system to distinguish between requested and discovered content.

The system may exercise control over discovered skill inclusion through configuration options that determine system behavior. The system may choose to include discovered skill questions in the final assessment, exclude them entirely, or review them individually before making inclusion decisions. The system may implement sensitivity settings that control the aggressiveness of skill discovery, allowing systems to configure whether the system actively surfaces new skill areas or remains strictly within the defined assessment scope. Filtering mechanisms may prevent the system from flagging skills based on superficial evidence, such as one-time library imports, by requiring threshold levels of engagement depth and temporal consistency before classifying an area as a genuine discovered competency.

The system may implement cross-session learning capabilities that improve assessment quality over time based on accumulated human feedback. When administrators rate questions, flag difficulty issues, mark content as irrelevant, or identify bias through calibration interfaces, the feedback may be stored in a feedback database maintained on the server. As feedback accumulates across multiple sessions and test takers, pattern detection algorithms may analyze the aggregated data to identify systematic quality trends. The system may learn that questions based on commits involving certain framework combinations consistently receive low clarity scores, or that questions targeting particular skill levels are rated as too easy across multiple systems and organizations.

The identified patterns may be converted into parameter adjustments that are propagated to the specialized agents within the multi-agent orchestra, enabling continuous improvement of generated assessment quality without requiring model retraining or system redeployment. The calibration component may maintain a version-controlled history of parameter configurations along with associated performance metrics, enabling the system to track long-term quality trends and detect when improvement has plateaued for specific question types or skill areas. A closed-loop feedback mechanism may deploy parameter changes automatically, measure performance against baseline metrics, and roll back changes that degrade quality, ensuring that only beneficial adjustments persist in the system configuration.

The cross-session learning may compound over the operational lifetime of the system rather than being limited to individual administrator sessions. The system may converge on parameter settings that reflect the combined expertise of all administrators who have provided feedback, effectively encoding institutional knowledge about assessment quality into the operational behavior of the agents. The accumulated learning may produce measurable improvements where assessments generated at later time periods demonstrably outperform earlier assessments on quality scores, difficulty calibration accuracy, and relevance metrics, all as a direct result of the integrated test taker feedback mechanisms.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for generating customized knowledge assessments, comprising:

one or more processors;

memory coupled to the one or more processors; and wherein the memory stores instructions that, when executed by the one or more processors, implement:

a context gatherer executed by the one or more processors, wherein said context gatherer is configured to:

collect test taker work data from one or more version control data sources, wherein the test taker work data comprises temporal sequences of code modifications;

collect exemplar test formats; and preprocess the collected test taker work data by:

analyzing commit diff patterns across the temporal sequences to identify concept introduction events and concept refinement sequences;

extracting cross-file dependency relationships from import statements and module references across multiple commits;

constructing a temporal knowledge graph representing skill progression over time, wherein nodes represent technical concepts and edges represent temporal relationships between concept introduction and usage; and extracting programming language constructs, frameworks, and libraries from the version control data to identify demonstrated skill sets;

a multi-agent orchestra, executed by the one or more processors, said orchestra comprising a plurality of specialized agents operating concurrently with asynchronous communication, each agent executed on a separate process, the plurality of specialized agents including:

a context analysis agent configured to process a temporal knowledge graph and extract technical concepts with associated skill level indicators;

a question generation agent configured to generate candidate assessment questions targeted to detected skill levels based on the extracted technical concepts;

a quality assurance agent configured to evaluate the candidate assessment questions against the temporal knowledge graph and assign quality scores based on alignment between question difficulty and demonstrated skill progression;

a validation agent configured to verify schema compliance of the candidate assessment questions; and a refinement agent configured to iteratively improve the candidate assessment questions based on feedback messages from other agents;

wherein the context analysis agent, the question generation agent, quality assurance agent, the validation agent, and the refinement agent are computerized machine learning agents;

said multi-agent orchestra further comprising an asynchronous message queue system stored in shared memory accessible by the plurality of specialized agents, the message queue system implementing non-blocking message passing between agents through: message routing mapping message types to agent queue identifiers; priority queuing structures assigning urgency levels to messages; and serialization protocols converting agent output data structures into transmittable structured messages;

a system controller configured to:

coordinate the plurality of specialized agents within the multi-agent orchestra through a message passing protocol through said asynchronous message queue system wherein agents exchange structured messages including dependency declarations that specify prerequisite processing requirements, blocking conditions that pause agent processing pending other agent outputs, and partial results that enable downstream agents to begin processing before upstream agents complete;

manage bidirectional communication between the agents, wherein the bidirectional communication enables agents to request additional processing from other agents and to provide intermediate results that dynamically adjust other agents' processing strategies through said asynchronous message queue system; and implement an adaptive task allocation mechanism wherein agents signal their processing capacity and confidence levels, enabling the system controller to dynamically route subtasks to agents based on current load and specialization through said asynchronous message queue system;

a dual-layer validation system, executed by said one or more processors, comprising:

a first validation layer configured to perform structural validation using defined schema checking to verify field presence, data type consistency, and format compliance; and a second validation layer comprising a fine-tuned language model configured to perform semantic validation including:

duplicate detection through semantic similarity analysis of question embeddings;

relevance scoring by comparing question content to source concepts in the temporal knowledge graph; and skill-level alignment verification to ensure question difficulty matches demonstrated skill levels;

wherein the dual-layer validation system implements a feedback loop where:

semantic validation results indicating systematic failure patterns are provided to the first validation layer to inform dynamic schema refinement; and structural validation failures provide contextual information to the second validation layer to enable root cause analysis of generation errors; and wherein both validation layers are required to pass for acceptance of the candidate assessment questions; and an output generator configured to produce formatted assessment outputs based on validated assessment questions, wherein the formatted assessment outputs include metadata linking each question to specific commits and skill progression stages in the temporal knowledge graph.

2. The system of claim 1, wherein: the test taker work data comprises version control contributions from one or more of commits, merge requests, and pull requests; and the context gatherer is further configured to extract, for each commit in the temporal sequences:

commit metadata including commit timestamp, commit message text, author identity, and branch information;

file modification types including file additions, file deletions, and file modifications; and line-level code changes including added code lines, deleted code lines, and modified code lines.

3. The system of claim 2, wherein the context gatherer is further configured to:

extract programming language constructs, frameworks, and libraries from the version control contributions;

identify concept introduction events by detecting first occurrences of technical concepts within the temporal sequences based on analysis of import statements, class definitions, and function signatures that have not appeared in prior commits;

identify concept refinement sequences by detecting subsequent modifications to previously introduced concepts based on analyzing commit diffs that modify existing classes, functions, or modules; and assign temporal weights to extracted technical concepts based on recency of usage, frequency of modification, and complexity progression over time.

4. The system of claim 1, wherein the temporal knowledge graph comprises:

concept nodes representing technical concepts extracted from the test taker work data, wherein each concept node includes:

a concept identifier;

a skill level indicator derived from code complexity metrics associated with the concept;

a proficiency score based on frequency of concept usage and sophistication of concept application; and temporal metadata including first introduction timestamp and most recent usage timestamp;

and temporal edges connecting concept nodes, wherein each temporal edge represents one of:

a prerequisite relationship indicating that mastery of a first concept preceded introduction of a second concept;

a refinement progression indicating iterative improvements to a concept over multiple commits;

a usage correlation indicating co-occurrence of concepts within related commits; or a mastery indicator based on decreasing error rates and increasing complexity in concept application over time.

5. The system of claim 4, wherein the context analysis agent is further configured to:

analyze the temporal knowledge graph to identify skill progression patterns including:

novice indicators comprising first introduction of a concept with simple usage patterns;

intermediate indicators comprising repeated usage of a concept with increasing complexity;

advanced indicators comprising sophisticated usage of a concept including optimization, error handling, and integration with multiple other concepts; and expert indicators comprising concept mastery demonstrated by teaching patterns including code documentation, helper functions, and abstraction layers;

wherein the question generation agent generates candidate assessment questions with difficulty levels calibrated to match detected skill progression patterns for specific technical concepts in the temporal knowledge graph.

6. The system of claim 4, wherein the quality assurance agent is configured to:

assign quality scores on a scale from 0.0 to 1.0 based on evaluation criteria comprising:

technical accuracy determined by comparing question technical concepts against concepts present in the temporal knowledge graph;

relevance determined by calculating semantic similarity between question content and recently active concepts in the temporal knowledge graph;

difficulty alignment determined by comparing question complexity metrics against detected skill level for the relevant concept in the temporal knowledge graph; and temporal appropriateness determined by verifying that question technical concepts correspond to concepts demonstrated in recent commits within a configurable time window;

wherein the quality assurance agent rejects candidate assessment questions having quality scores below a threshold value; and wherein the quality assurance agent provides quality score breakdowns identifying which evaluation criteria contributed to low scores, enabling targeted refinement by the refinement agent.

7. The system of claim 4, wherein the question generation agent comprises:

a processor and memory storing instructions that, when executed by the processor, cause the question generation agent to:

receive target skill level indicators from the context analysis agent through the message passing protocol;

wherein the target skill level indicators comprise structured data packets containing:

technical concept identifiers encoded as hash values or string identifiers;

numerical skill level scores on a continuous scale from 0.0 to 1.0, wherein scores of 0.0-0.3 indicate novice level, 0.3-0.6 indicate intermediate level, 0.6-0.8 indicate advanced level, and 0.8-1.0 indicate expert level;

proficiency metrics comprising usage frequency counts and complexity progression rates computed from the temporal knowledge graph;

temporal metadata including first introduction timestamps and most recent usage timestamps;

access a question template repository stored in the memory or in shared memory accessible by the processor, wherein the question template repository comprises a database or indexed data structure storing a plurality of question template records, each question template record comprising:

a template identifier for uniquely identifying the template;

a question structure string containing fixed text portions and parameterizable element markers enclosed in delimiters, wherein parameterizable element markers indicate positions where variable content should be inserted;

a difficulty level classification encoded as a numerical value or categorical label indicating the cognitive complexity required to answer questions generated from the template;

required technical concept type specifications defining which categories of technical concepts are compatible with the template;

answer evaluation criteria comprising expected answer patterns, acceptable variations, and scoring rubrics;

scaffolding level indicators specifying the amount of pre-filled code, hints, or structural guidance included in the template;

execute, on the processor, a template selection process that:

compares the numerical skill level scores from received target skill level indicators against the difficulty level classifications of question templates in the repository;

filters question templates to identify candidate templates having difficulty levels within a threshold range of the target skill level, wherein the threshold range may be ±0.2 on the 0.0-1.0 scale;

verifies that the required technical concept types of candidate templates match the technical concept identifiers in the received skill level indicators;

computes template suitability scores by combining difficulty matching scores and concept type matching scores;

selects one or more question templates having highest template suitability scores;

populate parameterizable elements in the selected question templates by executing, on the processor, a parameter insertion process that:

parses the question structure string to identify parameterizable element markers and extract the marker positions within the string;

retrieves specific technical concepts from the temporal knowledge graph by executing graph query operations that match the technical concept identifiers from the skill level indicators to concept nodes in the graph;

retrieves code examples from recent commits in the test taker work data by querying a code repository database using the technical concept identifiers as search keys and applying temporal filters to select commits within a recent time window comprising previous 90 days;

extracts contextual information about the test taker's demonstrated skill progression patterns by traversing temporal edges in the temporal knowledge graph to identify concept refinement sequences and mastery indicators;

applies complexity modifiers encoded as numerical multipliers to adjust question difficulty, wherein complexity modifiers are computed based on the difference between the test taker's current skill level score and a target difficulty level, and wherein modifiers greater than 1.0 increase complexity while modifiers less than 1.0 decrease complexity;

generates replacement text for each parameterizable element by combining the retrieved technical concepts, code examples, and contextual information according to formatting rules specified in the question template;

substitutes the generated replacement text for the parameterizable element markers in the question structure string to produce populated question text;

invoke a large language model (LLM) application programming interface (API) by transmitting, from the processor, an API request comprising:

the populated question text as a prompt input;

generation parameters including temperature setting, top-p setting, and maximum token limits;

wherein said temperature setting is selected to provide sufficient randomness for diverse question generation while maintaining coherence, and said top-p parameter is selected to allow broad token selection during the generation process; the technical concept identifiers and skill level indicators as metadata to guide generation;

receive, at the processor, a language model response comprising generated candidate assessment question text returned from the language model API;

implement a difficulty calibration process by executing, on the processor, difficulty adjustment processes that:

analyze the skill level score from the target skill level indicators;

when the skill level score indicates novice level (0.0-0.3), select question templates having scaffolding level indicators specifying high scaffolding, wherein high scaffolding comprises providing complete code frameworks with blank sections for students to complete, and generate questions that focus on concept recognition by testing whether the user can identify correct syntax, recognize standard library functions, or match concepts to definitions;

when the skill level score indicates intermediate level (0.3-0.6), select question templates having scaffolding level indicators specifying partial scaffolding, wherein partial scaffolding comprises providing function signatures and data structures but requiring users to implement logic, and generate questions that focus on concept application by testing whether the user can implement algorithms, integrate multiple concepts, or debug provided code;

when the skill level score indicates advanced level (0.6-0.8), select question templates having scaffolding level indicators specifying minimal scaffolding, wherein minimal scaffolding comprises providing only requirements and constraints without code structure, and generate questions that focus on optimization and multi-concept integration by testing whether the user can optimize performance, handle edge cases, or design solutions using multiple technical concepts;

when the skill level score indicates expert level (0.8-1.0), select question templates having scaffolding level indicators specifying no scaffolding, and generate questions that focus on architectural decisions by testing whether the user can design system architectures, explain trade-offs between approaches, or create novel solutions to undefined problems;

and store the generated candidate assessment questions in the memory or transmit the questions through the message passing protocol to the quality assurance agent for evaluation.

8. The system of claim 7, wherein the question generation agent is further configured to:

execute, on the processor, a zone of proximal development targeting process that analyzes the temporal knowledge graph to ensure generated candidate assessment questions target the boundary of current competency, wherein the process comprises:

identifying boundary concepts by executing graph traversal operations on the temporal knowledge graph that:

extracting all concept nodes from the temporal knowledge graph having proficiency scores between 0.5 and 0.8, wherein proficiency scores below 0.5 indicate concepts not yet mastered and scores above 0.8 indicate fully mastered concepts, and wherein boundary concepts in the 0.5-0.8 range represent skills at the edge of current capability;

analyzing temporal edges connecting each boundary concept node to prerequisite concept nodes and dependent concept nodes, wherein prerequisite edges indicate concepts that were learned before the boundary concept and dependent edges indicate concepts that build upon the boundary concept;

computing a readiness score for each boundary concept by analyzing the proficiency scores of prerequisite concepts, wherein the readiness score equals the mean proficiency score of all prerequisite concepts, and wherein boundary concepts having readiness scores above 0.7 indicate that foundational knowledge is sufficiently strong to support learning of the boundary concept;

filtering boundary concepts to select target concepts having readiness scores above the threshold of 0.7, ensuring that questions test concepts for which the user has adequate prerequisite knowledge; and generating questions requiring application of mastered concepts to partially familiar contexts by:

identifying mastered concepts as concept nodes having proficiency scores above 0.8 in the temporal knowledge graph;

identifying partially familiar contexts by executing queries on the code repository that retrieve code files containing both mastered concepts and target boundary concepts, wherein such files represent contexts where the user has demonstrated mastery of some aspects but not others;

extracting code patterns from the retrieved code files that demonstrate usage of mastered concepts in combination with boundary concepts; and populating question templates with the extracted code patterns, wherein the questions require the user to extend or modify the code in ways that apply their mastered concepts to solve problems involving boundary concepts.

9. The system of claim 8, wherein said process further comprises avoiding questions outside the zone of proximal development by executing, on the processor, filtering operations that:

reject candidate questions requiring concepts not yet demonstrated in the temporal knowledge graph, wherein the rejection process comprises comparing technical concept identifiers in candidate questions against concept identifiers in the temporal knowledge graph, and discarding questions containing concepts absent from the graph or having proficiency scores below 0.3;

reject candidate questions testing concepts far below demonstrated competency level, wherein the rejection process comprises identifying questions having difficulty level classifications more than 0.4 below the test taker's mean proficiency score across all concepts in their skill domain, as such questions would be insufficiently challenging;

compute a proximity score for each candidate question by calculating the absolute difference between the question's difficulty level and the mean proficiency score of the tested concepts in the temporal knowledge graph;

filter candidate questions to retain only those having proximity scores below a threshold such as 0.3, ensuring questions are neither too easy nor too difficult relative to current demonstrated capability.

10. The system of claim 1, wherein the message passing protocol comprises sending messages, wherein said messages comprise:

dependency declaration messages sent from a first agent to a second agent, wherein each dependency declaration message specifies:

a required output type from the second agent;

a completion deadline for the required output;

priority level indicating urgency of the dependency; and fallback strategy to execute if the required output is not received by the completion deadline;

blocking condition messages sent from an agent to the system controller, wherein each blocking condition message specifies:

an agent identifier for the blocked agent;

a dependency identifier indicating which required output is awaited;

estimated blocking duration; and alternative processing tasks the blocked agent can execute while waiting;

partial result messages sent from an agent to one or more downstream agents, wherein each partial result message includes:

intermediate processing results;

confidence score indicating reliability of the partial results;

completion percentage indicating progress toward final output; and estimated time to completion for remaining processing.

11. The system of claim 10, wherein the system controller implements the adaptive task allocation mechanism by:

receiving capacity signals from each agent in the multi-agent orchestra, wherein each capacity signal indicates:

current processing load as a percentage of maximum capacity;

estimated completion time for currently assigned tasks;

specialized capability indicators identifying types of processing tasks the agent handles most efficiently; and historical performance metrics for similar tasks;

receiving confidence signals from each agent for available processing subtasks, wherein each confidence signal indicates a probability score that the agent will successfully complete a specific subtask based on similarity to previously completed tasks;

calculating task allocation scores for each agent-subtask pairing by combining the capacity signal and confidence signal using a weighted scoring function; and dynamically routing subtasks to agents with highest task allocation scores, thereby achieving load balancing and specialization emergence without pre-defined agent role assignments.

12. The system of claim 1, wherein the dual-layer validation system implements a first feedback loop comprising:

the second validation layer detecting systematic semantic validation failures by identifying recurring patterns in failed candidate assessment questions, said patterns comprising:

common missing fields across multiple failures;

common data type mismatches across multiple failures; or common format inconsistencies across multiple failures;

the second validation layer generating schema refinement recommendations based on the detected systematic failure patterns, wherein each schema refinement recommendation specifies:

a proposed new validation rule to prevent the recurring failure pattern;

a confidence score indicating likelihood that the proposed rule will reduce failure rates;

estimated impact on validation strictness; and estimated false positive rate for the proposed rule;

the first validation layer incorporating schema refinement recommendations having confidence scores above a threshold into the defined schema checking; and the first validation layer applying updated schema rules to subsequent candidate assessment questions, thereby creating a self-improving validation system that adapts schema rules based on observed semantic validation patterns.

13. The system of claim 12, wherein the dual-layer validation system implements a second feedback loop comprising:

the first validation layer detecting structural validation failures and capturing failure context including:

specific validation rule that failed;

expected data format or structure;

actual data format or structure received; and question generation parameters used to generate the failed candidate assessment question;

the first validation layer providing the failure context to the second validation layer;

the second validation layer performing root cause analysis by:

analyzing semantic content of failed questions to identify generation patterns correlated with specific structural failures;

identifying question generation parameters that frequently result in structural validation failures;

determining whether structural failures indicate genuine errors or overly strict schema rules; and generating parameter adjustment recommendations to prevent structural failures while maintaining semantic quality;

the system controller receiving the parameter adjustment recommendations from the second validation layer; and the system controller providing the parameter adjustment recommendations to the question generation agent for consideration in generating subsequent candidate assessment questions.

14. The system of claim 1, wherein the refinement agent is configured to iteratively improve candidate assessment questions by:

receiving feedback messages from the quality assurance agent and the validation agent, wherein each feedback message includes:

a question identifier for the candidate assessment question requiring refinement;

a feedback type indicator specifying whether feedback pertains to technical accuracy, relevance, difficulty, clarity, structural validity, or semantic validity;

a specific deficiency description identifying what aspect of the candidate assessment question is deficient; and a suggested refinement direction providing guidance on how to address the deficiency;

analyzing multiple feedback messages for the same candidate assessment question to identify:

conflicting feedback indicators where different agents provide contradictory refinement directions;

consensus feedback indicators where multiple agents identify the same deficiency; and priority ranking for feedback based on severity of deficiency and confidence scores from originating agents;

generating refinement strategies for addressing identified deficiencies, wherein each refinement strategy specifies:

specific question elements to modify;

modification operations to apply;

expected improvement in quality scores; and risk assessment indicating likelihood that refinement may introduce new deficiencies;

applying refinement strategies to generate refined candidate assessment questions; and resubmitting refined candidate assessment questions to the quality assurance agent and validation agent for re-evaluation, wherein the refinement agent terminates iterative refinement when:

quality scores exceed threshold values and both validation layers pass; or a maximum iteration count is reached; or improvement between consecutive iterations falls below a minimum improvement threshold.

15. The system of claim 1, wherein the context analysis agent is configured to process the temporal knowledge graph by:

identifying technical concept clusters within the temporal knowledge graph, wherein each technical concept cluster comprises:

a primary concept node representing a core technical area;

related concept nodes connected to the primary concept node through temporal edges; and a cluster coherence score indicating semantic relatedness of concepts within the cluster;

determining skill density for each technical concept cluster by:

counting number of commits involving concepts within the cluster;

calculating average code complexity metrics for code associated with the cluster;

analyzing temporal distribution of commits to identify active development periods versus inactive periods for the cluster; and generating a skill density score representing depth of expertise in the technical area represented by the cluster;

extracting technical concepts from high skill density clusters for prioritization in question generation, wherein high skill density indicates:

frequent usage of related technical concepts;

increasing complexity over time in usage of the technical concepts; and sustained engagement with the technical concepts over multiple time periods;

extracting technical concepts from low skill density clusters for remedial question generation, wherein low skill density indicates:

infrequent usage or recent abandonment of technical concepts;

lack of complexity progression in usage; or limited engagement with foundational prerequisites for the technical concepts; and providing extracted technical concepts with associated skill level indicators to the question generation agent, wherein skill level indicators are derived from skill density scores and temporal progression patterns within clusters.

16. The system of claim 1, further comprising a human-in-the-loop calibration component comprising a processor and memory storing instructions that, when executed by the processor, cause the calibration component to:

present generated assessments to an administrator through a calibration interface executing on an administrator computing device, wherein the calibration interface displays:

each candidate assessment question alongside its corresponding source commit identifiers from the temporal knowledge graph;

computed quality scores from the quality assurance agent displayed as numerical values;

detected skill level indicators extracted from the temporal knowledge graph; and selectable interface elements configured to capture administrator input as structured data entries;

receive administrator input through the selectable interface elements and convert the administrator input into machine-readable calibration data structures stored in the memory, wherein the calibration data structures comprise:

numerical rating vectors encoding quality ratings on a scale of 0.0 to 1.0 for individual questions;

text modification records capturing specific character sequences to be added, deleted, or modified in question text;

difficulty adjustment flags encoded as integer values of −1, 0, or +1 indicating whether question difficulty should decrease, remain unchanged, or increase;

relevance mismatch indicators stored as boolean flags associated with specific technical concept identifiers from the temporal knowledge graph; and bias detection markers linking specific question identifiers to problematic question characteristics stored as enumerated values;

automatically analyze the calibration data structures to compute statistical metrics, wherein the processors execute pattern detection processes that:

calculate mean and standard deviation of numerical rating vectors across question template types to identify consistently high-rated template identifiers and consistently low-rated template identifiers;

aggregate difficulty adjustment flags grouped by skill level indicators to compute difficulty calibration error rates for each skill level;

compute correlation coefficients between relevance mismatch indicators and temporal knowledge graph characteristics to identify systematic relevance misalignments;

generate pattern summary data structures encoding the identified statistical patterns;

automatically generate parameter modification instructions based on the pattern summary data structures, wherein the processors compute:

prompt weight adjustments encoded as floating-point multipliers to be applied to system prompt components, wherein successful question characteristics receive weight increases of 0.1 to 0.3 and unsuccessful characteristics receive weight decreases of 0.1 to 0.3;

difficulty calibration offset values encoded as floating-point numbers representing adjustments to complexity scoring functions, computed as the mean of difficulty adjustment flags for each skill level;

relevance threshold modifications encoded as floating-point values representing changes to minimum acceptable cosine similarity scores, adjusted based on correlation coefficients between relevance mismatches and technical concepts;

bias detection rule additions encoded as regular expression patterns or keyword lists derived from bias detection markers;

automatically transmit the parameter modification instructions to the multi-agent orchestra through the message passing protocol, wherein transmission comprises:

serializing parameter modification instructions into message packets with destination agent identifiers;

writing message packets to agent-specific message queues in shared memory;

setting priority flags to ensure parameter updates are processed before new question generation requests;

wherein agents in the multi-agent orchestra automatically modify their operational parameters upon receiving parameter modification instructions by:

the question generation agent loading updated prompt weights from received messages and applying the updated weights as multipliers to prompt component selection probabilities during language model invocation, thereby increasing the probability of generating questions with characteristics similar to high-rated examples and decreasing the probability of generating questions with characteristics similar to low-rated examples;

the quality assurance agent loading difficulty calibration offset values and adding the offset values to computed complexity scores before comparing to skill level thresholds, thereby adjusting which questions are classified as appropriate difficulty for each skill level;

the quality assurance agent loading updated relevance threshold values and comparing question-to-context similarity scores against the updated thresholds rather than baseline thresholds, thereby filtering questions that fail to meet the adjusted relevance criteria;

the validation agent loading bias detection rule additions and executing the additional rules during semantic validation to reject questions matching the newly identified bias patterns;

wherein the calibration component implements a closed-loop technical feedback system wherein:

the processors store baseline performance metrics in the memory before applying parameter modifications, wherein baseline metrics include mean quality ratings, difficulty calibration accuracy rates, and relevance match percentages;

the processors monitor current performance metrics from assessments generated after parameter modifications are applied, computing the current metrics using the same statistical methods as the baseline metrics;

the processors execute comparison processes that compute delta values representing changes in performance metrics, wherein delta values equal current metrics minus baseline metrics;

the processors automatically execute rollback operations when delta values indicate performance degradation, wherein rollback comprises transmitting original parameter values to agents through the message passing protocol and instructing agents to reload previous parameter configurations;

the rollback operations execute without requiring additional administrator input, creating an automated closed-loop control system;

wherein the calibration control implements version control of parameter configurations by:

storing each parameter configuration as a versioned record in the memory with associated timestamp and version identifier;

maintaining a current version pointer indicating which parameter configuration version is actively deployed;

enabling rollback by updating the current version pointer to reference a previous version and transmitting the referenced parameter configuration to agents;

wherein the calibration control implements A/B testing of parameter modifications by:

configuring a first subset of agents in the multi-agent orchestra to use modified parameter configurations while configuring a second subset of agents to use baseline parameter configurations;

routing assessment generation requests alternately to the first subset and the second subset;

computing separate performance metrics for assessments generated by the first subset versus the second subset;

automatically promoting modified parameters to all agents when first subset performance exceeds second subset performance by a threshold percentage, or automatically reverting to baseline parameters when second subset performance exceeds first subset performance;

wherein the human-in-the-loop calibration component implements a closed-loop technical control system in which administrator input captured through the calibration interface automatically triggers computational analysis of calibration data, automatic generation of parameter modifications, automatic transmission of modifications to distributed agents, automatic modification of agent behavior through parameter updates, automatic measurement of resulting performance changes, and automatic rollback of ineffective modifications, thereby creating a self-regulating system that continuously refines agent parameters based on administrator expertise without requiring manual intervention for each individual assessment generation operation.

17. The system of claim 1, wherein:

the context gatherer is further configured to collect test taker work data from multiple version control repositories associated with the same user, wherein the multiple version control repositories represent different projects;

the context gatherer is configured to construct an integrated temporal knowledge graph by:

merging temporal sequences of code modifications from the multiple version control repositories into a unified timeline based on commit timestamps;

identifying cross-repository concept relationships where the same technical concepts appear across multiple projects;

detecting knowledge transfer patterns where concepts first introduced in a first repository subsequently appear in a second repository, indicating skill transfer across projects;

calculating cross-repository skill consistency scores by comparing skill level indicators for the same technical concepts across different repositories to identify concepts with consistent mastery versus concepts with inconsistent application;

identifying project-specific specializations where certain technical concepts appear predominantly in one repository, indicating focused expertise areas; and weighting concepts based on cross-repository breadth, wherein concepts appearing in multiple repositories receive higher weights as indicators of transferable skills;

the question generation agent is configured to generate cross-project assessment questions that:

test application of concepts demonstrated across multiple repositories;

evaluate knowledge transfer capability by presenting concepts in novel project contexts different from repositories where the concepts were demonstrated; and assess consistency of skill application across different project types; and the output generator is configured to produce cross-repository analysis reports identifying:

portable skills demonstrated consistently across projects;

project-specific skills demonstrated solely within particular repositories; and skill transfer trajectories showing how skills developed in one project context were subsequently applied in different project contexts.

18. The system of claim 1, wherein:

the system controller is further configured to implement parallel processing by:

partitioning the test taker work data into multiple processing batches based on temporal windows, wherein each processing batch corresponds to a time period of commits;

instantiating multiple instances of the context analysis agent, wherein each instance processes a different processing batch in parallel;

coordinating parallel processing through the message passing protocol by:

distributing processing batches to available context analysis agent instances based on agent capacity signals;

collecting partial temporal knowledge graphs generated by each context analysis agent instance;

merging partial temporal knowledge graphs into the integrated temporal knowledge graph by:

identifying overlapping concept nodes appearing in multiple partial temporal knowledge graphs;

resolving conflicts in skill level indicators for overlapping concept nodes by prioritizing more recent temporal data;

creating cross-boundary temporal edges connecting concepts from different processing batches to maintain temporal continuity; and validating merged temporal knowledge graph for consistency and completeness;

the system controller is further configured to implement dynamic scaling by:

monitoring processing time for generating candidate assessment questions;

detecting performance bottlenecks by identifying agents with consistently high capacity utilization;

instantiating additional agent instances when capacity utilization exceeds a high threshold;

distributing workload to newly instantiated agent instances through the adaptive task allocation mechanism; and deactivating agent instances when capacity utilization falls below a low threshold to conserve computational resources;

the multi-agent orchestra is configured to operate in a distributed computing environment comprising:

multiple computing nodes networked together;

a distributed message passing infrastructure for routing messages between agents operating on different computing nodes; and a distributed shared memory system enabling access to the temporal knowledge graph and candidate assessment questions from multiple computing nodes;

wherein the parallel processing and dynamic scaling capabilities enable the system to process large-scale test taker work data comprising:

more than 1,000 commits;

more than 100,000 lines of code; and temporal spans exceeding one year of development history.

19. A method for generating customized knowledge assessments, comprising:

collecting, by a context gatherer, test taker work data from one or more version control data sources, wherein the test taker work data comprises temporal sequences of code modifications;

collecting, by the context gatherer, exemplar test formats;

preprocessing the collected test taker work data by:

analyzing commit diff patterns across the temporal sequences to identify concept introduction events and concept refinement sequences;

extracting cross-file dependency relationships from import statements and module references across multiple commits;

constructing a temporal knowledge graph representing skill progression over time, wherein nodes represent technical concepts and edges represent temporal relationships between concept introduction and usage; and extracting programming language constructs, frameworks, and libraries from the version control data to identify demonstrated skill sets;

coordinating, by a system controller, a plurality of specialized agents within a multi-agent orchestra operating concurrently with asynchronous communication, the plurality of specialized agents including:

a context analysis agent that processes a temporal knowledge graph and extracts technical concepts with associated skill level indicators;

a question generation agent that generates candidate assessment questions targeted to detected skill levels based on the extracted technical concepts;

a quality assurance agent that evaluates the candidate assessment questions against the temporal knowledge graph and assigns quality scores based on alignment between question difficulty and demonstrated skill progression;

a validation agent that verifies schema compliance of the candidate assessment questions; and a refinement agent that iteratively improves the candidate assessment questions based on feedback messages from other agents;

wherein the context analysis agent, the question generation agent, quality assurance agent, the validation agent, and the refinement agent are computerized machine learning agents;

managing, by the system controller, coordination of the plurality of specialized agents through a message passing protocol wherein agents exchange structured messages including:

dependency declarations that specify prerequisite processing requirements;

blocking conditions that pause agent processing pending other agent outputs; and partial results that enable downstream agents to begin processing before upstream agents complete;

enabling, by the system controller through the message passing protocol, bidirectional communication between the agents, wherein the bidirectional communication enables agents to request additional processing from other agents and to provide intermediate results that dynamically adjust other agents' processing strategies;

implementing, by the system controller, an adaptive task allocation mechanism wherein agents signal their processing capacity and confidence levels, enabling the system controller to dynamically route subtasks to agents based on current load and specialization;

performing dual-layer validation on the candidate assessment questions, wherein the dual-layer validation comprises:

performing, by a first validation layer, structural validation using defined schema checking to verify field presence, data type consistency, and format compliance; and performing, by a second validation layer comprising a fine-tuned language model, semantic validation including:

duplicate detection through semantic similarity analysis of question embeddings;

relevance scoring by comparing question content to source concepts in the temporal knowledge graph; and skill-level alignment verification to ensure question difficulty matches demonstrated skill levels;

implementing a feedback loop where:

semantic validation results indicating systematic failure patterns are provided to the first validation layer to inform dynamic schema refinement; and structural validation failures provide contextual information to the second validation layer to enable root cause analysis of generation errors; and requiring both validation layers to pass for acceptance of the candidate assessment questions; and producing, by an output generator, formatted assessment outputs based on validated assessment questions, wherein the formatted assessment outputs include metadata linking each question to specific commits and skill progression stages in the temporal knowledge graph.

20. A non-transitory computer-readable medium storing instructions that, when executed by one or more processors, cause the one or more processors to perform operations comprising:

collecting test taker work data from one or more version control data sources, wherein the test taker work data comprises temporal sequences of code modifications;

collecting exemplar test formats;

preprocessing the collected test taker work data by:

analyzing commit diff patterns across the temporal sequences to identify concept introduction events and concept refinement sequences;

extracting cross-file dependency relationships from import statements and module references across multiple commits;

constructing a temporal knowledge graph representing skill progression over time, wherein nodes represent technical concepts and edges represent temporal relationships between concept introduction and usage; and extracting programming language constructs, frameworks, and libraries from the version control data to identify demonstrated skill sets;

coordinating a plurality of specialized agents within a multi-agent orchestra operating concurrently with asynchronous communication, the plurality of specialized agents including:

a context analysis agent that processes a temporal knowledge graph and extracts technical concepts with associated skill level indicators;

a question generation agent that generates candidate assessment questions targeted to detected skill levels based on the extracted technical concepts;

a quality assurance agent that evaluates the candidate assessment questions against the temporal knowledge graph and assigns quality scores based on alignment between question difficulty and demonstrated skill progression;

a validation agent that verifies schema compliance of the candidate assessment questions; and a refinement agent that iteratively improves the candidate assessment questions based on feedback messages from other agents;

wherein the context analysis agent, the question generation agent, quality assurance agent, the validation agent, and the refinement agent are computerized machine learning agents;

managing coordination of the plurality of specialized agents through a message passing protocol wherein agents exchange structured messages including:

dependency declarations that specify prerequisite processing requirements;

blocking conditions that pause agent processing pending other agent outputs; and partial results that enable downstream agents to begin processing before upstream agents complete;

enabling, through the message passing protocol, bidirectional communication between the agents, wherein the bidirectional communication enables agents to request additional processing from other agents and to provide intermediate results that dynamically adjust other agents' processing strategies;

implementing an adaptive task allocation mechanism wherein agents signal their processing capacity and confidence levels, enabling dynamic routing of subtasks to agents based on current load and specialization;

performing dual-layer validation on the candidate assessment questions, wherein the dual-layer validation comprises:

performing structural validation using defined schema checking to verify field presence, data type consistency, and format compliance; and performing semantic validation using a fine-tuned language model, wherein the semantic validation includes:

duplicate detection through semantic similarity analysis of question embeddings;

relevance scoring by comparing question content to source concepts in the temporal knowledge graph; and skill-level alignment verification to ensure question difficulty matches demonstrated skill levels;

implementing a feedback loop where:

semantic validation results indicating systematic failure patterns are provided to inform dynamic schema refinement in the structural validation; and structural validation failures provide contextual information to enable root cause analysis of generation errors in the semantic validation; and requiring both validation layers to pass for acceptance of the candidate assessment questions; and generating formatted assessment outputs based on validated assessment questions, wherein the formatted assessment outputs include metadata linking each question to specific commits and skill progression stages in the temporal knowledge graph.

* * * * *